United States Patent
Motoyama et al.

(10) Patent No.: US 7,421,474 B2
(45) Date of Patent: Sep. 2, 2008

(54) VERIFICATION SCHEME FOR EMAIL MESSAGE CONTAINING INFORMATION ABOUT REMOTELY MONITORED DEVICES

(75) Inventors: Tetsuro Motoyama, Cupertino, CA (US); Avery Fong, Castro Valley, CA (US)

(73) Assignee: Ricoh Co. Ltd., Tokyo (JP)

( * ) Notice: Subject to any disclaimer, the term of this patent is extended or adjusted under 35 U.S.C. 154(b) by 644 days.

(21) Appl. No.: 10/142,989

(22) Filed: May 13, 2002

(65) Prior Publication Data
US 2005/0278428 A1 Dec. 15, 2005

(51) Int. Cl.
*G06F 15/16* (2006.01)
*G06F 15/173* (2006.01)

(52) U.S. Cl. .................. 709/206; 709/224; 709/203
(58) Field of Classification Search ............... 709/203, 709/206, 220, 221, 223, 224, 226, 245
See application file for complete search history.

(56) References Cited

U.S. PATENT DOCUMENTS

| | | | | | |
|---|---|---|---|---|---|
| 5,191,611 A | * | 3/1993 | Lang | ................ | 705/53 |
| 5,818,603 A | * | 10/1998 | Motoyama | ........... | 358/296 |
| 5,819,110 A | * | 10/1998 | Motoyama | ........... | 710/15 |
| 5,887,216 A | * | 3/1999 | Motoyama | ........... | 399/8 |
| 5,909,493 A | * | 6/1999 | Motoyama | ........... | 713/154 |
| 6,092,200 A | * | 7/2000 | Muniyappa et al. | ........... | 713/201 |
| 6,147,592 A | * | 11/2000 | Ulrich et al. | ........... | 340/286.07 |
| 6,169,911 B1 | * | 1/2001 | Wagner et al. | ........... | 455/566 |
| 6,542,892 B1 | * | 4/2003 | Cantwell | ........... | 707/10 |
| 6,600,823 B1 | * | 7/2003 | Hayosh | ........... | 380/51 |
| 6,687,742 B1 | * | 2/2004 | Iwazaki | ........... | 709/206 |
| 6,707,472 B1 | * | 3/2004 | Grauman | ........... | 715/752 |
| 6,725,104 B2 | * | 4/2004 | Lo et al. | ........... | 700/65 |
| 6,725,264 B1 | * | 4/2004 | Christy | ........... | 709/225 |
| 6,757,714 B1 | | 6/2004 | Hansen | | |
| 6,816,885 B1 | * | 11/2004 | Raghunandan | ........... | 709/206 |
| 6,889,252 B2 | * | 5/2005 | Lacome D'Estalenx | ..... | 709/220 |
| 7,113,976 B2 | * | 9/2006 | Watanabe | ........... | 709/206 |

(Continued)

FOREIGN PATENT DOCUMENTS

JP 2-172348 7/1990

OTHER PUBLICATIONS

U.S. Appl. No. 10/142,989, filed May 13, 2002, Motoyama et al.

(Continued)

*Primary Examiner*—Ario Etienne
*Assistant Examiner*—El Hadji M Sall
(74) *Attorney, Agent, or Firm*—Oblon, Spivak, McClelland, Maier & Neustadt, P.C.

(57) ABSTRACT

The present invention relates to sending control or monitoring information between two hardware devices utilizing email. Control information relating to either a first hardware device or a second hardware device is determined. This information is incorporated into an email message. Directing information for directing the control information is incorporated into the email message. Two hardware devices can then operate cooperatively over different remote networks. These networks only need to be compatible in the ability to exchange email for communication to persist between the two hardware devices. The control information and/or the directing information can be encrypted. The control information and/or the directing information can be encoded. In embodiments of the present invention the encoding map is encrypted.

24 Claims, 41 Drawing Sheets

U.S. PATENT DOCUMENTS

2002/0138588 A1* 9/2002 Leeds .......................... 709/217
2002/0198975 A1* 12/2002 Bogia .......................... 709/223
2005/0278428 A1 12/2005 Motoyama et al.

OTHER PUBLICATIONS

U.S. Appl. No. 11/153,543, filed Jun. 16, 2005, Motoyama et al.
U.S. Appl. No. 11/234,319, filed Sep. 26, 2005, Motoyama et al.
U.S. Appl. No. 11/234,322, filed Sep. 26, 2005, Motoyama et al.
U.S. Appl. No. 11/234,224, filed Sep. 26, 2005, Motoyama et al.
U.S. Appl. No. 11/234,323, filed Sep. 26, 2005, Motoyama et al.
U.S. Appl. No. 11/681,831, filed Mar. 5, 2007, Fong et al.
U.S. Appl. No. 11/517,363, filed Sep. 8, 2006, Motoyama et al.
U.S. Appl. No. 11/517,430, filed Sep. 8, 2006, Motoyama et al.
U.S. Appl. No. 11/517,362, filed Sep. 8, 2006, Motoyama et al.
U.S. Appl. No. 11/517,378, filed Sep. 8, 2006, Motoyama et al.
U.S. Appl. No. 11/517,428, filed Sep. 8, 2006, Motoyama et al.
U.S. Appl. No. 11/940,785, filed Nov. 15, 2007, Motoyama et al.
U.S. Appl. No. 11/960,248, filed Dec. 19, 2007, Motoyama et al.
U.S. Appl. No. 12/015,659, filed Jan. 17, 2008, Motoyama et al.
U.S. Appl. No. 11/867,741, filed Oct. 5, 2007, Motoyama et al.

* cited by examiner

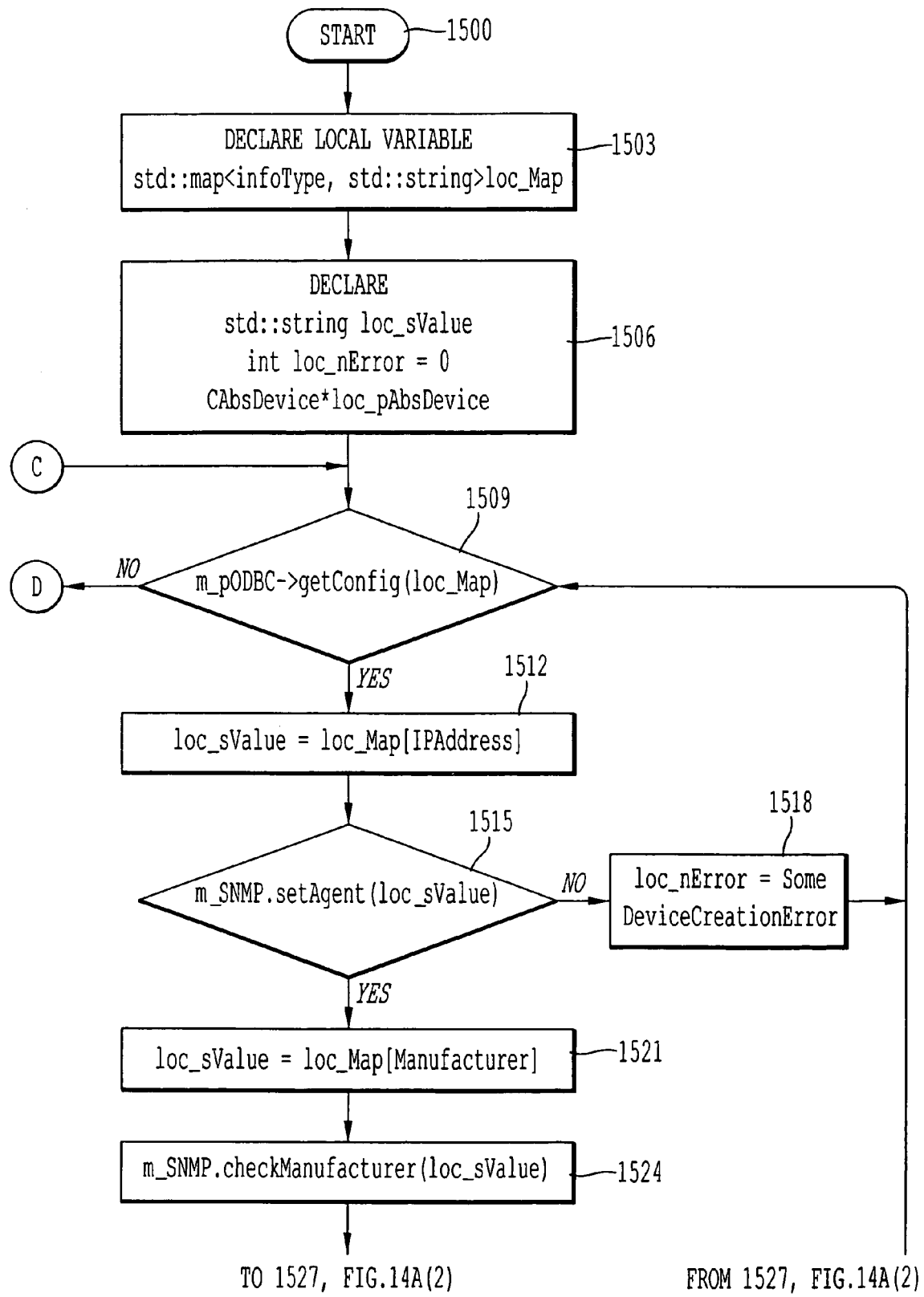
*FIG. 14A(1)*

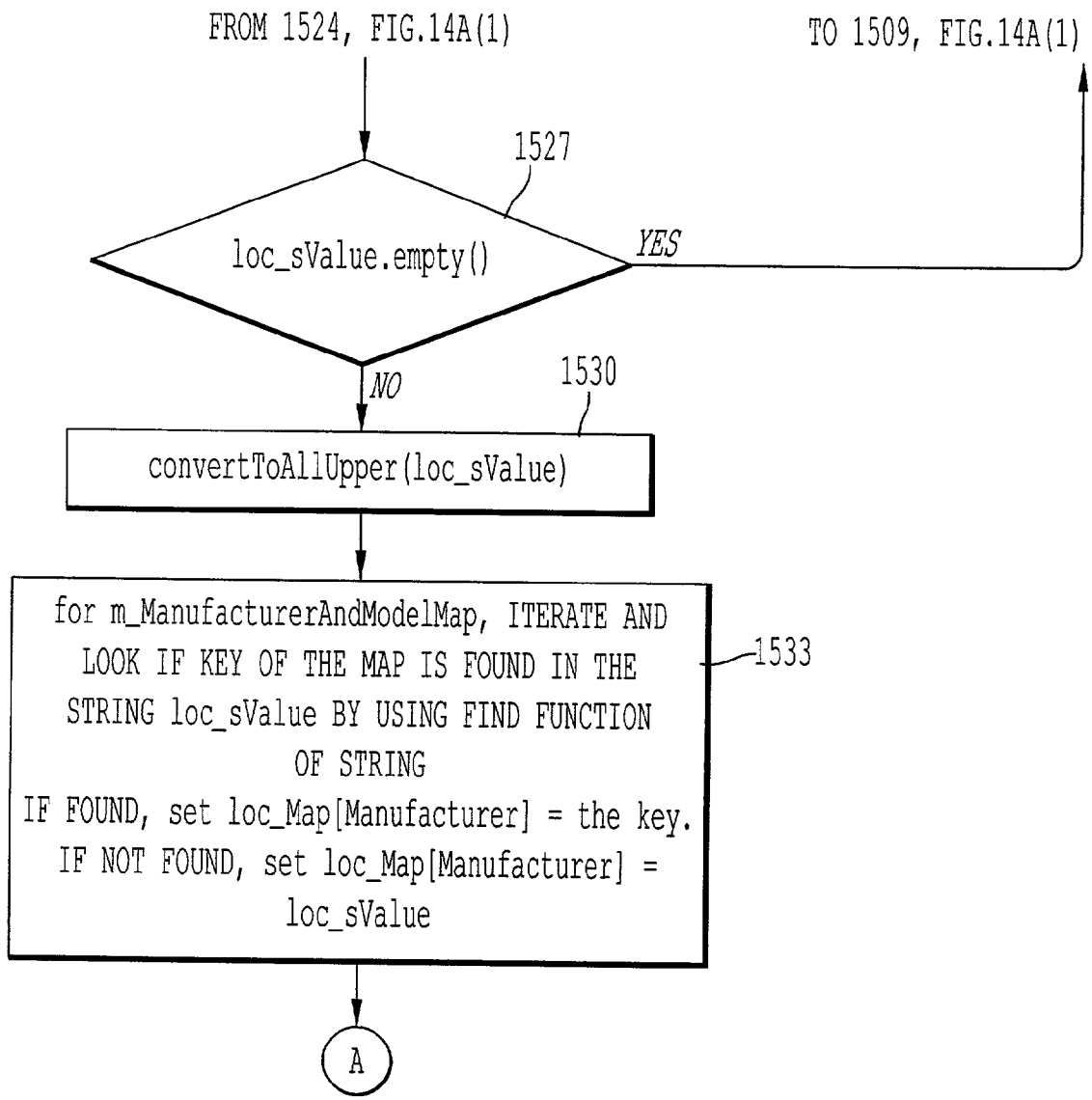
FIG. 14A(2)

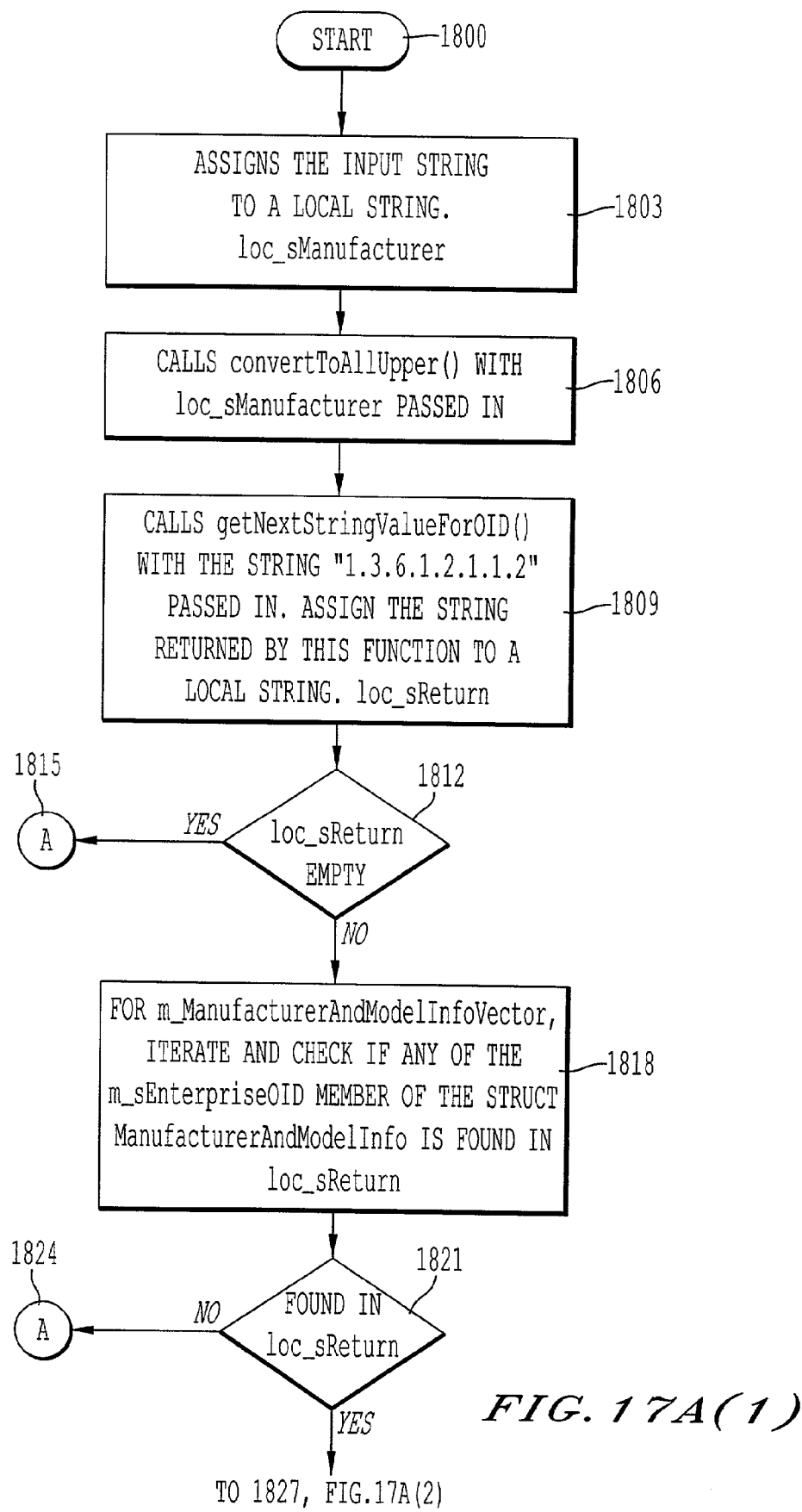
FIG. 17A(1)

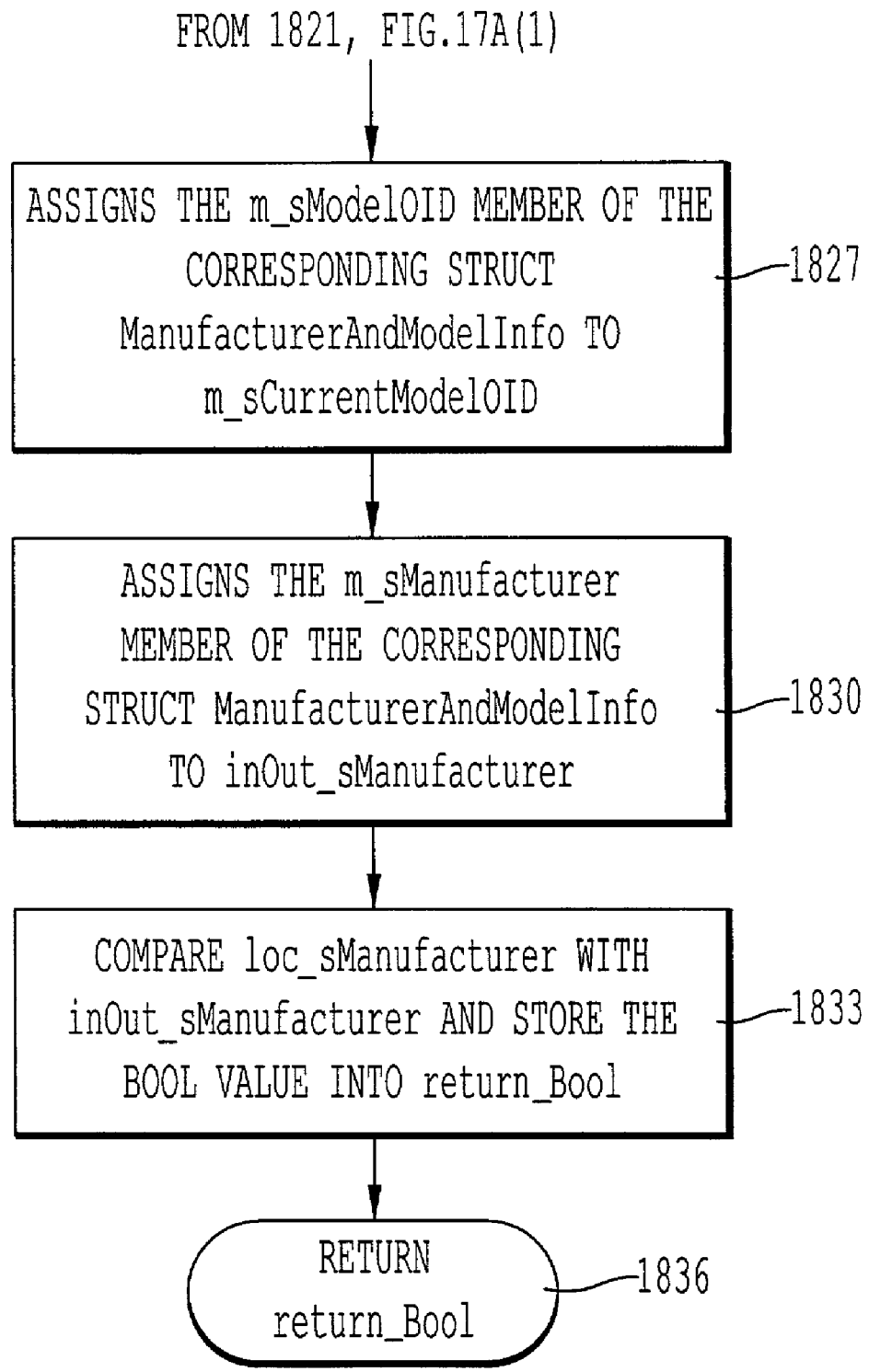
FIG. 17A(2)

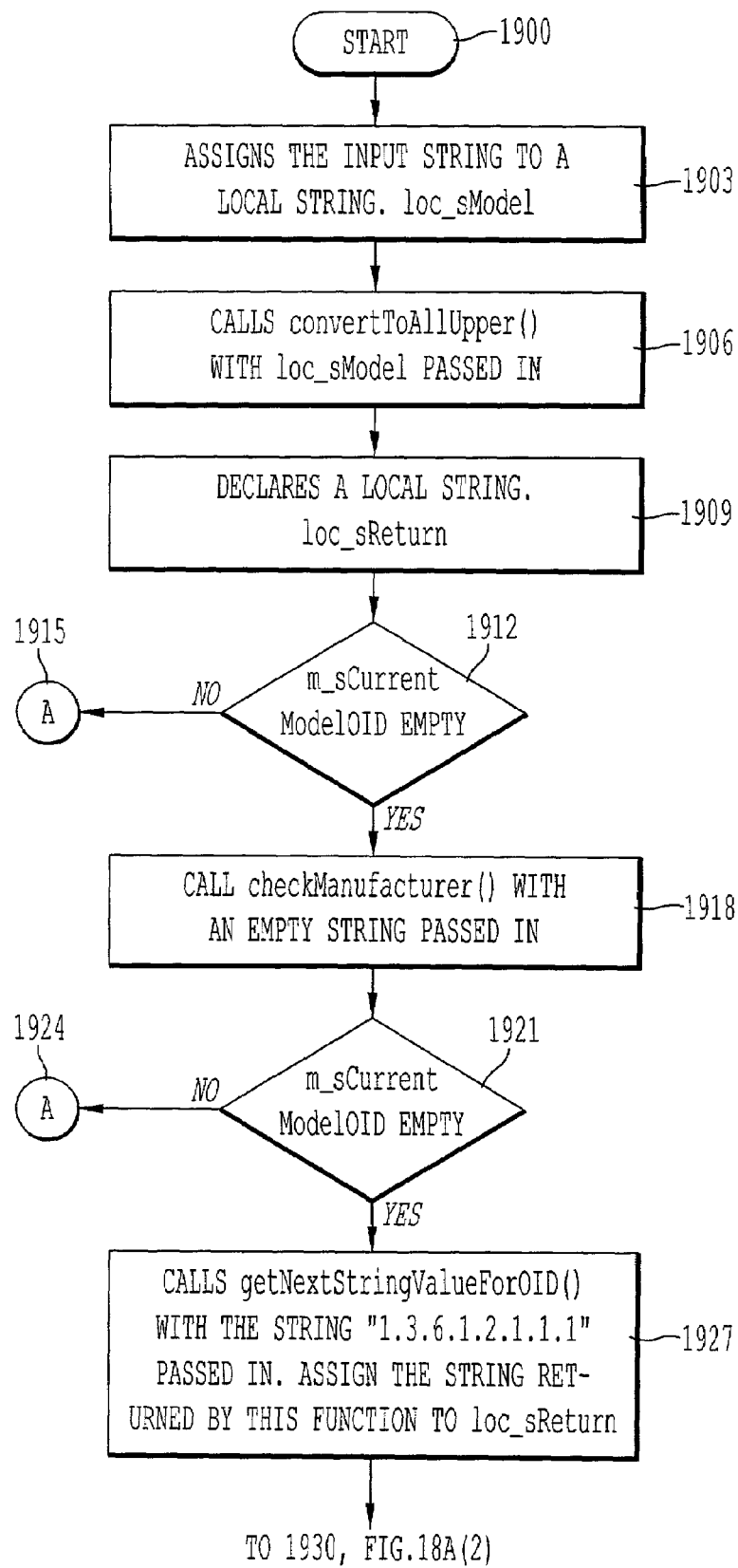
FIG. 18A(1)

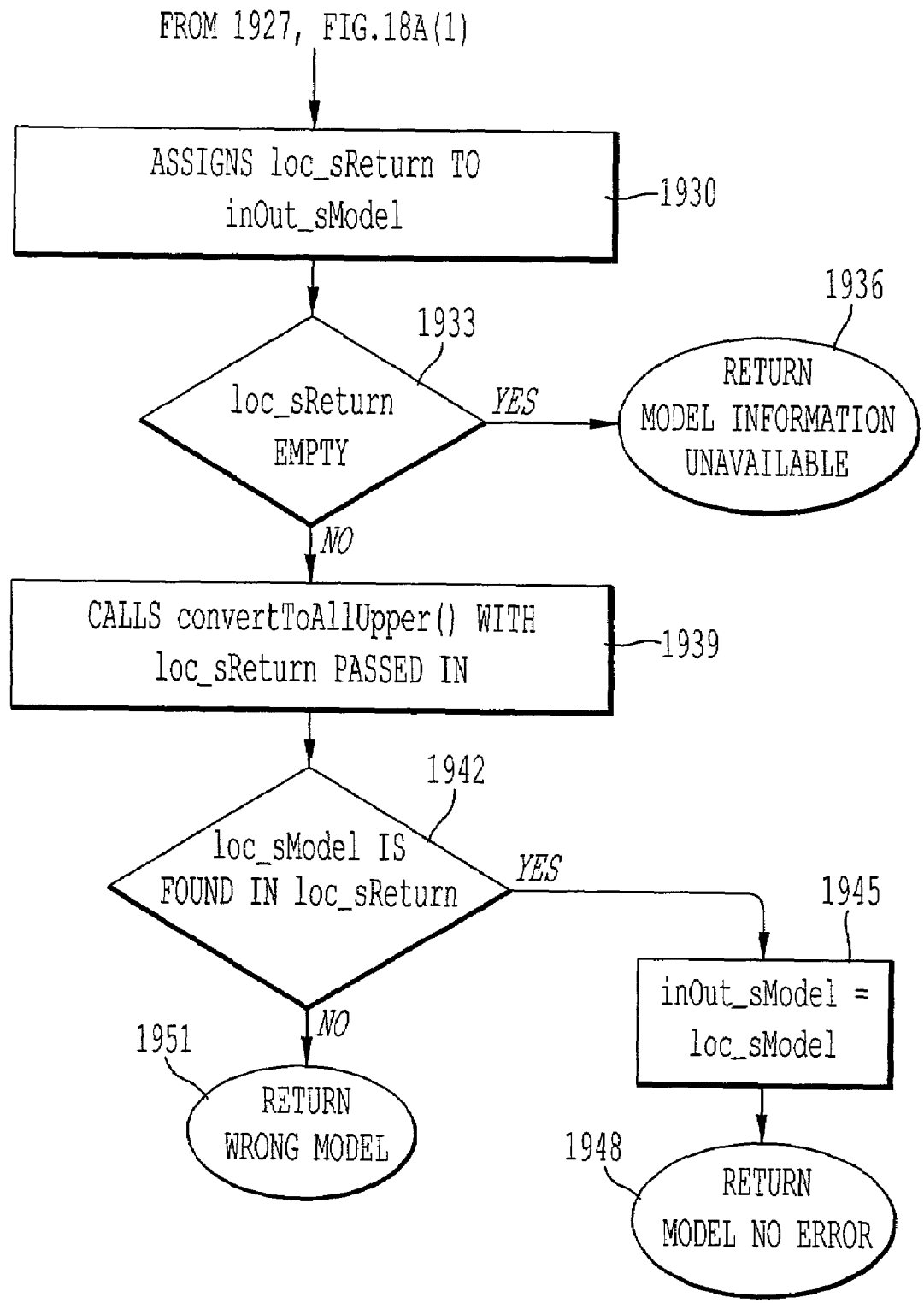
FIG. 18A(2)

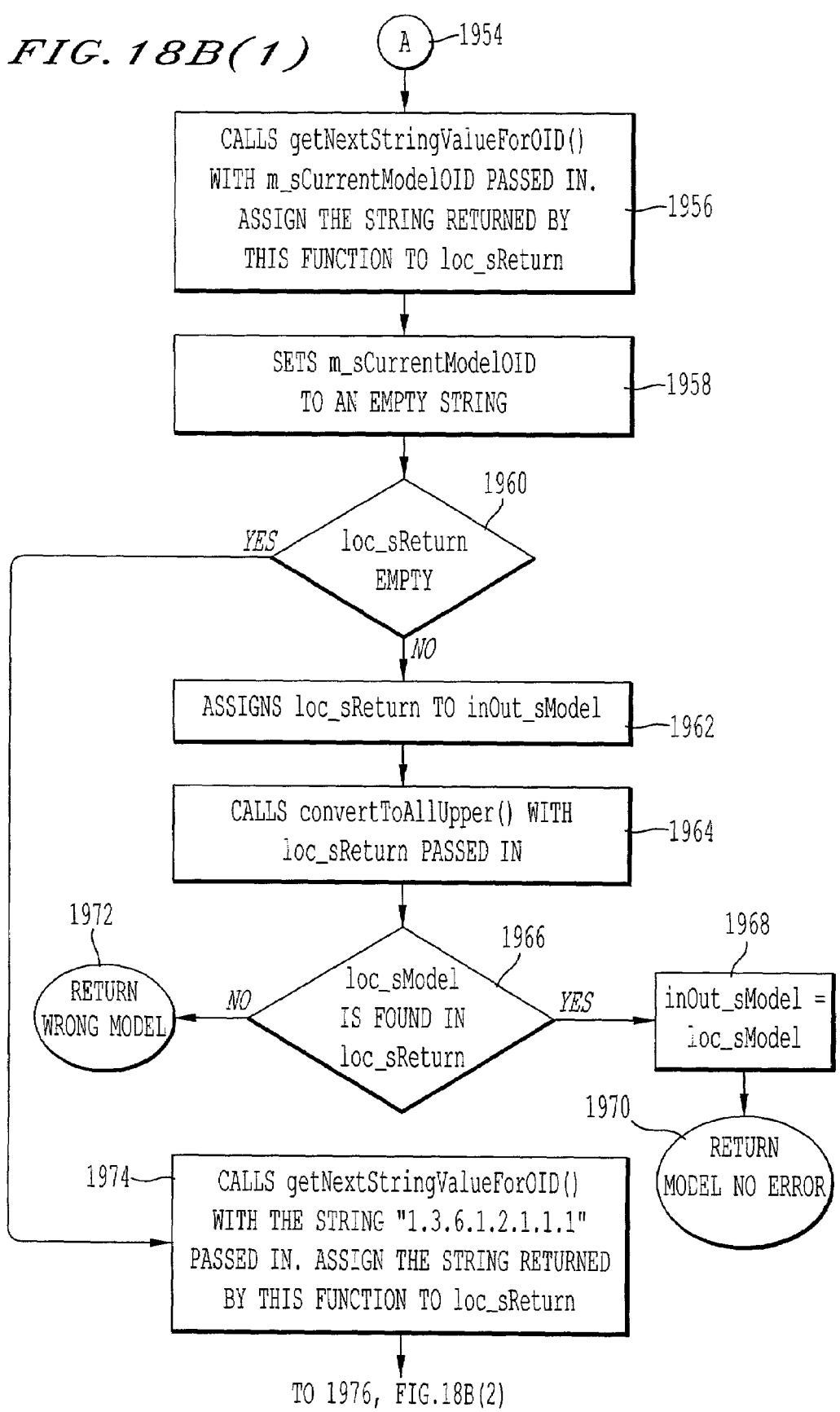
FIG. 18B(1)

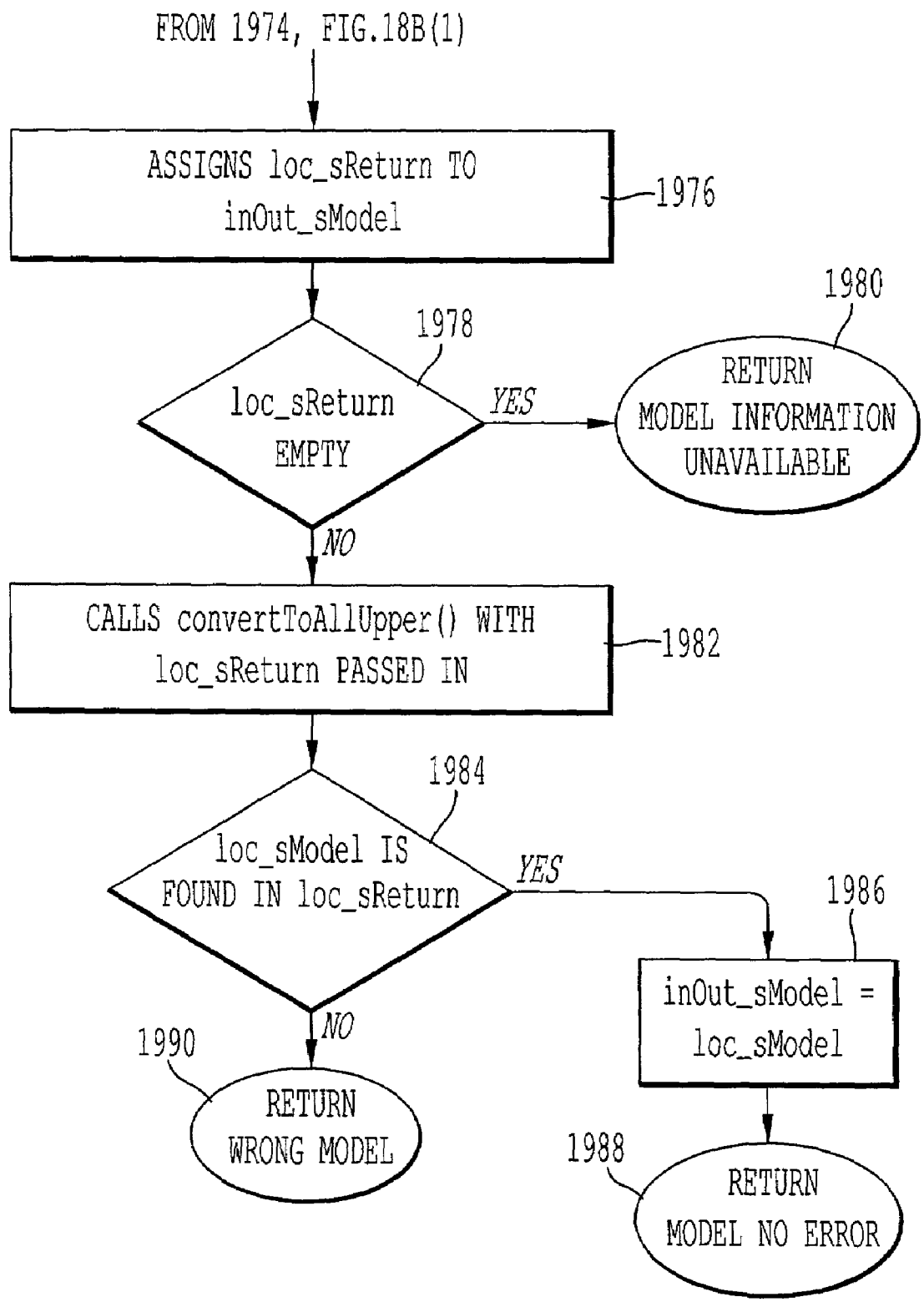
FIG. 18B(2)

```
                                                    2100
                                                    /
┌─────────────────────────────────────────────────────┐
│  ┌───────────────────────────────────────────────┐  │
│  │ From: from field                              │  │
│  │ To:  rcpt_addr_1,[rcpt_addr2, rcpt_addr3...]  │  │
│  │ Date: date                                    │  │
│  │ Subject: subject field                   2102 │  │
│  │ Comment: string used for verification         │  │
│  │ Mime-Version: 1.0                             │  │
│  │ Content Type: multipart/mixed; boundary = "boundary_name" │  │
│  └───────────────────────────────────────────────┘  │
│                                                     │
│  ┌───────────────────────────────────────────────┐  │
│  │ -boundary_name                                │  │
│  │ Content-Type: application/octet-stream; name="filename" │  │
│  │ Content-Transfer-Encoding: base64        2104 │  │
│  │ Content-Disposition: attachment; filename="filename" │  │
│  └───────────────────────────────────────────────┘  │
│                                                     │
│  ┌───────────────────────────────────────────────┐  │
│  │ Encrypted and Base64 Encoded Attachment containing the │  │
│  │ information on the monitored devices.    2106 │  │
│  └───────────────────────────────────────────────┘  │
│                                                     │
│  ┌───────────────────────────────────────────────┐  │
│  │ -boundary_name-                               │  │
│  │                                          2108 │  │
│  │                                               │  │
│  └───────────────────────────────────────────────┘  │
└─────────────────────────────────────────────────────┘
```

*Italicized text indicates values that can change*

*FIG. 23*

```
From: motoyama@str.ricoh.com
To: j07@lin.str.ricoh.com
Date: Thu, 02 Aug 2001 10:09:31
Subject: Monitor of Network Printers
Comment: YYiMjyopToLp2nZtonRztbUjaPq5vD780MJ7wgals/K694KPTTyCQwRFwabJTQvTVMRV&==
Mime-Version: 1.0
Content-Type: multipart/mixed; boundary="StR_MoNiToR_NeTwOrK"
Content-Length: 1634

--StR_MoNiToR_NeTwOrK
Content-Type: application/octet-stream; name="monitor.std"
Content-Transfer-Encoding: base64
Content-Disposition: attachment; filename="monitor.std"

bI6mmJC6trD8dTtabo+UMZ6jj5G9wcbBwP3vAQMRy835/QMD/CSpISACBOBKSOpDa39i
         jLyOwoR70tXa4o7p9v34/wwIDBeWJCocKrwoPXPG81A/QQ==

--StR_MoNiToR_NeTwOrK--
```

*FIG. 24*

VERIFICATION SCHEME FOR EMAIL MESSAGE CONTAINING INFORMATION ABOUT REMOTELY MONITORED DEVICES

CROSS REFERENCES TO RELATED APPLICATIONS

This application is related to commonly owned co-pending U.S. patent application Ser. No. 09/756,120, filed Jan. 9, 2001, entitled "Method and System of Remote Support of Device Using Email," which is incorporated herein by reference.

BACKGROUND OF INVENTION

1. Field of Invention

The present invention is related to monitoring, configuration or installation of hardware on a computer system.

2. Discussion of the Background

In general, computer systems include hardware and software. Hardware is the actual physical computing machinery, while software is the list of instructions to operate the hardware. Typically, computer systems will include a variety of hardware devices that interface with one another. When hardware devices interface with one another, it is necessary for the software which operates the hardware to be configured to allow communication between the hardware devices, so that the hardware devices can operate cooperatively. It is also desirable for hardware devices to be monitored. For the purposes of discussion, a hardware device that is configuring or monitoring will be referred to as a controlling device. Likewise, for the purposes of discussion, the hardware device that is being configured to operate cooperatively or being monitored by the controlling device will be referred to as an interfacing device.

When hardware devices initially interface with one another, it is common for the software that operates the devices to not be configured to allow cooperative operation. Accordingly, a significant part of installing computer hardware devices together is configuring the software. In some arrangements, a user must configure the computer hardware manually by opening the computer hardware and physically setting jumpers or dip switches. In some arrangements, the installation process includes a user loading software from a floppy disk to configure the hardware devices. There have also been attempts for computer hardware devices to include software that can automatically configure hardware devices. However, there are some apparent disadvantages and deficiencies of these attempts.

One disadvantage is that automatic hardware installation software is limiting in its ability to adapt to new devices or to new manufacturers that were not specifically programmed into the software. In the prior art, if the controlling device does not recognize the specific model of the interfacing device, automatic configuration is not possible. In other words, in the prior art, if the controlling device is not programmed to anticipate the model of an interfacing device, then automatic hardware configuration will not be successful. In such a circumstance, a user will have to manually install the configuration communication means to the hardware devices.

Another disadvantage of the prior art is that the controlling device is unable to partially configure hardware devices if the particular model of the interfacing device cannot be identified. In other words, if a controlling device cannot identify a specific model of the interfacing device, then the interfacing device will not be configured to operate cooperatively. This results in the unconfigured interfacing device being inoperable and essentially useless.

For hardware devices that are located on a network, it is desirable for these devices to be monitored for maintenance, usage, or other purposes. However, it has been difficult for a controlling device to communicate with various interfacing devices on a network given the different communication means between manufacturers and models of interfacing devices. This disadvantage is problematic, as administrators of networks are unable to obtain crucial information about the performance and efficiency of interfacing devices on a network.

SUMMARY OF THE INVENTION

Accordingly, it is the object of the present invention to provide a method and apparatus that overcomes the above-mentioned deficiencies of the prior art. The present invention relates to a method for a controlling device to operate cooperatively with an interfacing device. In general, the controlling device is a computer hardware device which communicates with the interfacing device. The interfacing device is also an office device, such as a printer, scanner, digital copier, stamp machine, or household appliances. The controlling device queries the interfacing device for the identity of the manufacturer of the interfacing device. Based on the determined identity of the manufacturer of the interfacing device, the controlling device then queries the interfacing device for the identity of the model of the interfacing device. Based on the information queried from the interfacing device, the controlling device establishing a communication with the interfacing device by creating software objects through the software factory.

This method is a hierarchical approach for establishing a communication means between a hardware device and an interfacing device. This hierarchical approach is advantageous, as once the manufacturer of the interfacing device is determined by the controlling device, the controlling device can determine the model of the interfacing device using communication means that are specific to the identified manufacturer of the interfacing device, according to an embodiment of the invention. In other words, once the controlling device determines the manufacturer of the interfacing device, knowledge of specific manufacturer can be taken advantage of to determine the model of the interfacing device.

One advantage of this hierarchical approach is that it is an effective mechanism establishing the most effective communication means between the controlling device and the interfacing device. This is evident and apparent, as once the controlling device has identified the manufacturer of the interfacing device, it is possible for the controlling device to determine the model-specific communication means of the interfacing device. In other words, once the manufacturer of the interfacing device is identified, the controlling device has enough information about the interfacing device to decipher the model of the interfacing device. This advantage is significant, as it offers some versatility as to how the controlling device determines the actual model of the interfacing device.

In some instances, the model of the interfacing device may be readily identified from a query of the interfacing device and using such information from a query, the controlling device can establish a communication means according to communication means that are specific to the identified model of the interfacing device.

In other instances, the controlling device may not be able to identify the model of the interfacing device through a query of the interfacing device. In such instances, the controlling device of the present invention can then employ alternative means for establishing an effective communication means. One such means is electronically communicating with the manufacturer of the interfacing device and downloading updated software communication means and model identification codes. In such an arrangement, a controlling device, with updated manufacturer information, can then successfully re-query the interfacing device for the specific model.

In other instances, the controlling device may not be able to communicate electronically with the manufacturer of the interfacing device. However, in these instances, the controlling device may be able to decipher the communication means of the interfacing device by trying the use of other communication means of other models from the manufacturer of the interfacing device. This would be a trial and error process and may result in a compromise of the maximum configurability of the interfacing device, but would deem the interfacing device operable or monitorable.

In all of these arrangements, the manufacturer of the interfacing device must be known. This is apparent, as there are so many manufacturers and so many models of interfacing devices that it would not be possible or practical to decipher the communication means of the interfacing device without some additional information about the interfacing device, such as the manufacturer.

Another advantage of the present invention is the ability of the controlling device to adapt to the communication means used with an interfacing device. In an instance when either the manufacturer or model of the interfacing device cannot be determined, the controlling device may be able to use communication means that are universal to all devices. Alternatively, if the manufacturer is identifiable but the model is not, then the controlling device can utilize communication means that are specific to all devices of the identified manufacturer. Alternatively, it is common that hardware devices have basic universal features, which all hardware devices of that type have and all utilize the same communication means. Accordingly, the controlling device of the present invention can utilize these universal features using a standard communication means, according to an embodiment of the invention. Taking this one step further, all devices of a particular manufacturer may have some special features that are specific to that manufacturer. These features may all share the same communication means regardless of the specific model. If the controlling device is able to identify the manufacturer of the interfacing device, then the controlling device can maximize communication, even without specific model identification of the interfacing device. Of course, if a model of a particular interfacing device is determinable, the controlling device will be able to identify all of the communication means associated with that specific model of interfacing device.

Accordingly, the present invention is an improvement over the prior art, as the controlling device is able to maximize the effectiveness of the communication means with the interfacing device by taking advantage of the information the controlling device can obtain from the interfacing device to establish a communication means.

The present invention also has the advantage of being self-teaching or a smart device. As a controlling device interacts with interfacing devices, the controlling device is able to learn the nature of communication means of a particular manufacturer or a particular class of interfacing device models. The controlling device may be able to decipher several communication means from the interfacing device by a trial and error process of probing the interfacing device. This advantage allows maximization of the established communication means of interfacing devices, even when a manufacturer or model of interfacing devices cannot be easily identified.

Embodiments of the present invention relate to creating device objects for maintaining communication between a interfacing device and a controlling device. These device objects are software object or software programs that are created according to information that is queried from the interfacing device. As a device object is created for each interfacing device, computer system resources are preserved during operation.

Embodiments of the present invention relate to querying an interfacing device to determine the manufacturer and model of the interfacing device. The querying is accomplished by first inputting signals with known communication means of particular manufacturers. By comparing the responses of the interfacing device of these signals and comparing them to anticipated responses, the manufacturer of the interfacing device can be determined. The anticipated response is the known response to the inputted signals of a particular manufacturer. In other words, the manufacturer of an interfacing device can be deducted according to its reaction to predetermined input signals. If the manufacturer of the interfacing device is indeterminable, then a universal or generic communication means is assigned to the interfacing device. If the manufacturer of the interfacing device is determined, the interfacing device is queried in a similar fashion to the querying of the model. However, if the model of the interfacing device is indeterminable, then a generic or universal communication means in compliance with the determined manufacturer communication means is assigned to the interfacing device.

Embodiments of the present invention relate to determining the unique identification of an interfacing device. The interfacing device is first queried utilizing the hierarchical relationship of the interfacing devices' communication means to acquire the unique identification. If this querying is unsuccessful, then a standard communication means (i.e. SNMP) is utilized to acquire the unique identification from the interfacing device. If use of the standard communication means is also unsuccessful, then assign a random code for the unique identification of the interfacing device.

Embodiments of the present invention relate to sending control or monitoring information between two hardware devices utilizing email. Control information relating to either a first hardware device or a second hardware device is determined. This information is incorporated into an email message. Directing information for directing the control information is incorporated into the email message. These embodiments are advantageous, as two hardware devices can operate cooperatively over different remote networks of computer networks. These networks only need to be compatible in the ability to exchange email for communication to persist between the two hardware devices.

In embodiments of the present invention the control information and/or the directing information are encrypted. In embodiments of the present invention, the control information and/or the directing information are encoded. In embodiments of the present invention the encoding map is encrypted. These embodiments utilizing encryption and encoding improve data security for the communication between the two hardware devices.

Other advantages of the present invention would be obvious to one of ordinary skill in the art, in view of this specification.

BRIEF DESCRIPTION OF THE DRAWINGS

A more complete appreciation of the present invention and many of the attendant advantages thereof will be readily obtained as the same becomes better understood by reference of the following detailed description when considered in connection with the accompanying drawings.

FIG. 14A is a flowchart that shows the exemplary initialization process when executing the initMonitorSendDLL( ) function of CSendInterfaceManager.

FIG. 17A shows the flowchart of the function checkmanufacturer of the CSNMP class.

FIG. 18A shows the flowchart of the function checkModel of the CSNMP class.

FIG. 18B shows the flowchart of the function checkModel of the CSNMP class.

FIG. 23 shows the format of the email message sent by the Data Transfer Package.

FIG. 24 an example of the email message created in CMailMessage.

DETAILED DESCRIPTION OF THE PREFERRED EMBODIMENTS

Figure 1:
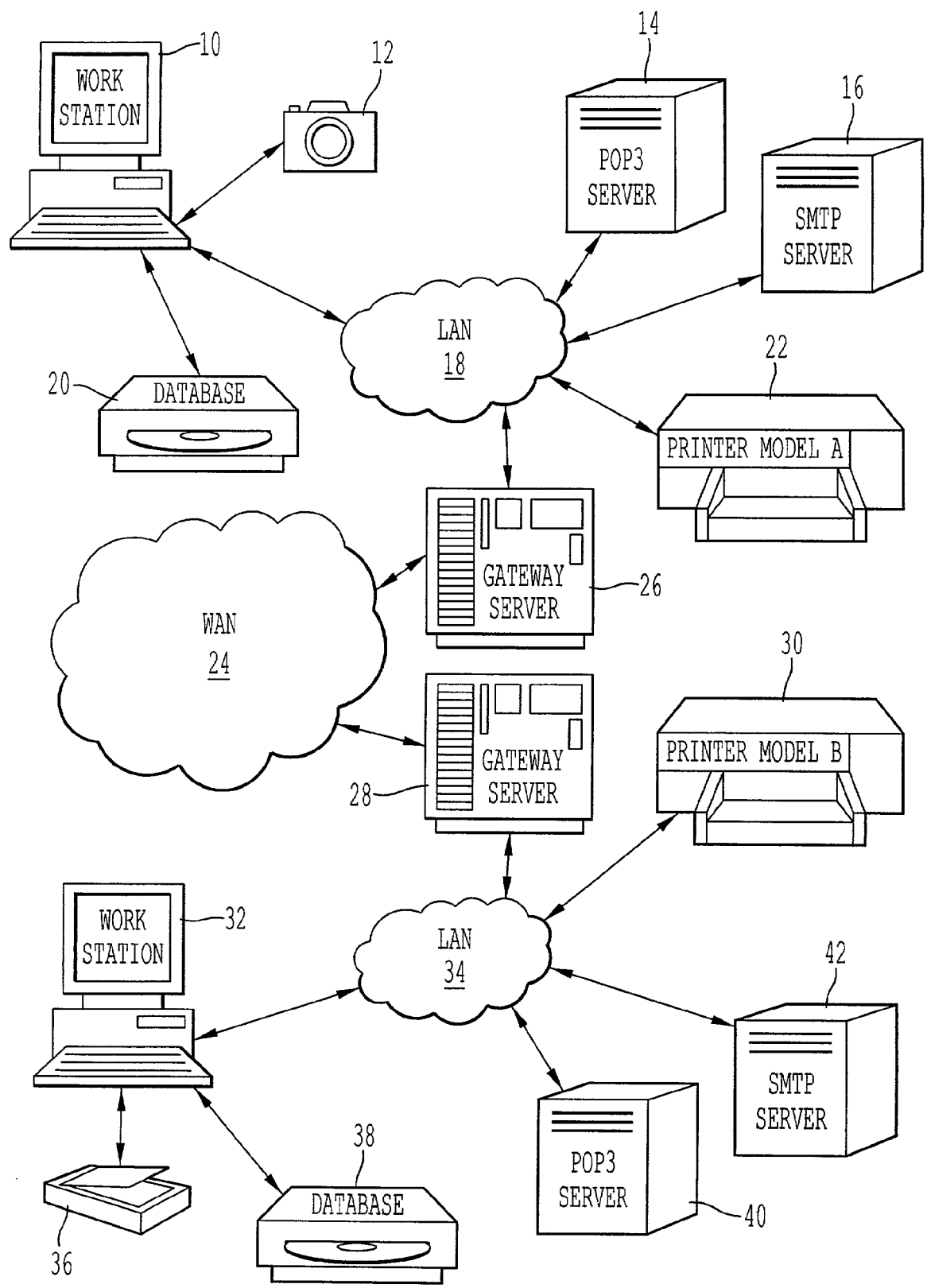
FIG. 1 illustrates the relationship between a plurality of hardware devices and computer networks.

Embodiments of the present invention relate to a method for a controlling device to establish a communication means for an interfacing device. The method comprises the following steps: Realizing the location of the interfacing device. Updating in the first database the location of the interfacing device. Querying the interfacing device for the identity of the manufacturer of the interfacing device. Updating in the first database the manufacturer of the interfacing device, if the querying for the manufacturer of the interfacing device is successful. Querying the interfacing device, utilizing the identity of the manufacturer, for the identity of the model of the interfacing device, if the querying of the interfacing device for the identity of the manufacturer of the interfacing device is successful. Updating in the first database the identity of the model of the interfacing device, if the query for the identity of the model of the interfacing device is successful. Establishing a communication means for the interfacing device according to information stored in the first database.

In embodiments of the present invention, if the querying of the interfacing device for the identity of the manufacturer of the interfacing device is successful and the querying of the interfacing device for the identity of the model of the interfacing device is unsuccessful, then the step of establishing a communication means for the interfacing device is according to an interfacing protocol that is particular to all devices manufactured by the manufacturer of the interfacing device.

In embodiments of the present invention, if the querying of the interfacing device for the identity of the manufacturer of the interfacing device is unsuccessful and the querying of the interfacing device for the identity of the model of the interfacing device is unsuccessful, then the step of establishing a communication means for the interfacing device is according to an interfacing protocol that is common to all devices.

In embodiments of the present invention, the step of querying the interfacing device for the identity of the model of the interfacing device utilizes the identity of the manufacturer of the interfacing device to query the interfacing device with model identification codes that are particular to the manufacturer of the interfacing device.

In embodiments of the present invention, the method comprises a further step of querying the interfacing device with a unique identification of the interfacing device prior to the step of querying the interfacing device for the identity of the manufacturer of the interfacing device.

In embodiments of the present invention, the unique identification of the interfacing device is a unique sequence of data designated to the interfacing device by the manufacturer of the interfacing device.

In embodiments of the present invention, the step of updating in the first database the location of the interfacing device includes updating a unique identification of the interfacing device in the first database.

In embodiments of the present invention, interfacing device is queried using simple network management protocol.

In embodiments of the present invention, the step of realizing the location of the interfacing device is accomplished by automatically detecting that the interfacing device is electrically coupled to the controlling device.

In embodiments of the present invention, the step of realizing the location of the interfacing device is accomplished by an input by a user.

In embodiments of the present invention, the controlling device and the interfacing device are network computer devices coupled to one another by a network. In embodiments of the present invention the step of realizing the location of the interfacing device is accomplished by the controlling device detecting that the network location of the interfacing device has changed. In embodiments of the present invention the location of the interfacing device is a network location of the interfacing device on the network. In embodiments of the present invention the network location of the interfacing device is an internet address.

In embodiments of the present invention, the first database can be accessed by an interfacing that is independent of the database file format. In embodiments of the present invention, the first database complies with the ODBC standard.

In embodiments of the present invention, at least a portion of the first database is duplicated on a second database.

In embodiments of the present invention, the second database is updated with at least a portion of the first database by utilizing transfer through email. In embodiments of the present invention, the transfer data through e-mail utilizes a simple mail transfer protocol.

Embodiments of the present invention relate to a method for a controlling device to establish a communication means for an interfacing device. The method comprising the following steps: Querying the interfacing device for an identity of a manufacturer and the identity of the model of the interfacing device. Establishing a communication means for the interfacing device using a communication means that is common to all interfacing devices if the querying of the interfacing device did not identify either the manufacturer and the model of the interfacing device. Establishing a communication means for the interfacing device using a communication means that is common to all interfacing devices of the manufacturer if the querying of the interfacing device identified the manufacturer of the interfacing device and the querying of the interfacing device did not identify the model of the interfacing device. Establishing a communication means for the interfacing device using a communication means that is particular to the model of the interfacing device if the querying of the interfacing device identified both the manufacturer and the model of the interfacing device.

Referring now to the drawings, wherein like reference numbers identify the same or similar parts and more particularly to FIG. 1 thereof, there is illustrated an exemplary illustration of interaction between various hardware devices and computer networks. Work station 10 is an exemplary controlling device and is arranged to store data in database 20. Camera 12 is depicted coupled to work station 10. Camera 12 illustrates an interfacing device directly coupled to work station 10 and capable of being automatically configured on or monitored by work station 10. Work station 10 is also coupled to local area network (LAN) 18. LAN 18 is coupled to POP3 server 14, SMTP server 16, printer model A 22, and gateway server 26. Printer model A 22 illustrates an interfacing device that is a network printer. SMTP server 16 is a Simple Mail Transfer Protocol (SMTP) server that operates to send mail from work stations coupled to LAN 18, such as work station 10. One of ordinarily skill in the art should recognize that a plurality of work stations may be coupled to LAN 18, and work station 10 is merely an exemplary work station. These plurality of work stations may also be controlling devices or these other work stations may rely on work station 10 for automatic configuration or monitoring of hardware devices. POP3 server 14 is a Post Office Protocol server that receives email for work station 10 and the other work stations (not shown) coupled to LAN 18. Gateway server 26 allows LAN 18 to communicate in a wide area network (WAN) 24. WAN 24 may be the internet or another type of wide area network.

LAN 34, gateway server 28, printer model B 30, SMTP server 42, POP3 server 40, work station 32, database 38, and scanner 36 are shown and are analogous to LAN 18, gateway server 26, printer model A 22, SMTP server 16, POP3 server 14, work station 10, database 20, and camera 12 respectively. These analogous devices and local area networks illustrate how two local area networks 18 and 34 can be coupled by a wide area network 24. Further, LAN 34 may include a plurality of work stations (not shown) which may be configured to operate cooperatively with interfacing devices of either LAN 18 or LAN 34.

For instance, work station 32 may be configured to operate printer model A where work station 10 may be configured to operate scanner 36. This is made possible by communication between local area network (LAN) 18 and local area network (LAN) 34 through wide area network (WAN) 24 enabled by gateway servers 26 and 28.

Scanner 36 is analogous to camera 12 as interfacing device directly coupled to work station 32. Printer model B 30 is analogous to printer model A 22 except that it is a different model and possibly a different manufacturer.

Database 20 and database 38 store information relating to various interfacing devices, such as camera 12, printer model A 22, printer model B 30, and scanner 36. Work stations 10 and 32 are in communication with other work stations (not shown) through LAN 18 and LAN 34 to communicate between these work stations (not shown) with these interfacing devices. In embodiments of the present invention, work station 10 could be the controlling device for all of the interfacing devices 12, 22, 30, and 36 shown in FIG. 1. In other embodiments of the present invention, both work station 10 and work station 32 could be controlling devices arranged to communicate over local area network (LAN) 34. Accordingly, information relating to the interfacing devices can be stored on database 38 to allow for the establishment of communication means for communication with the interfacing devices. As networks are often complex, it may be necessary for there to be several controlling devices on a network, such as work station 10 and work station 32. It is also most efficient for such controlling devices 10, 32 to exchange data to maximize the usability of interfacing devices 12, 22, 30, and 36. Accordingly, data stored on database 20 can be periodically updated on database 38 by sending email messages through SMTP server 16 and routed through LAN 18, gateway server 26, WAN 24, gateway server 28, and LAN 34 to POP3 server 40. Work station 32 may then arranged to download the email message from work station 10 through POP3 server 40. The content of the email message may include configuration data that is stored on database 20 to be copied on database 38. The work station 32 is arranged to receive an email message and automatically update database 38 based on particular communication means of email exchange that are pre-programmed in work station 10 and work station 32. Similarly, database 20 can be updated from that stored in database 38 in an identical fashion utilizing SMTP server 42, LAN 34, gateway server 28, WAN 24, gateway server 26, LAN 18, and POP3 server 14.

Figure 2:
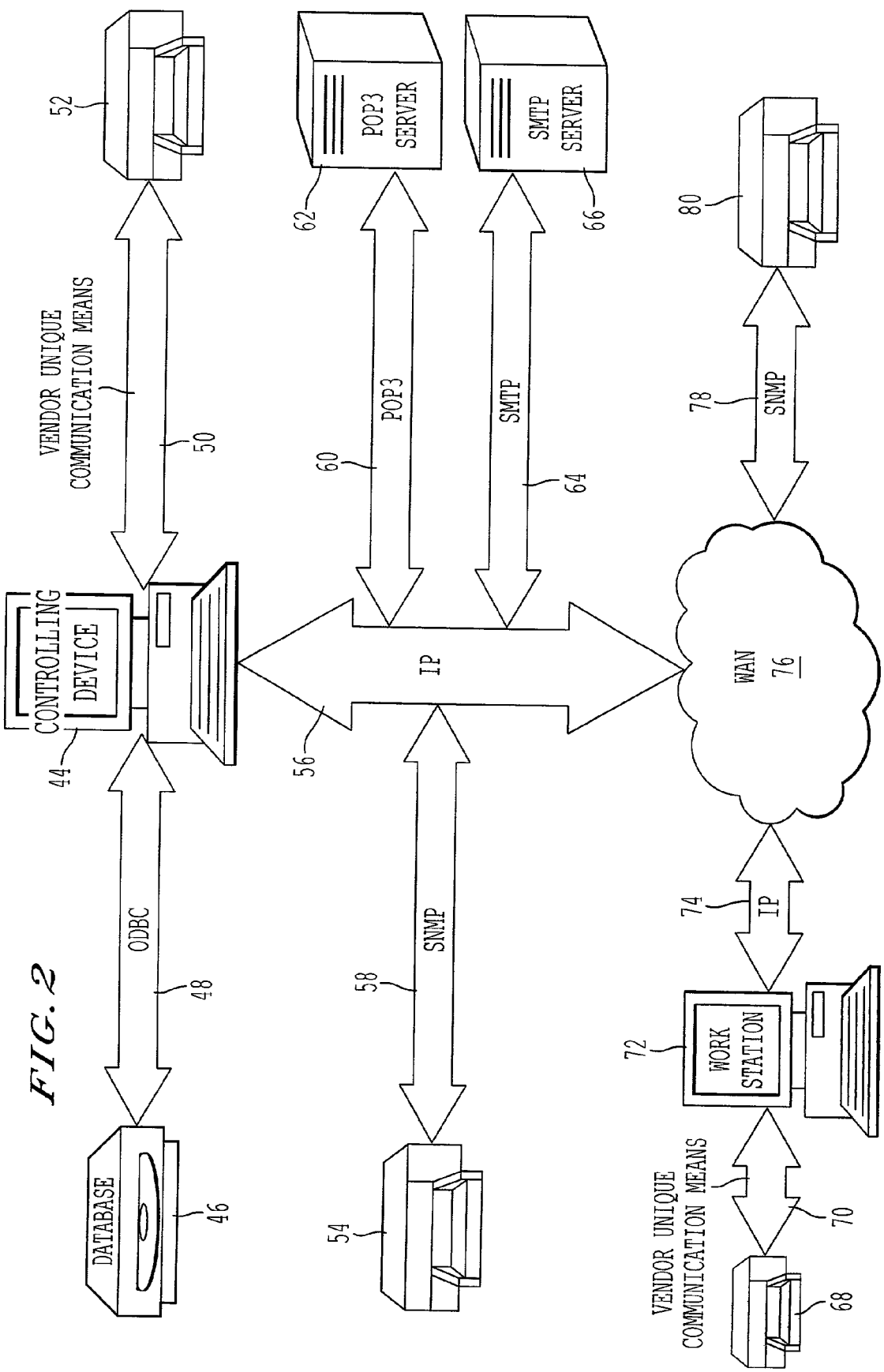
FIG. 2 illustrates different communication means that are used in the communication between different hardware devices.

FIG. 2 is an exemplary illustration of the communication means interaction between various hardware devices. Printers 52, 54, 68, and 80 are exemplary interfacing devices that are coupled to controlling device 44. These interfacing devices 52, 54, 68, and 80 communicate over Simple Network Management Protocol (SNMP) as shown by blocks 50, 58, 70, and 78. SNMP is a common communication means by which network management applications can query devices. SNMP operates at the open systems interconnection (OSI) application layer. The internet based SNMP is the basis of most network management software. SNMP was designed as UDP on IP network management protocol, that can manage virtually any network type and has been extended to include IP as routers and bridges. SNMP is widely deployed in an IP (internet protocol) environment. SNMP can be implemented over ethernet as well as OSI transport. SNMP is an Internet standard and operates on top of the internet protocol. One of ordinarily skill in the art should realize that an interfacing device does not necessarily need to communicate over SNMP, and can communicate using similar communication means. Interfacing device printer 52 communicates over vendor unique communication means 50 with controlling device 44. Interfacing device printer 54 communicates with controlling device 44 over SNMP 58 and IP 56. Printer 54 is a network printer and, therefore, is not directly coupled to the controlling device 44. Accordingly, the SNMP rides over the IP for printer 54. Interfacing device printer 80 is coupled to wide area network (WAN) 76 and communicates with controlling device 44 over SNMP 78 and IP 56 similar to printer 54. Printer 68 is directly coupled to work station 72 and communicates with the work station 72 over SNMP 70. Work station 72 communicates with WAN 76 over IP 74 and then with the communication means device over IP 56. SNMP 58, 50, 70, and 78 are all identical. IP 56 and TCP/IP 74 are also identical. Controlling device 44 communicates with database 46 over Open DataBase Connectivity (ODBC) 48. ODBC is a standard that allows databases created by various relational and non-relational database programs to be accessed by a common interfacing. Such relational and non-relational database programs include Microsoft Access, Microsoft FoxPro, and Oracle. The interface is independent of the interface file format. By relying on ODBC, one can write an application that uses the same code to read record from an Access file, for example. SMTP server 66 is arranged for sending email and is coupled to controlling device 44 over a local area network (not shown) using Simple Message Transfer Protocol (SMTP) 64 and IP 56. POP3 server 62 is arranged to receive email from controlling device 44 and communicates with controlling device 44 using POP3 60 and IP 56.

Figure 3:
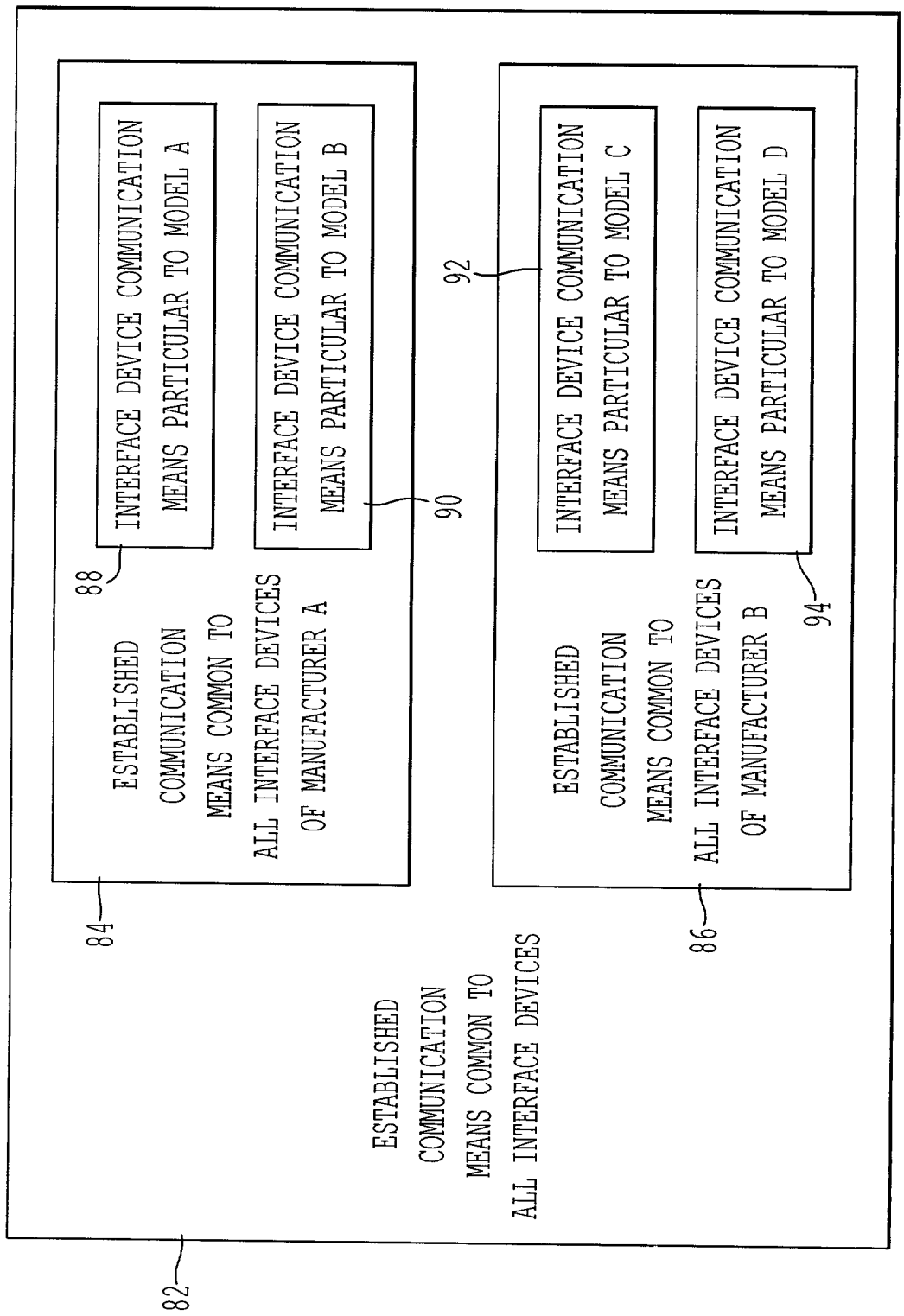
FIG. 3 illustrates a hierarchy of interface communication means.

FIG. 3 is a hierarchical relationship between established communication means for the different interfacing device models. Block 82 is the established communication means common to all interfacing devices. Blocks 84 and 86 illustrate the communication means of two exemplary manufacturers (Manufacturer A and Manufacturer B). Block 84 is the established communication means common to all interfacing devices of Manufacturer A, while block 86 is the established communication means common to all interfacing devices of manufacturer B. Blocks 84 and 86 are part of block 82. As part of block 84, blocks 88 and 90 are the communication means of different interfacing devices that have differences in communication means. Blocks 88 and 90 are part of block 84 which is part of block 82. Blocks 92 and 94 are analogous to blocks 88 and 90 but particular to exemplary manufacturer B. This diagram illustrates the hierarchy of communication means. In general, all communication means of block 82 are also common to blocks inside block 82. However, the communication means in blocks 84, 88, 90, 86, 92, and 94 are not necessarily completely compatible with the communication means in block 82.

Figure 4:
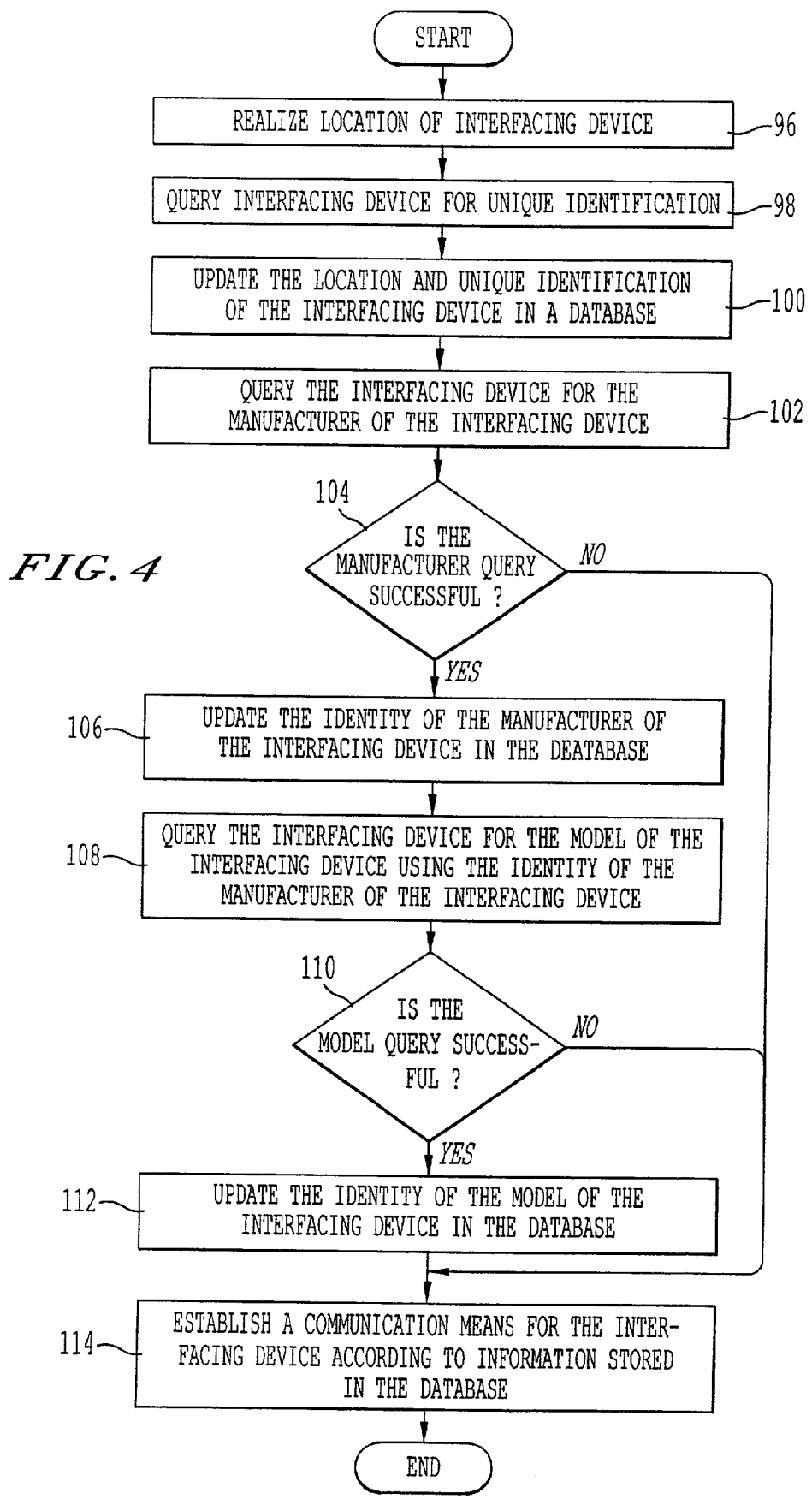
FIGS. 4 and 5 are flowcharts of the utilization of the hierarchical relationship of communication means for a controlling device to establish a communication means with an interfacing device according to two respective embodiments of the present invention.

FIG. 4 is a flowchart illustrating embodiments of the present invention in which the hierarchical relationship of communication means for a controlling device is utilized to establish a communication means for an interfacing device. Block 96 illustrates a controlling device realizing the location of the interfacing device. In embodiments of the present invention, the realizing of the location of the interfacing device is accomplished by an automatic detection that the interfacing device is electrically coupled to the controlling device. This automatic detection may be any coupling of hardware devices or hardware components. This automatic detection is often accomplished by hardware devices including software programs which monitor and track all of the input and output signals to the hardware device. Accordingly, if a new hardware device or component is coupled to such a hardware device, its presence will be detected.

In other embodiments, the step of realizing the location of interfacing devices is accomplished by an input by a user. In such embodiments, the user may input data into a controlling device which indicates that a new interfacing device has been coupled to the controlling device. Such an input may actually be a command for the interfacing device to be configured, however, the data input by the user must include the location of the interfacing device. The location of the interfacing device may be a network location of an interfacing device on a network or possibly a port on a hardware device to which the interfacing device is coupled.

In some embodiments, the location of the interfacing device may include both a port on a hardware device and the network location of the network device.

In other embodiments, the step of realizing the location of the interfacing device is accomplished by the controlling device detecting that a network location of an interfacing device has changed. In these embodiments, the controlling device may be able to identify the interfacing device, however in a different location. This different location may either be a network location, a data port on a hardware device, or a combination of both.

One of ordinarily skill in the art would realize that means for realizing location of an interfacing device can include a wide variety of events. The common feature of these events is that the controlling device becomes aware of the presence of an interfacing device. This location realization may serve the purpose of starting the process of automatic configuration or monitoring of a new device that is electrically coupled to a controlling device or may be the start of a process that confirms or updates the established communication means of an interfacing device.

Block 98 illustrates that the controlling device queries the interfacing device for the unique identification of the interfacing device. The unique identification may be a serial number, manufacturer number, MAC address or other standard code those unique to the particular interfacing device that the particular interfacing device can be identified by. This information is useful to the controlling device to identify and record an identity for the interfacing device so that the interfacing device can be referenced and universally accessed.

Block 100 shows the updating of the location and the unique identification of the interfacing device in a database. For the purposes of this discussion, a database is defined as a collection of data structured and organized in a disciplined fashion so that it is possible to quickly access information of interest. Accordingly, a database may be comprised of either volatile or non-volatile memory that can be accessed and updated for easy reference. Once the location of the interfacing device is realized in block 96, it is important to update that information for reference in the database. Further, after the query for the unique identification of the interfacing device, it is important to save that information to be referenced in the future. In some embodiments, the location and unique identification of the interfacing device are associated with one another in the database so that the interfacing device can be either referenced by its unique identification or its location on a computer or network. Likewise, in embodiments of the present invention, an identification of the interfacing device can be translated from its location to its unique identification and vice versa.

One of ordinarily skill in the art would realize that a means for updating a database with the location of an interfacing device includes any storage of network or physical location of the interfacing device for purposes of identifying where the interfacing device is located. Further, one of ordinarily skill in the art would realize that a database can include any kind of memory arranged to store data.

In block 102, the interfacing device is queried for the manufacturer of the interfacing device. One of ordinarily skill in the art would realize that a means for querying an interfacing device for the manufacturer of the interfacing device would include any communication means that would access information of the manufacturer of an interfacing device. Such a communication means may include sending a signal from the controlling device to the interfacing device and determining the manufacturer from the response received from the interfacing device. Querying of the interfacing device could also include only receiving a signal from the interfacing device which indicates the manufacturer. Further, querying the interfacing device may include analyzing signals emitted from the interfacing device which are indicative of the manufacturer of the interfacing device.

Blocks 104 and 106 illustrate the updating of the identity of the manufacturer of the interfacing device in the database if the controlling device is successful in querying the manufacturer. If the querying of the identity of the manufacturer is not successful, then the controlling device does not update the database with such information. Accordingly, if the querying of the manufacturer is unsuccessful, the process progresses to block 114, which will be discussed below. One of ordinarily skill in the art would realize that a means for updating in a database the manufacturer of an interfacing device relates to any storage of information that can be used as a reference of the manufacturer of the interfacing device.

In block 108, the interfacing device is queried for the model of the interfacing device. This querying uses the identity of the manufacturer of the interfacing device. Further, the step performed in block 108 is not performed if the manufacturer query of block 104 was unsuccessful. In embodiments of the present invention, the querying for the model utilizes the identified manufacturer of the interfacing device by using communication means that are specific to interfacing devices of the identified manufacturer. In embodiments of the present invention, the querying of an interfacing device for the model of the interfacing device includes the controlling device updating its knowledge of interfacing device communication means of a particular manufacturer, by communication with the manufacturer. Such communication may be either made by a user or automatic electronic communication to update communication means records. One of ordinarily skill in the art would realize that a means for querying an interfacing device, using the identity of the manufacturer device for the identity of the model of the interfacing device could be accomplished by any process or mechanism which utilizes the manufacturer information to help decipher the model of the interfacing device.

In blocks 110 and 112, the identity of the model of the interfacing device is updated in the database if the model query is successful. One of ordinarily skill in the art would realize that the means of updating the database with the identity of the model of the interfacing device includes any kind of storage of data that can be referenced at a later time to access the model identity of the interfacing device.

Block 114 shows that the controlling device establishes a communication means for the interfacing device according to the information stored in the database. In embodiments of the present invention, the controlling device acts on behalf of other devices coupled to the controlling device on the network. In embodiments, once the controlling device has enough information so that hardware devices can interact cooperatively with the interfacing device, it communicates such information and communication means to other hardware devices so that they can communicate with the interfacing device. In embodiments of the present invention, the controlling device configures itself based on the information stored in the database.

The information stored in the database may not comprise information as to the manufacturer of the interfacing device or the model of the interfacing device, only the manufacturer of the interfacing device, or both the model and the manufacturer of the interfacing device. Based on how much information the controlling device can access from the database about the interfacing device, the controlling device can decipher communication means for cooperative interaction with the interfacing device. Depending on what information is known about the interfacing device, communication means for the interfacing device can be identified that will allow operation of the interfacing device with at least one other hardware device. One of ordinarily skill in the art would realize that a means for controlling at least one device to interface with an interfacing device according to the information stored in a database utilizes an identified relationship between the identified model or manufacturer of the interfacing device to the communication means associated with that interfacing device.

Figure 5:
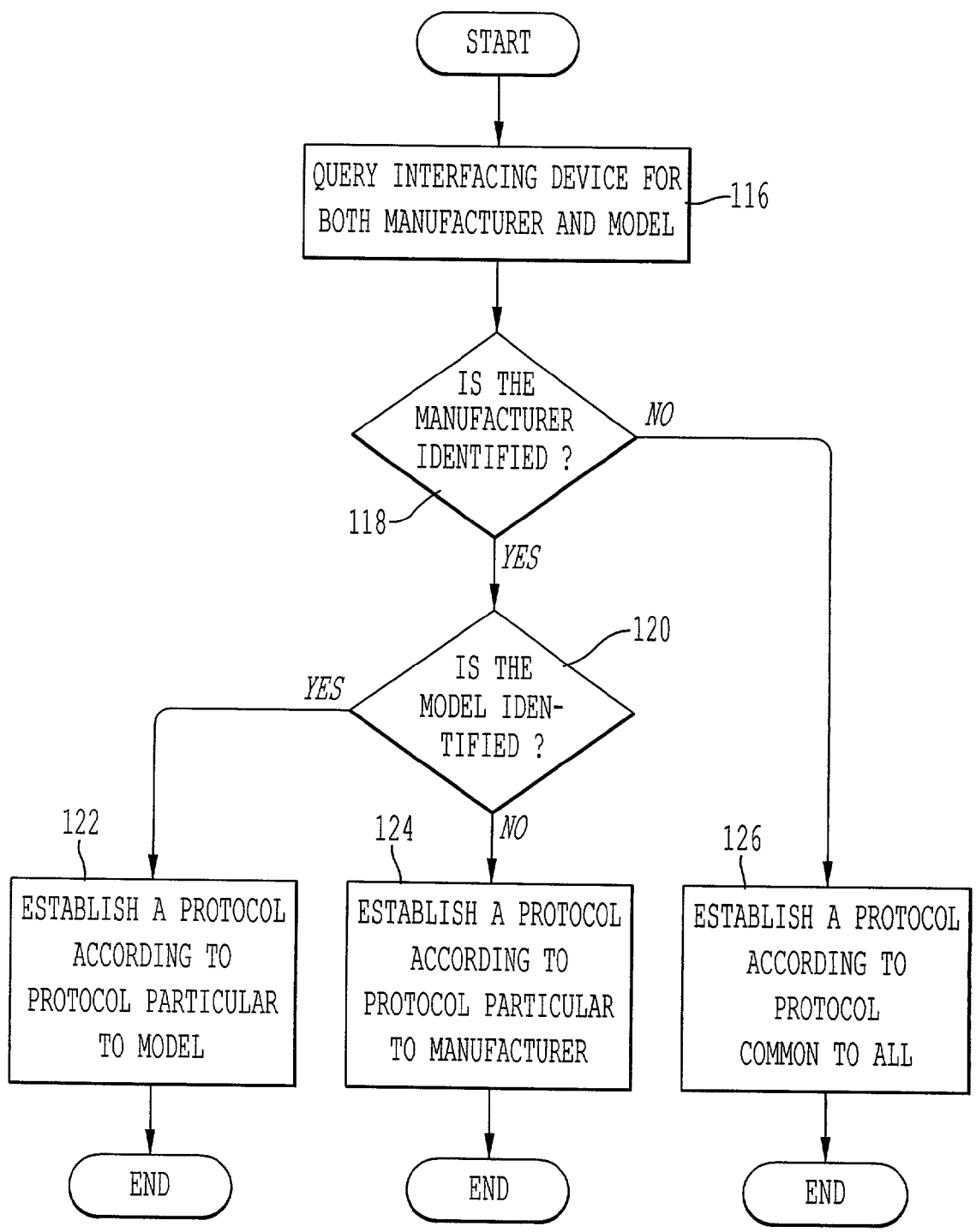

FIG. 5 is a flowchart illustrating embodiments of the present invention in which the hierarchical relationship of communication means for a device is utilized to configure a device for an interfacing device. Block 116 illustrates a controlling device querying an interfacing device for both the manufacturer and the model of the interfacing device. One of ordinary skill in the art would realize that a means for querying the interfacing device for an identity of a manufacturer and the identity of the model of the interfacing device can be accomplished by any communication means that would access information of both the manufacturer and the model of the interfacing device. Such a communication means may include sending a signal from the controlling device to the interfacing device and determining the manufacturer from the response received from the interfacing device. Querying of the interfacing device could also include only receiving a signal from the interfacing device which indicates the manufacturer and model. Further, querying the interfacing device may include analyzing signals emitted from the interfacing device which are indicative of the manufacturer of the interfacing device.

In block 118, the controlling device determines if the querying of the interfacing device identified the manufacturer of the interfacing device. If the manufacturer is identified, the process flows to block 120, which will be discussed below. If the manufacturer of the interfacing device is not identified, then it can be assumed that neither the manufacturer or the model of the interfacing device are identified by the query of the interfacing device. This is evident and apparent, as if the model of an interfacing device is identified, the manufacturer of the interfacing device is also identified. For the purposes of this patent application, the manufacturer of an interfacing device is the organization which provides customer support to the hardware. Such customer support necessarily includes the distribution of software drivers for the interfacing devices.

From block 118, if the querying of the interfacing device in block 116 does not identify either the manufacturer or the model of the interfacing device then the process flows to block 126. In block 126, the controlling device establishes a communication means for an interfacing device using a communication means that is common to all interfacing devices.

In block 120, the controlling device determines if the querying of the interfacing device identified the model of the interfacing device. If the model is identified, then the process flows to block 122, which will be discussed below. If the model is not identified, then the process flows to block 124. In block 124, the controlling device establishes a communication means for an interfacing device using a communication means that is common to all interfacing device of the manufacturer of the interfacing device.

One of ordinary skill in the art should realize that the means for establishing a communication means for an interfacing device using a communication means that is either common to all interfacing devices, common to all interfacing device of the manufacturer of the interfacing device, or a communication means that is particular to the model of the interfacing device is accomplished by any process that manipulates the communication means hierarchical of interfacing devices to maximize the functionability and usability of an interfacing device.

In block 122, the controlling device configures at least one device to interface with an interfacing device using a communication means that is particular to the model of the interfacing device.

Figure 6:
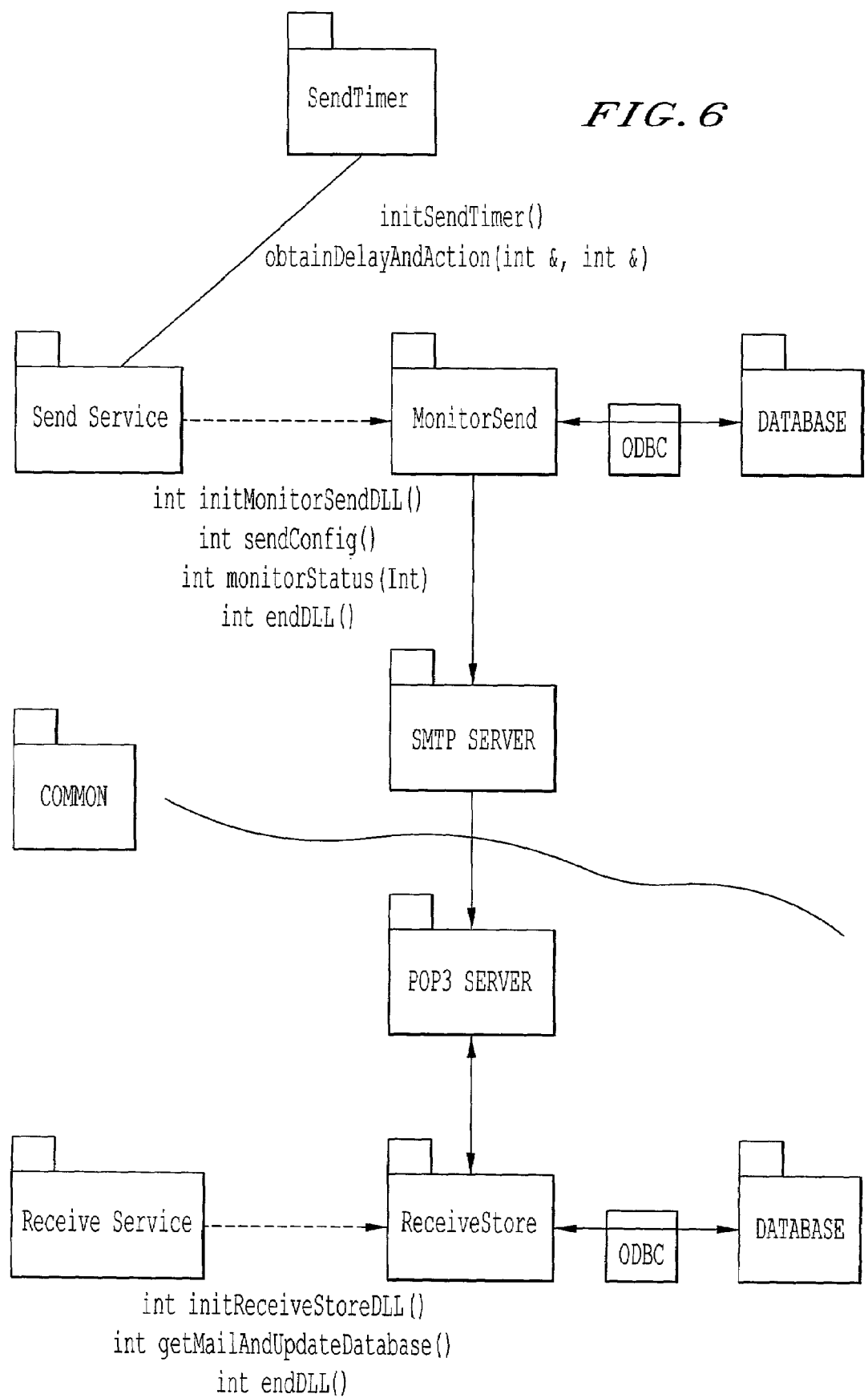
FIG. 6 illustrates an exemplary architecture of the present invention with the major interfaces of the modules.

FIG. 6 shows the major interfaces among the modules, as implemented in this exemplary architecture.

void initSendTimer (void)

This function initializes the SendTimer. In particular, this function triggers the SendTimer object to get the timing information from the registry.

void obtainDelayAndAction (int & out_nDelay, int & out_nAction)

This function returns the delay time in second for ::Sleep function (need to multiply 1000) and the action indicator (0 or 1).

int initMonitorSendDLL (void)

This function initializes the monitorSendDLL. In addition, it would create the devices to be monitored. The return int is the error code in which zero is defined as no error.

int sendConfig (void)

This function obtains the device information from ODBC and sends it. The return int is the error code in which zero is defined as no error.

int monitorStatus (int in_nAction)

This function monitors the preset information for error checking. In addition, if in_nAction is one, it will monitor additional information and send it to the destination along with storing into the local database. The return int is the error code in which zero is defined as no error.

int endDLL (void)

This function cleans up the MonitorSend DLL before closing the objects. The return int is the error code in which zero is defined as no error.

int initReceiveStoreDLL (void)

This function initializes the various parts of DLL. The return int is the error code in which zero is defined as no error.

int getMailAndUpdateDatabase (void)

This function triggers the ReceiveStore DLL to access the POP3 server to retrieve mails, to parse the retrieved mails, to delete the mails, and to store the extracted data into the database through ODBC. The return int is the error code in which zero is defined as no error.

int endDLL (void)

This function cleans up the ReceiveStoreDLL before closing the objects. The return int is the error code in which zero is defined as no error.

Figure 7:
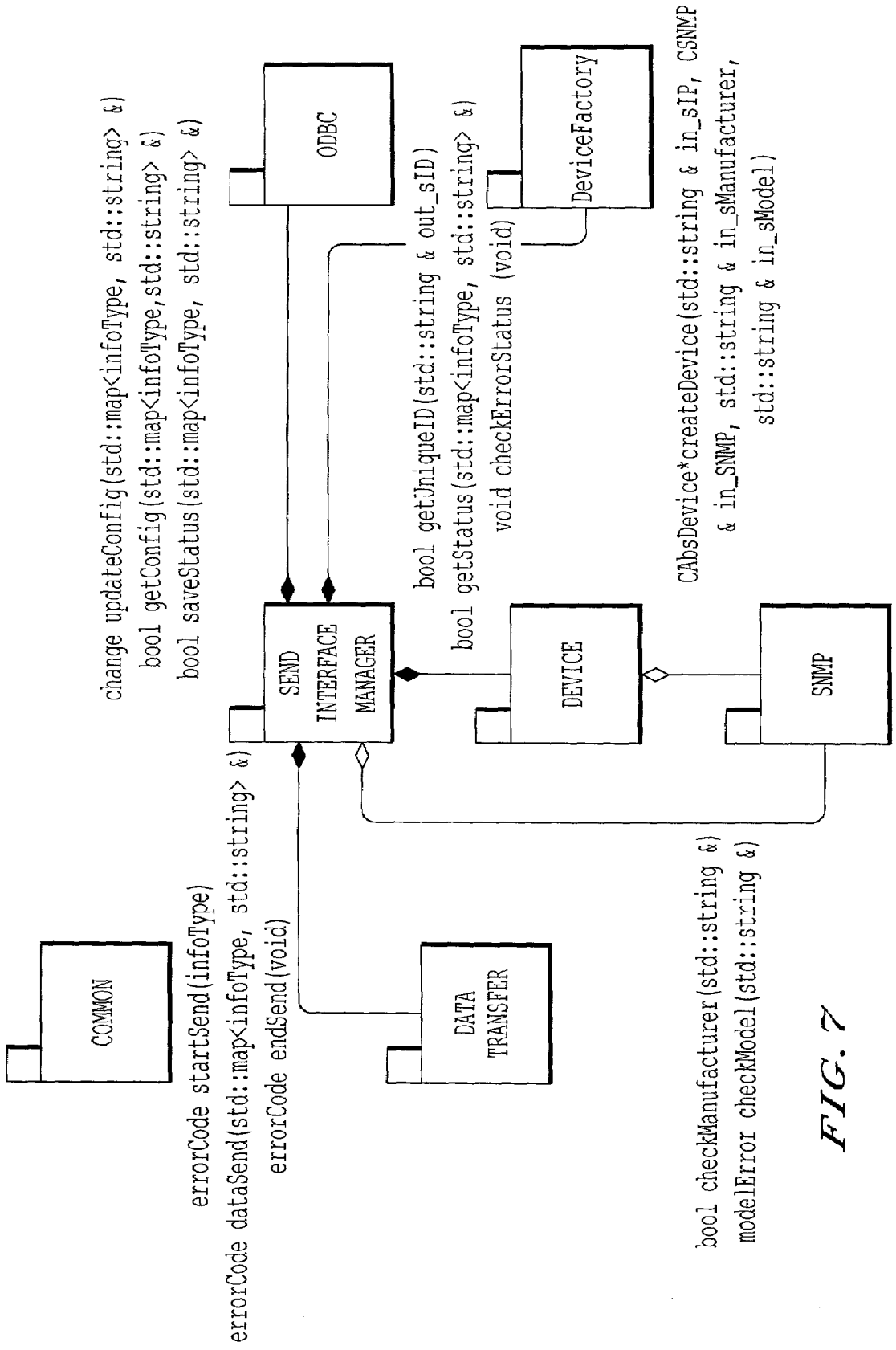
FIG. 7 illustrates the MonitorSend DLL configuration according to one exemplary implementation of the present invention.

FIG. 7 shows an overview of Monitor_Send DLL configuration according to one exemplary implementation of the present invention. The functions included in the Monitor_Send DLL package, as shown in FIG. 7, are described below:

change updateConfig(std::map<infoType, std::string>&)

This function updates the device information database of the current record in the ODBC. This function keys on IP address and Unique ID for the update purpose. This function is primarily used to add unique ID and to update the manufacturer and model if they are incorrectly assigned to the device at the IP address for MonitorSend Package. If there is no record with IP address and Unique ID, this function adds the passed data into the database. If the Unique ID exists, but IP address is changed, it will update IP address. The return value change is enum {NoChange=0, UpDateRecord, AddRecord, ChangeIPaddress}.

bool getConfig(std::map<infoType, std::string>&)

This function obtains the map from ODBC for the device information in the given format. The function returns true if there is data returned, false if there is no more data.

bool saveStatus(std::map<infoType, std::string>&)

This function saves the status information into the ODBC. The function returns true when saving is successful, false otherwise.

bool checkManufacturer(std::string&)

This function checks the passed manufacturer to be correct for the IP address. If the Manufacturer is correct, the function returns true, otherwise, it returns false and returns the correct manufacturer in the string.

modelError checkModel(std::string&)

This function checks the passed model to be correct for the IP address. ModelError is enum type with {ModelNoError=0, WrongModel, ModelInformationUnavailable}. If WrongModel is detected, the correct model name is put in the returned string.

CAbsDevice*createDevice (std::string & in_sIP, CSNMP & in_SNMP, std::string & in_sManufacturer, std::string & in_sModel)

This function creates the device of the specification in the Device Factory. The function returns the pointer to the created device if the creation is successful, 0 otherwise. The last two parameters has null strings as defaults.

bool getUniqueID (std::string & out_sID)

This function returns the unique ID from device. The function returns true if the Unique ID is returned, false otherwise.

bool getStatus (std::map<infoType, std::string>&)

This function obtains status information from a device. The function returns true when the status is returned, false when status could not be obtained. This function resets the variable that keeps the error status before returning.

void checkErrorStatus (void)

This function triggers the device to check the error status to be saved internally.

errorCode startSend (infoType)

This function triggers the Data Transfer to prepare for sending the data specified in the infoType. The function returns the errorCode.

errorCode dataSend (std::map<infoType, std::string>&)

This function in the Data Transfer sends the received data to the appropriate destination after properly formatting, encrypting and encoding. The function returns the errorCode.

errorCode endSend (void)

This function in the Data Transfer ends the data sending. The function returns the errorCode.

Figure 8:
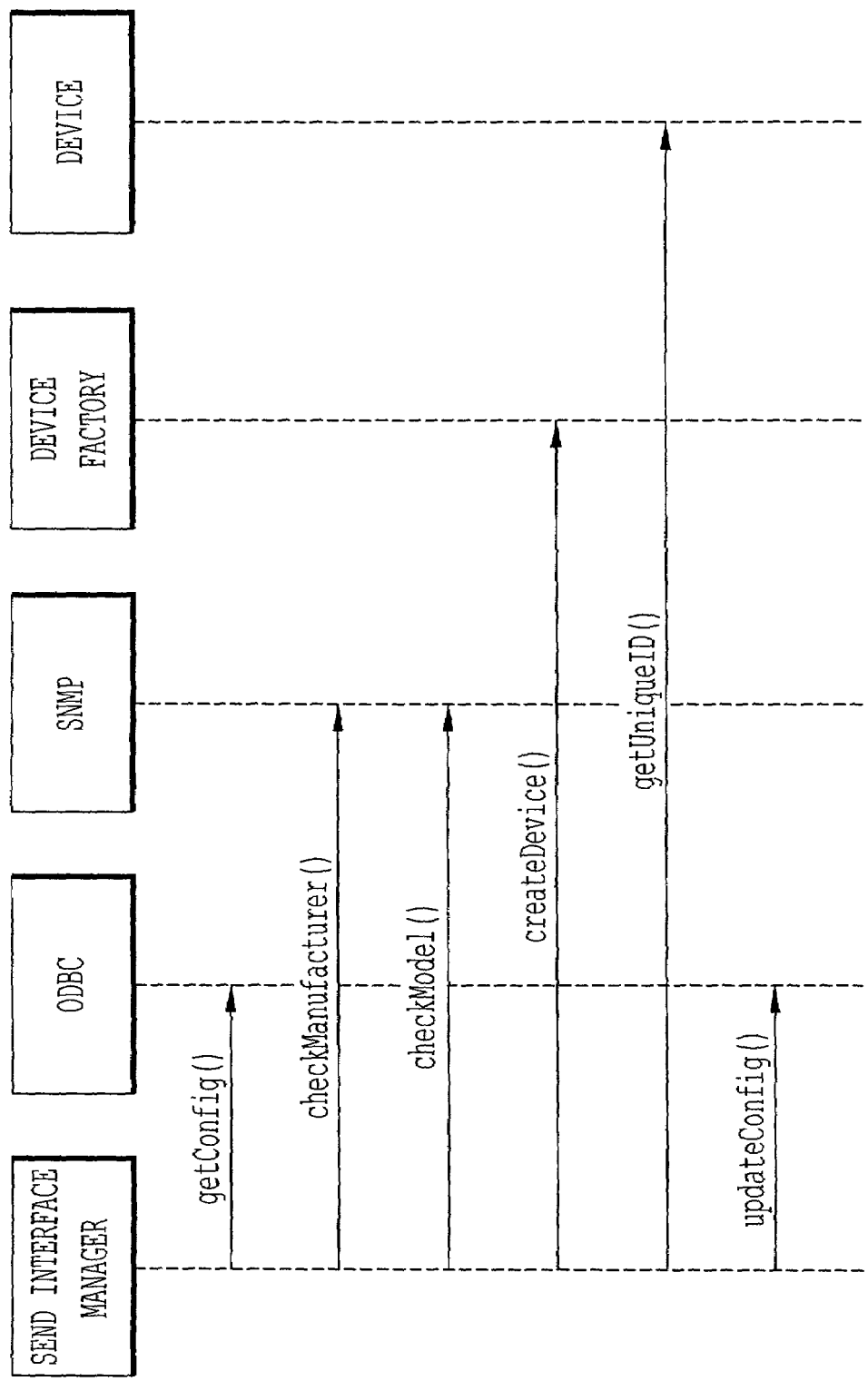
FIG. 8 illustrates the MonitorSend Intialization Sequence according to one exemplary implementation of the present invention.

FIG. 8 shows the MonitorSend Intialization Sequence, as implemented in this exemplary architecture.

Figure 9:
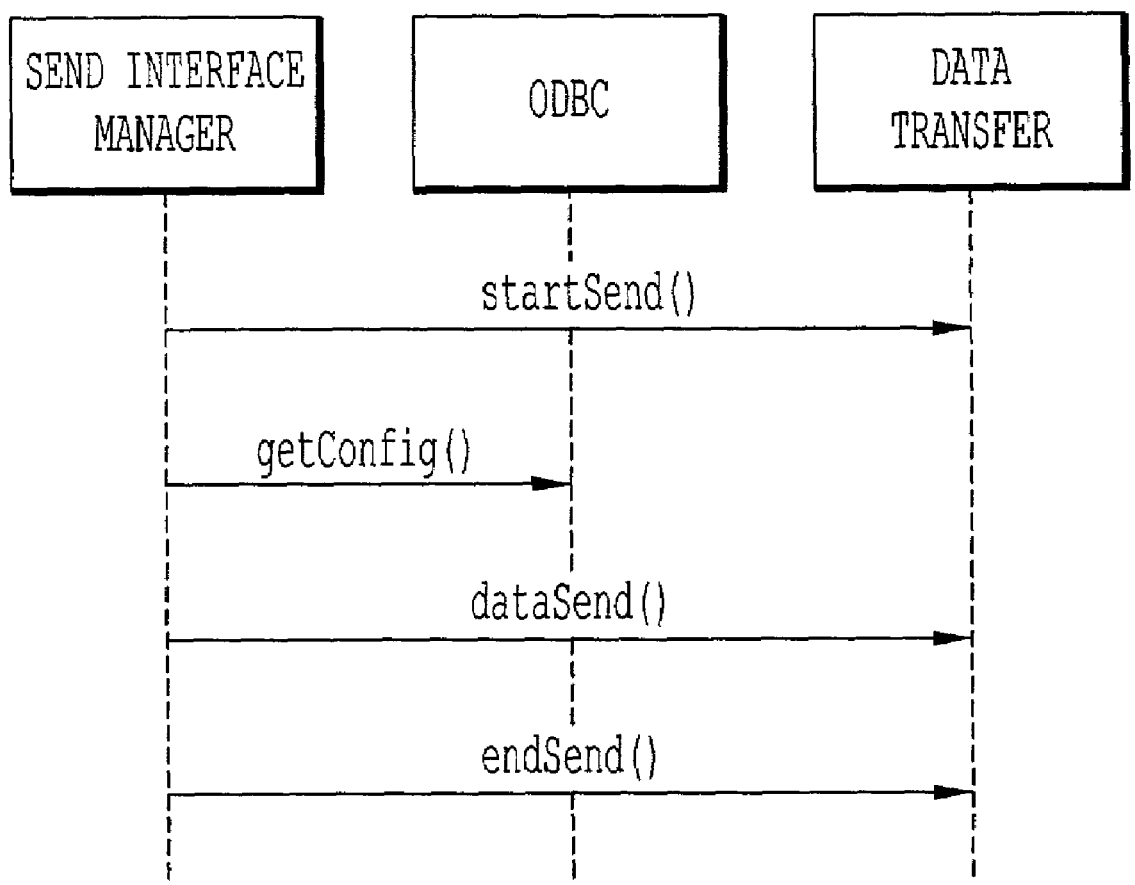
FIG. 9 illustrates the Sending Configuration Sequence according to one exemplary implementation of the present invention.

FIG. 9 shows the Sending Configuration Sequence, as implemented in this exemplary architecture.

Figure 10:
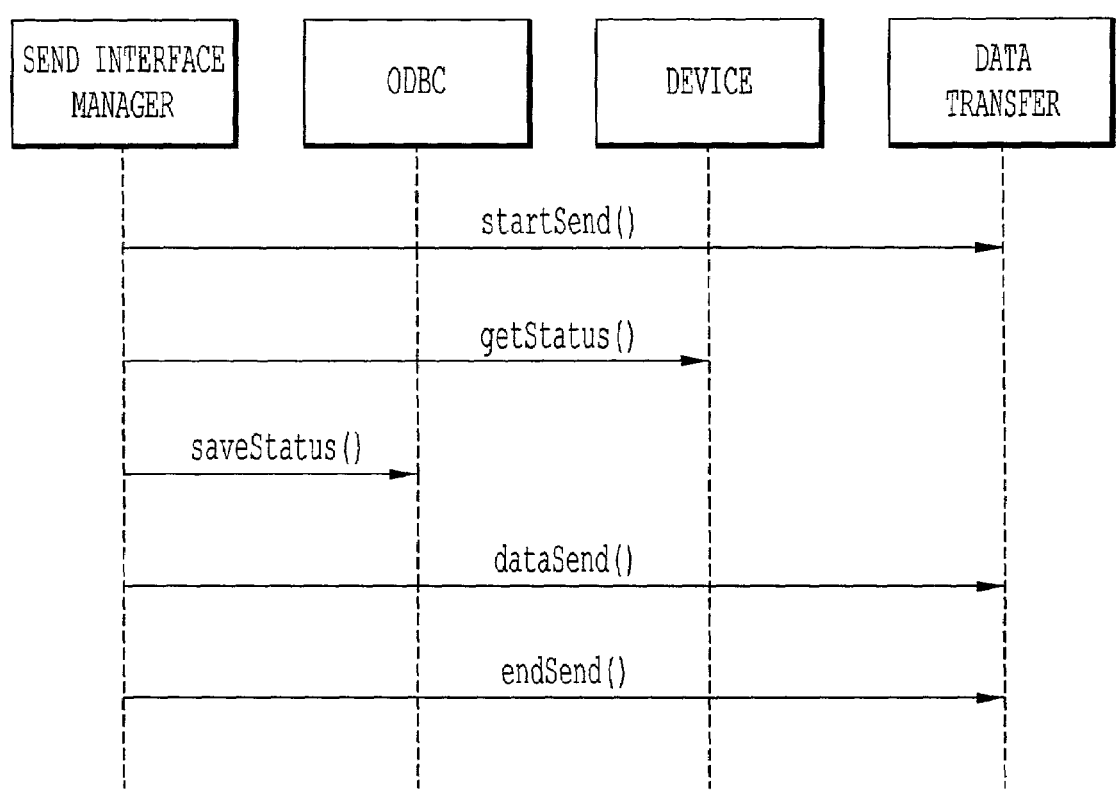
FIG. 10 illustrates the Sending Status Sequence according to one exemplary implementation of the present invention.

FIG. 10 shows the Sending Status Sequence, as implemented in this exemplary architecture.

Figure 11:
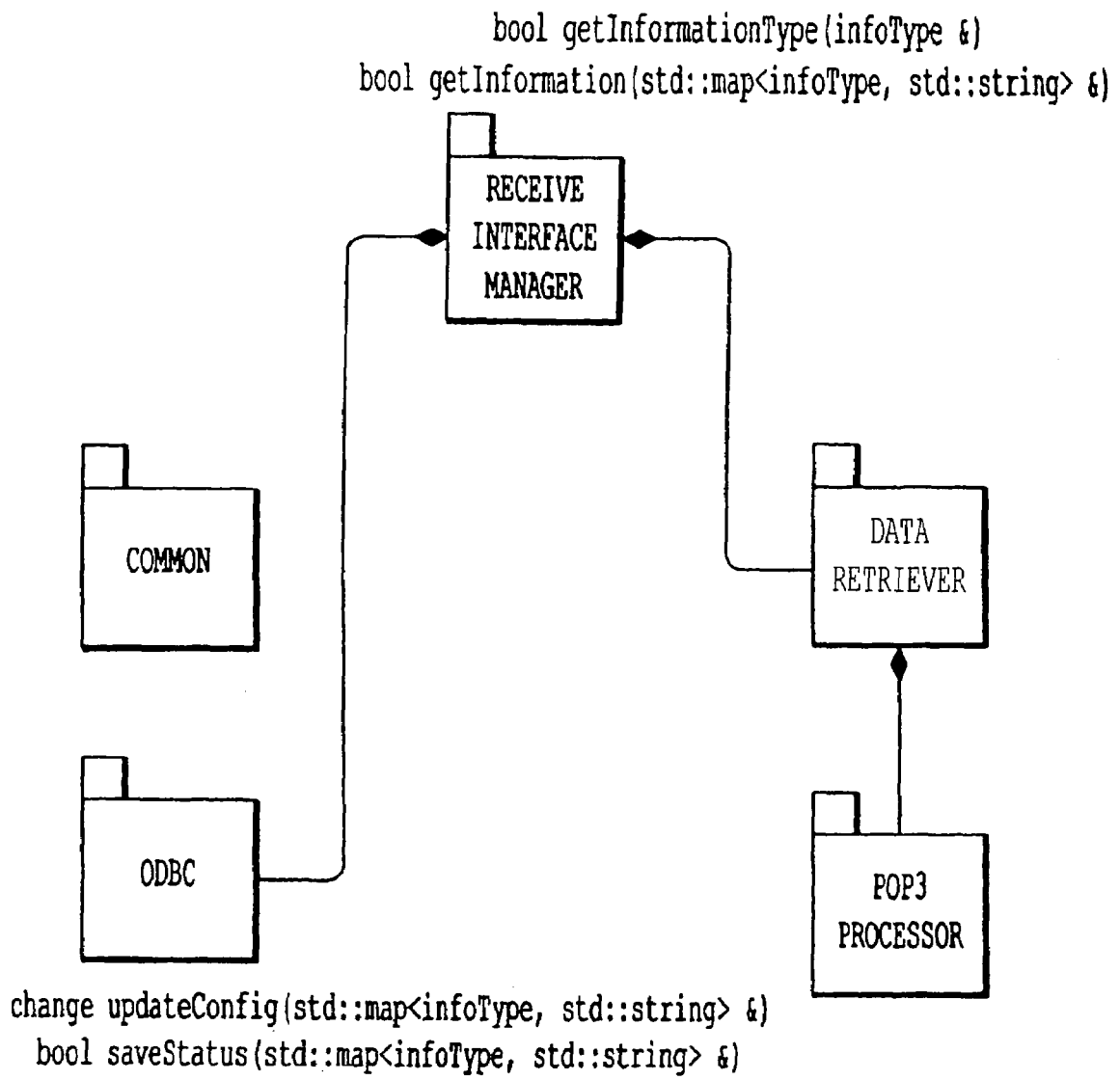
FIG. 11 illustrates the ReceiveStore DLL configuration according to one exemplary implementation of the present invention.

FIG. 11 shows an overview of ReceiveStore DLL configuration according to one exemplary implementation of the present invention. The functions included in the ReceiveStore DLL package, as shown in FIG. 11, are described below:

bool getInformationType(infoType &)

This function triggers the DataRetriever to try to obtain the POP3 data and determines the data type of the obtained email. The function returns true when the e-mail is obtained, false when no more e-mail is in POP3 server at the time.

bool getInformation(std::map<infoType, std::string>&)

This function retrieves from DataRetriever the information content of the e-mail. The function returns true when the information is returned, false when no more data set is available in the email message.

change updateConfig(std::map<infoType, std::string>&)

This function updates the device information database of the current record in the ODBC. This function keys on IP address and Unique ID for the update purpose. This function is primarily used to add unique ID and to update the manufacturer and model if they are incorrectly assigned to the device at the IP address for ReceiveStore Package. If there is no record with IP address and Unique ID, this function adds the passed data into the database. If the Unique ID exists, but IP address is changed, it will update IP address. The return value change is enum {NoChange=0, UpDateRecord, AddRecord, ChangeIPaddress}.

bool saveStatus(std::map<infoType, std::string>&)

This function saves the status information into the ODBC. The function returns true when saving is successful, false otherwise.

Table 1 shows the data structure and how it reflects the information regarding one monitored device. The data structure contains the e-mail address of the contact person in addition to the telephone number. This data structure is not used currently. However, this structure reflects the database structure.

TABLE 1

| Type | Name | Description |
| --- | --- | --- |
| std::string | m_sManufacturer | A string representing the manufacturer of the network printer. |
| std::string | m_sModel | A string representing the model of the network printer. |
| std::string | m_sUniqueID | A string representing the Unique ID of the network printer. This ID may be a serial number or MAC Address or any unique ID obtainable from the network printer. |
| std::string | m_sIPAddress | A string representing the IP Address of the network printer. |
| std::string | m_sCompanyName | A string representing the name of the company which owns the network printer. |
| std::string | m_sStreet | A string representing the street address of the company. |
| std::string | m_sCity | A string representing the city where the company is located. |
| std::string | m_sState | A string representing the state where the company is located. |
| std::string | m_sZipCode | A string representing the zip code of the company. |
| std::string | m_sLocation | A string representing the location of the network printer within the company. |
| std::string | m_sContactPerson | A string representing the name of the contact person responsible for the network printer. |
| std::string | m_sPhoneNumber | A string representing the phone number of the contact person. |
| std::string | m_sEMailAddress | A string representing the e-mail address of the contact person. |

The following section describes the major enum types used in the system.

infoType

This section describes the definition of the infoType enum at this writing. As the project progresses, more infoType values can be added. The value range 0 through 99 is assigned to the data type. The value range 100 to 499 is assigned to Device Information. The value range 500 to 999 is assigned to the common parameters and standard MIB parameters. The range 1000 to 2999 is assigned to Ricoh specific information. The range 3000 to 3999 is assigned to Xerox. The range 4000 to 4999 is assigned to Lexmark. The range 5000 to 5999 is assigned to EPSON. The range 6000 to 6999 is assigned to HP. The values are defined as follows:

enum infoType {NotDefine=0, DeviceInformation, StatusInformation, Manufacturer=100, Model, UniqueID, IPAddress, CompanyName, Street, City, State, ZipCode, Location, ContactPerson, PhoneNumber, EMailAddress, DateTime=500, HrDeviceErrors, LowPaper, NoPaper, LowToner, NoToner, DoorOpen, Jammed, Offline, ServiceRequested, PrtGeneralConfigChanges, PrtLifeCount, PrtAlertDesc1, PrtAlertDesc2, PrtAlertDesc3, PrtAlertDesc4, PrtAlertDesc5, RicohEngineCounterTotal=1000, RicohEngineCounterPrinter, RicohEngineCounterFax, RicohEngineCounterCopier, XeroxYellowTonerCartridge=3000, XeroxMagentaTonerCartridge, XeroxCyanTonerCartridge, XeroxBlackTonerCartridge, XeroxPrinterCartridge}.

errorCode

This section describes the error codes defined at this writing. As the project progresses, more error codes can be added. The range 0-99 is reserved. The range 100-199 is for SMTP, 200-299 is for POP3 and 300-399 is for Socket. The other range shall be defined if needed. enum errorCode(NoError=0, UnknownError=1, SendHelloCommandFailed=100, SendMailCommandFailed, SendRcptCommandFailed, SendDataCommandFailed, SendDataFailed, SendQuitCommandFailed, SendUserCommandFailed=200, SendPassCommandFailed, SendStatCommandFailed, SendRetrCommandFailed, SendDeleCommandFailed, SendQuitPop3CommandFailed, CreateSocketFailed=300, ConnectSocketFailed)).

Send Interface Manager Package illustrated in the FIG. 7 has one class that manages all operations of the system. The class CSendInterfaceManager contains the public and private functions shown in the Table 2.

TABLE 2

Public and Private Functions of CSendInterfaceManager

| | Functions | Descriptions |
|---|---|---|
| Public | CsendInterfaceManager( ) | Constructor |
| | ~CsendInterfaceManager( ) | Destructor |
| | int initMonitorSendDLL(void) | Initialization Function. Creates all the device objects that will communicate with all the devices that are monitored. |
| | int sendConfig(void); | Send the Configuration of the devices via email. |
| | int monitorStatus(int in_nAction) | Either monitor status or monitor status of the devices and send the collected data via email according to the in_nAction. |
| | int endDLL( ) | End the monitor. |
| Private | void convertToAllUpper(std::string & inOut_sString) | Convert the characters in the string to upper case. |
| | void setManufacturerAndModels(void) | This function gets manufacturer and models information from m_FactoryInterface and put them into m_ManufacturerAndModelMap. This function determines which manufacturer and model are supported by this system. |

Table 3 shows the attributes of the CSendInterfaceManager class that are used in the above functions.

TABLE 3

Attributes of CSendInterfaceManager

| Type | Attribute Name | Description |
|---|---|---|
| CODBC* | m_pODBC | This attribute is used to access Database. The pointer is created in the constructor and destroyed in endDLL. |
| CFactoryInterface | m_FactoryInterface | This attribute is used to create device objects. |
| CDataTransfer | m_DataTransfer | This attribute is used to send the information via email. |
| CSNMP | m_SNMP | This attribute implements the SNMP protocol with the devices. |

TABLE 3-continued

Attributes of CSendInterfaceManager

| Type | Attribute Name | Description |
|---|---|---|
| std::vector<std::auto_ptr<CAbsDevice>> | m_DeviceVector | This attribute keeps the created device objects and uses them to obtain status information about the devices. |
| std::map<std::string, std::vector<std::string>> | m_ManufacturerAndModel Map | This attribute keeps the manufacturer and models. Strings are converted to all upper case. |

All except the last two attributes are interface objects from the packages that interact with Send Interface Manager package in FIG. 7.

Figure 12:
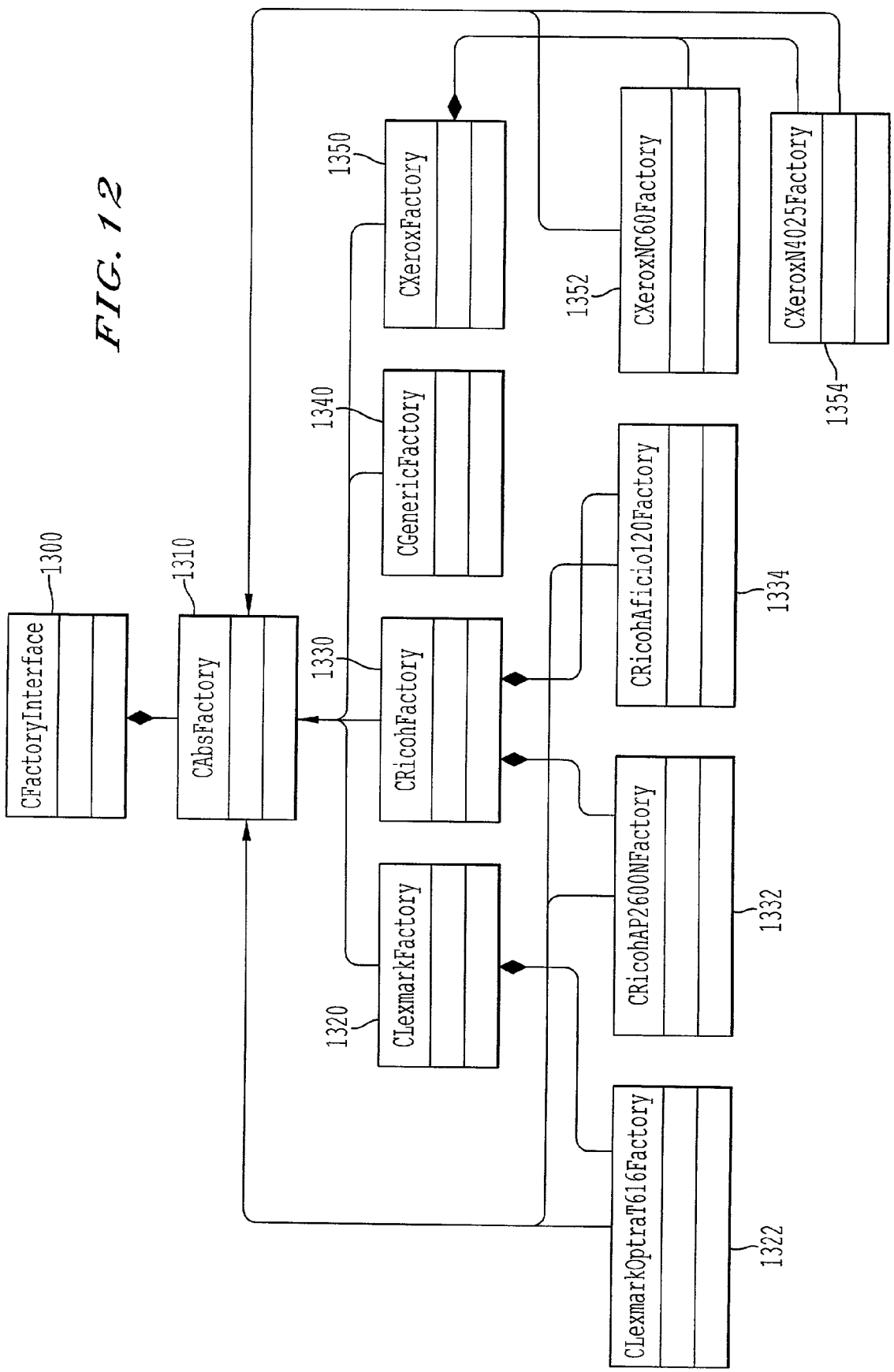
FIG. 12 illustrates an exemplary class structure inside of the DeviceFactory Package (Module).
Figure 13:
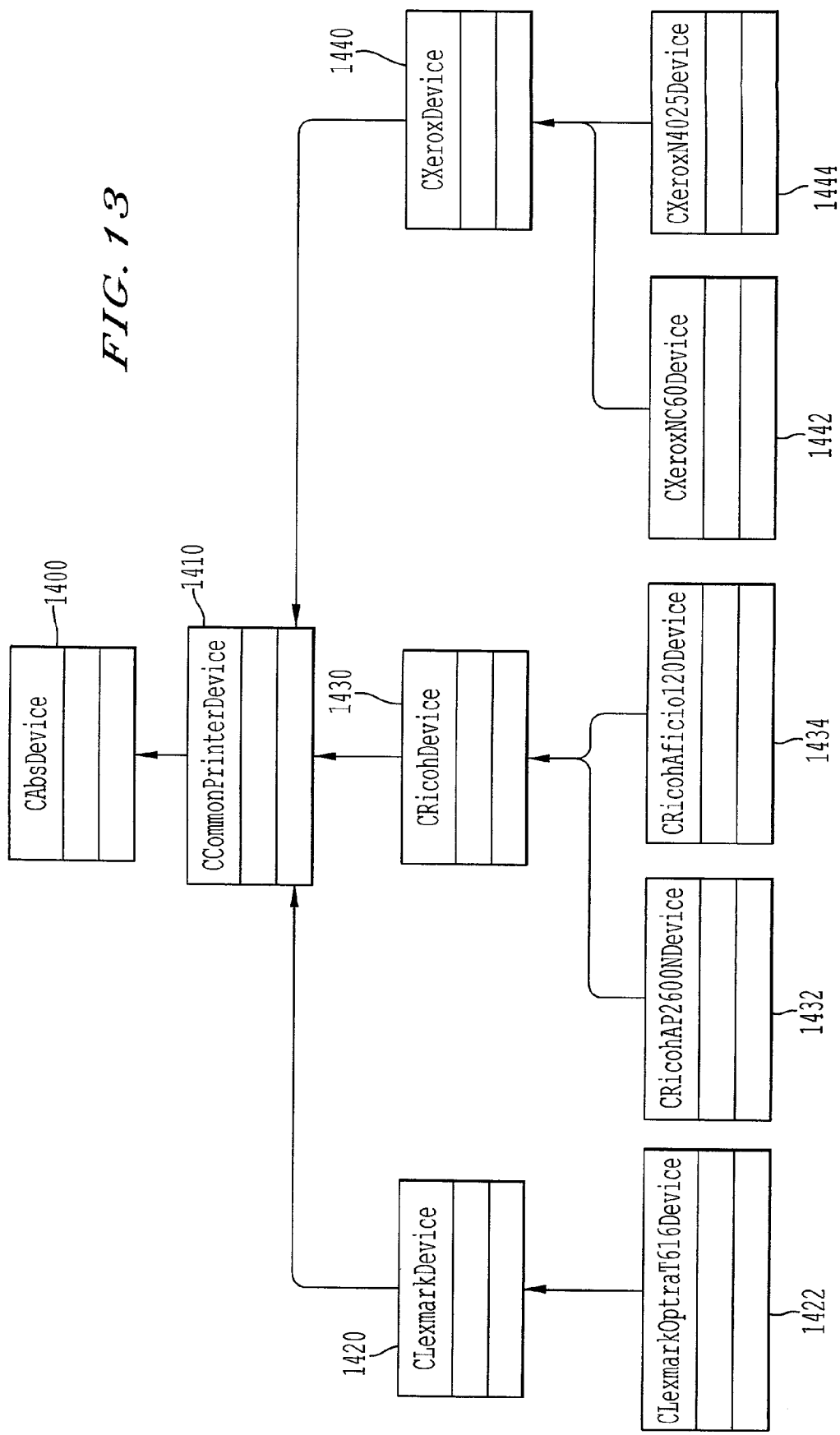
FIG. 13 illustrates an exemplary class structure of the Device Package (Module).

FIG. 12 illustrates an exemplary class structure of the DeviceFactory Package (Module). The CFactoryInterface (1300) class is the interface for the DeviceFactory Package. It provides the interface function for creating the device object that represents the device. The device object is used to communicate with the device so that information can be obtained from the device. The CAbsFactory (1310) class is an abstract class that provides the virtual interface function to create the device object. CAbsFactory (1310) class does not provide the method for creating the device object. The classes derived from CAbsFactory (1310) class provide the actual function to create the device object. Thus the classes derived from CAbsFactory (1310) are CRicohFactory (1330), CXeroxFactory (1350), CLexmarkFactory (1320), and CGenericFactory (1340). Each of these derived factory classes can create a device object corresponding to the manufacturer of the device. For example, CRicohFactory (1330) can create a device object CRicohDevice (1430) as shown in FIG. 13. Each of the factory classes corresponding to the manufacturer contains factory classes derived from CAbsFactory (1310) corresponding to the actual model of the device. For example, CRicohFactory (1330) contains the classes CRicohAP2600NFactory (1332) and CRicohAficio120Factory (1334). The factory classes corresponding to the models create device objects for the models. The CFactoryInterface (1300) receives an instruction to create a device object from CSendInterfaceManager class. The CSendInterfaceManager class passes information into the function of CFactoryInterface (1300) about what device object to create. Then CFactoryInterface (1300) calls the appropriate function of the abstract class CAbsFactory (1310). The abstract class CAbsFactory (1310) defines two interface functions to be defined in the derived class. Table 4 shows the public functions of CAbsFactory (1310).

TABLE 4

Public Functions of CAbsFactory (1310)

| Function Name | Description |
|---|---|
| CAbsFactory( ) | Constructor |
| virtual ~CAbsFactory( ) | Virtual Destructor |
| virtual CAbsDevice * createDevice(std::string & in_sIP, CSNMP & in_SNMP, std::string & in_sManufacturer, std::string & in_sModel)=0; | Function to create device object from the input parameters. The function is not defined in this class. Derived classes must define this function. |
| virtual void getManufacturerAndModel(std::string & out_sManufacturer, std::vector<std::string> & out_ModelVector)=0; | Function to get the Manufacturer name and vector of supported models. The function is not defined in the class. Derived classes must define this function. |

The CFactoryInterface (1300) class checks the manufacturer for which it needs to create a device object and calls the appropriate manufacturer factory (i.e. CRicohFactory (1330), CXeroxFactory (1350), or CLexmarkFactory (1320)) to create the device object. If no manufacturer is recognized (i.e. HP or Canon), it will call a function of the class CGenericFactory (1340) that will create a device object that can be used to communicate with the device of any manufacturer. CGenericFactory (1340) will create a device object CCommonPrinterDevice (1410) illustrated in FIG. 13. CCommonPrinterDevice (1410) is a device object that can be used to communicate with a device of any manufacturer to obtain information about that device.

CLexmarkFactory (1320), CRicohFactory (1330), and CXeroxFactory (1350) create the devices of CLexmarkDevice (1420), CRicohDevice (1430), and CXeroxDevice (1440) illustrated in FIG. 13, respectively. The device objects for these classes can provide more information about the device than the device object of CCommonPrinterDevice (1410). These device objects will communicate with the device to obtain manufacturer specific information. For example, a device object of CLexmarkDevice (1420) can be used to obtain information associated with the manufacturer of Lexmark.

CLexmarkOptraT616Factory (1322), CRicohAP2600NFactory (1332), CRicohAficio120Factory (1334), CXeroxNC60Factory (1352) and CXeroxN4025Factory create the devices of CLexmarkOptraT616Device (1422), CRicohAP2600NDevice (1432), CRicohAficio120Device (1434), CXeroxNC60Device (1442) and CXeroxN4025Device (1444) illustrated in FIG. 13. The device objects for these classes can provide even more information about the device that the device objects of its corresponding manufacturer device objects. These device objects will communicate with the device to obtain manufacturer and model specific information. For example, a device object of CLexmarkOptraT616Device (1422) can be used to obtain information associated with the manufacturer of Lexmark and the model of Optra T616.

FIG. 13 illustrates an exemplary class structure of the Device Package (Module). The CAbsDevice (1400) class contains 13 public functions that are used by other packages (modules), three of which are pure virtual functions (assigned to 0). The CAbsDevice (1400) class is an abstract class that provides the virtual interface functions to obtain information about the device. CAbsDevice (1400) class does not provide the method for obtaining the information. The classes derived from CAbsDevice (1400) class provide the actual function to obtain the information. CCommonPrinterDevice (1410) is a class derived from CAbsDevice (1400). CCommonPrinterDevice (1410) represents a device object that can be used to communicate with a device of any manufacturer to obtain information about that device. CCommonPrinterDevice (1410) can be used to obtain information that is common to all devices. CLexmarkDevice (1420), CRicohDevice (1430), and CXeroxDevice (1440) are all classes derived from CCommonPrinterDevice (1410). CLexmarkDevice (1420), CRicohDevice (1430), and CXeroxDevice (1440) represent device objects that can be used to communicate with devices of the manufacturers Lexmark, Ricoh, and Xerox, respectively, to obtain manufacturer specific information about the devices. Since CLexmarkDevice (1420), CRicohDevice (1430), and CXeroxDevice (1440) are derived from CCommonPrinterDevice (1410), they can also obtain information that is common to all devices. CLexmarkOptraT616Device (1422) is a class derived from CLexmarkDevice (1420), CRicohAP2600NDevice (1432) and CRicohAficio120Device (1434) are classes derived from CRicohDevice (1430), and CXeroxNC60Device (1442) and CXeroxN4025Device (1444) are classes derived from CXeroxDevice (1440). These derived classes represent device objects that can be used to communicate with devices of the models to obtain model specific information about the device. Since these classes are derived from the manufacturer specific device classes, they can also obtain information that is manufacturer specific and information that is common to all devices.

Table 5 shows the public functions of CAbsDevice (1400).

This abstract class also contains the attributes common among all the devices.

Table 6 shows the attributes of the CAbsDevice (1400) class.

TABLE 6

| Type | Attribute Name | Description |
| --- | --- | --- |
| std::string | m_sIPAddress | This attribute is IP address to be used for SNMP. |
| CSNMP & | m_SNMP | This attribute is SNMP object through which connection to the actual device is established. |
| std::string | m_sUniqueID | This attribute is the unique ID for the device. |
| char | m_cError | This attribute is to keep the error bits. |

FIGS. 14A through 14D is a flowchart that shows the exemplary initialization process when executing the initMonitorSendDLL( ) function of CSendInterfaceManager. The flowchart shows the C++ code used to implement this function. Steps 1503 and 1506 initialize the local variables used in the initialization. In step 1509, the configuration information about a device is obtained from the database. The configuration information is stored in a map structure. The configuration information of a device includes the manufacturer, model, and IP address of the device. If the configuration information cannot be obtained from the database, then go to step 1587. Step 1587 will be discussed later. In steps 1512 and 1515, using the IP address of the device, make an SNMP connection to the device. If the connection fails, then set error status of the initialization to SomeDeviceCreationError in step 1518 and get the configuration information for the next device in the database in step 1509. If the connection is successful, check the manufacturer of the device using the SNMP connection in steps 1521 and 1524. In step 1527 if the SNMP connection is unable to obtain the manufacturer name of the device, then get the configuration information for the next device in the database in step 1509. If the manufacturer

TABLE 5

| Functions | Description |
| --- | --- |
| CAbsDevice(std::string in_sIPaddress, CSNMP & in_SNMP) | Constructor with parameters to initialize the attributes |
| virtual ~CAbsDevice( ) | Destructor |
| virtual bool getUniqueId(std::string & out_sID)=0 | Virtual function to get unique ID |
| virtual bool getStatus(std::map<infoType, std::string> & out_StatusInformation)=0 | Virtual function to get status information |
| virtual void checkErrorStatus(void)=0 | Virtual function to check the error status |
| void setUniqueIDValue(std::string in_sIDValue) | Set the unique ID of the device. |
| std::string getUniqueIDValue(void) | Get the unique ID of the device |
| CSNMP & getSNMP(void) | Get the reference to SNMP object |
| std::string & getIPaddress(void) | Get the reference to the IP address of the device |
| void setErrorByte(char in_cError) | Set the Error Byte code |
| char getErrorByte(void) | Get the Error Byte code |
| bool setAgent(void) | Starts the SNMP agent at the IP address |
| std::string getStringValueForOID(std::string in_sOID) | Return the string value found by GetNext SNMP command for the passed Object Identifier (OID) |
| std::string getStringValueForOID(void) | Return the string value found by the GetNext Command of SNMP |
| bool closeAgent(void) | Closes the connection of SNMP | name of the device can be obtained, then in steps 1530 and 1533 verify that the manufacturer is supported by the system and set the manufacturer name in the map containing the configuration information.

Figure 14B:
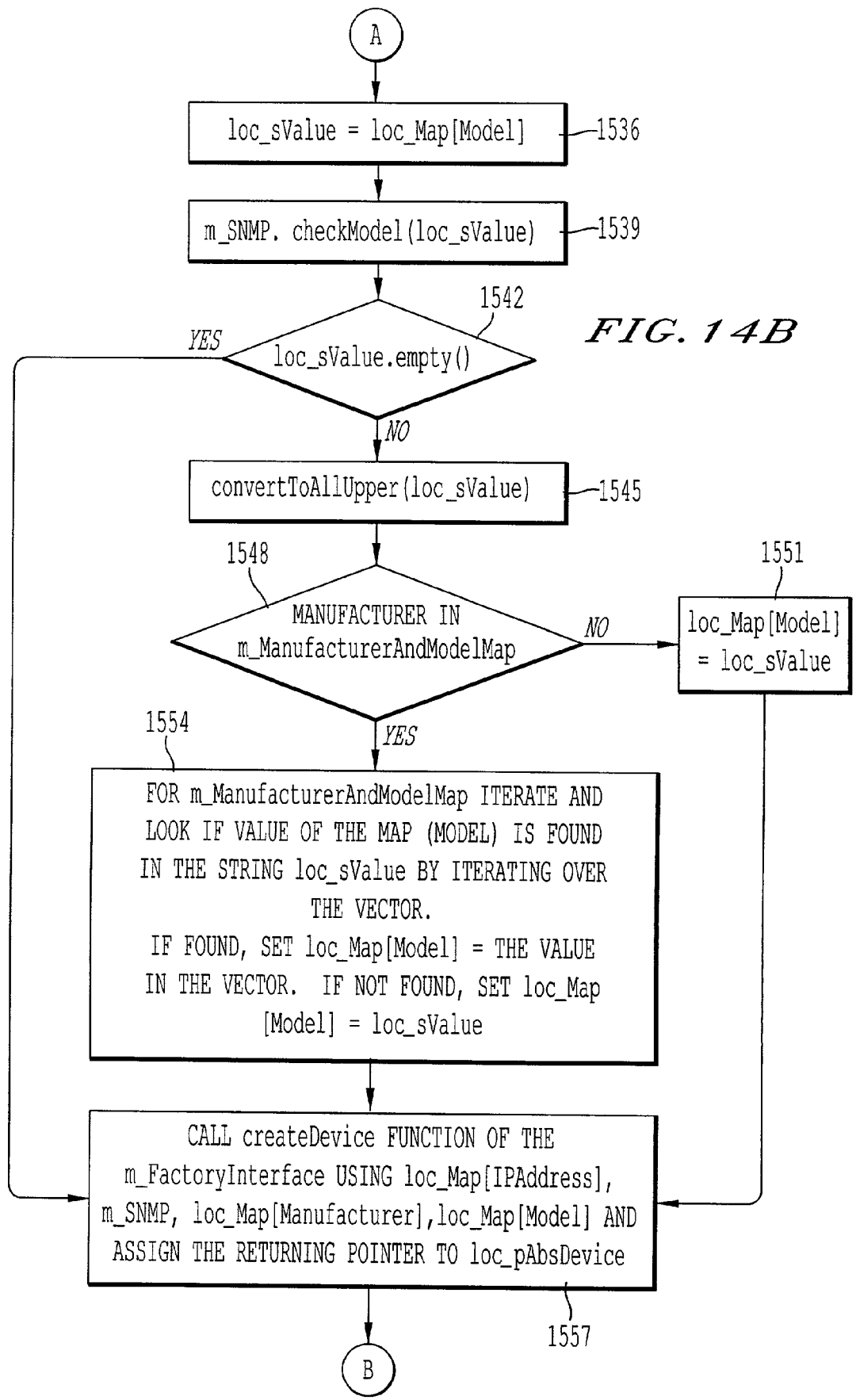
FIG. 14B is a flowchart that shows the exemplary initialization process when executing the initMonitorSendDLL( ) function of CSendInterfaceManager.

In steps 1536 and 1539 of FIG. 14B, check the model of the device using the SNMP connection. In step 1542 if the SNMP connection is unable to obtain the model name of the device, then go to step 1557. Step 1557 will be discussed later. If the model name of the device can be obtained, then in steps 1545 and 1548 check if the manufacturer obtained previously is supported by the system. If the manufacturer is not supported by the system, then set the model name in the map containing the configuration information in step 1551. If the manufacturer obtained previously is supported by the system, then verify that the model is supported by the system and set the model name in the map containing the configuration information in step 1554. With the information about the IP address, manufacturer, and model of the device, create the device object for the device in step 1557.

Figure 14C:
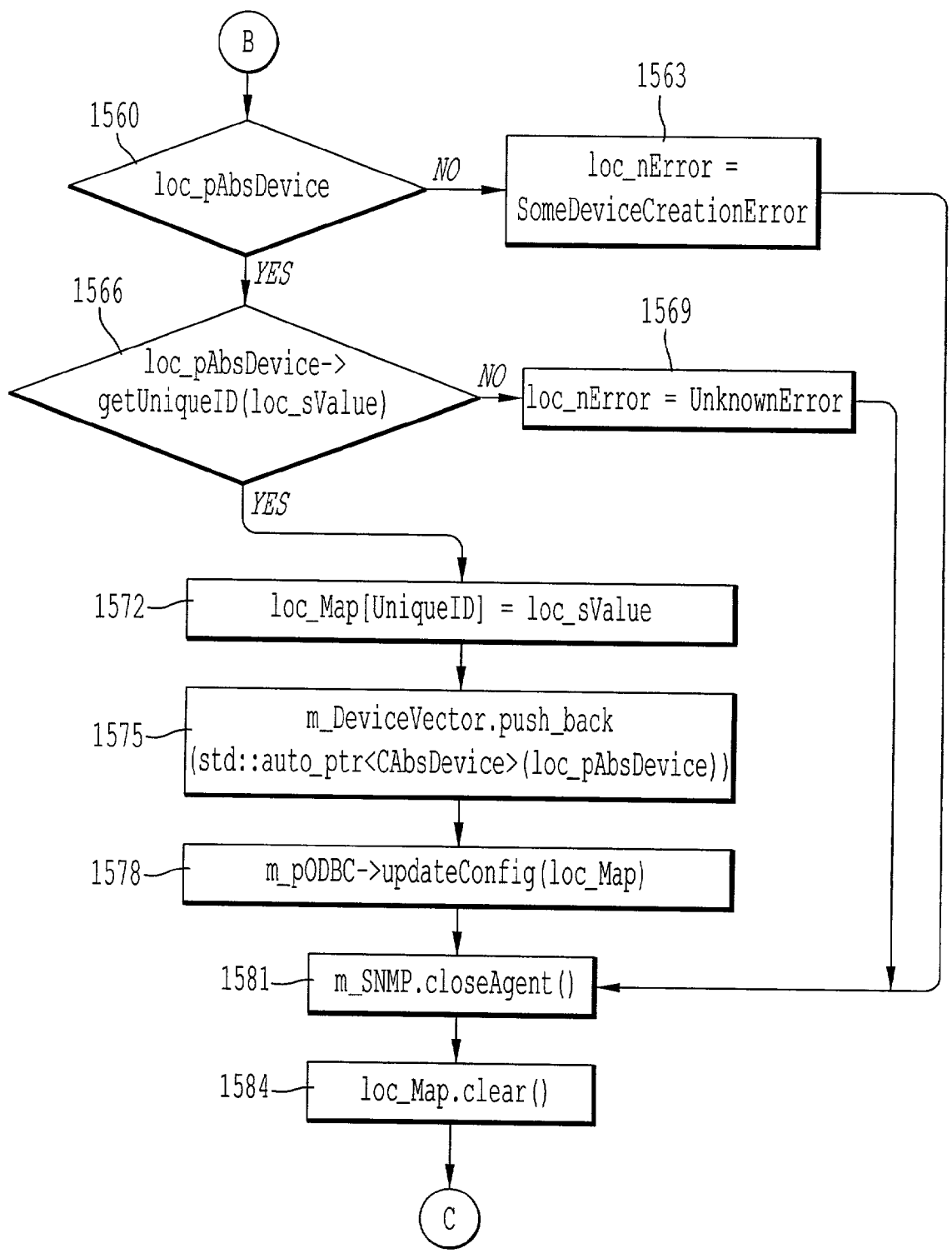
FIG. 14C is a flowchart that shows the exemplary initialization process when executing the initMonitorSendDLL( ) function of CSendInterfaceManager.

Step 1560 of FIG. 14C checks if the device object has been created for the device. If the device object cannot be create for the device, then set the error status of the initialization to SomeDeviceCreationError in step 1563 and go to step 1581. Step 1581 will be discussed later. If the device object can be created for the device, then obtain the unique identification for the device in step 1566. If the unique identification cannot be obtained then set the error status of the initialization to UnKnownError in step 1569 and go to step 1581. If the unique identification can be obtained, then in steps 1572, 1575, and 1578 set the unique identification in the map containing the configuration information and update the configuration information in the database for the device. In step 1581, close the SNMP connection to the device. In step 1584, clear the map that contains configuration information about the device and get the configuration information for the next device in the database in step 1509.

Figure 14D:
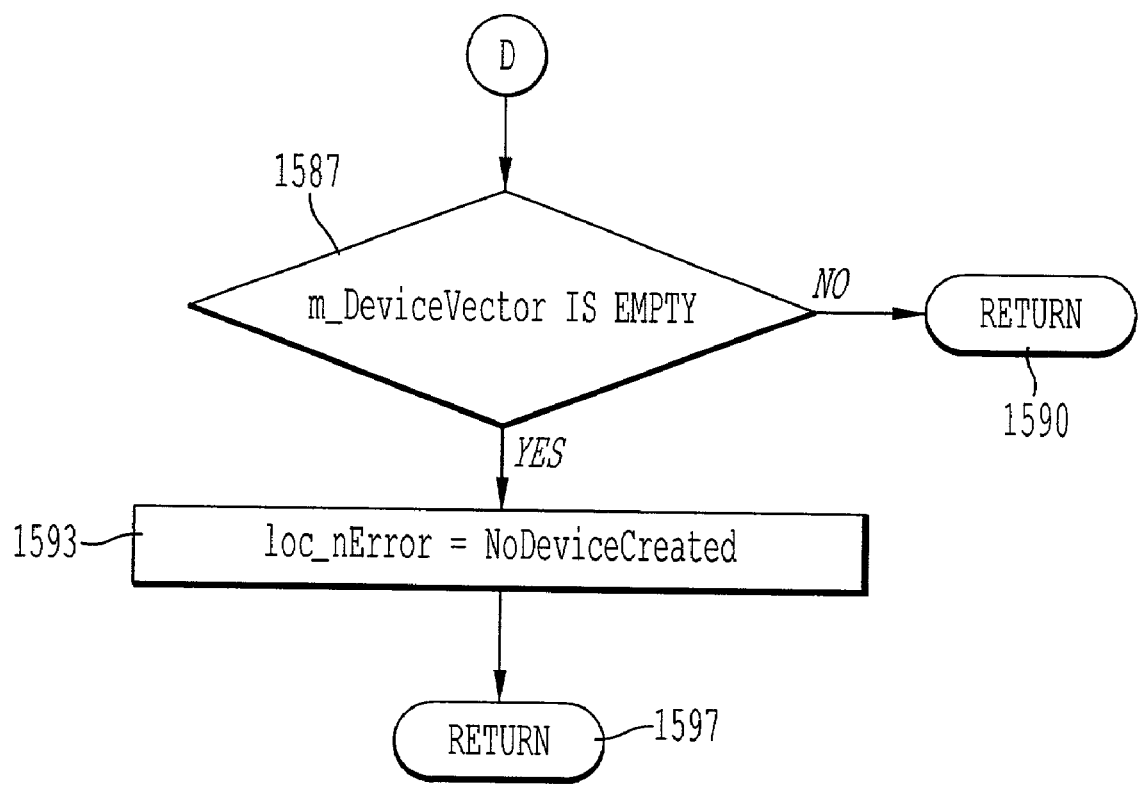
FIG. 14D is a flowchart that shows the exemplary initialization process when executing the initMonitorSendDLL( ) function of CSendInterfaceManager.

In step 1586 of FIG. 14D, the system checks to see if any device object has been created. If device objects have been created, then the initialization is completed in step 1590. If no device objects have been created, then the error status of the initialization is set to NoDeviceCreated and the initialization is completed in steps 1593 and 1597.

In step 1566, the system tries to get the unique identifier from the device through the virtual function getUniqueID of CAbsDevice (1400). A local string value is passed into the function to obtain the unique identifier from the device. If this function fails to get the unique identifier, the system continues to step 1569. Without the unique identifier, the system cannot keep this device object to communicate with the device to obtain information about the device. If this function obtains the unique identifier, the unique identifier is stored in the map containing the configuration information in step 1572.

As shown in Table 5, the function getUniqueID is not defined in the abstract class CAbsDevice (1400). However, the classes which are derived from CAbsDevice (1400) from 1410 through 1444 in FIG. 13 define the function getUniqueID. In CCommonPrinterDevice (1410), the function getUniqueID uses two other public functions defined in CCommonPrinterDevice to obtain the unique identifier: getMACaddress and generateUniqueId. getUniqueID will call getMACaddress first to obtain the unique identifier. getMACaddress returns the MAC address of the device using SNMP. An SNMP Get command with the object identifier of "1.3.6.1.2.1.25.3.5.1.2" is used to obtain the MAC address from the device. If the MAC address can be obtained, then it will be used for the unique identifier of the device. If the MAC address cannot be obtained, then getUniqueID will call generateUniqueId to obtain the unique identifier. generateUniqueId returns a unique number. generateUniqueId uses a random number generator with time as a seed to generate a unique number. The unique number will be used as the unique identifier.

For the manufacturer device classes and the various model device classes, the getUniqueID function is defined in the manufacturer's class. For example, in the case of CRicohDevice (1430), CRicohAP2600NDevice (1432), and CRicohAficio120Device (1434), the getUniqueID function is defined in the class CRicohDevice (1430). CRicohAP2600NDevice (1432) and CRicohAficio120Device (1434) are derived from CRicohDevice (1430) so they can use the function of their super class. This is true for CLexmarkDevice (1420) and CXeroxDevice (1440) classes and their derived classes. In the manufacturer's class, the getUniqueID function first send an SNMP command to get a unique value from the device using the manufacturer's unique object identifier. The unique value obtained from the device for a manufacturer will be the unique identifier. The unique value can be the serial number of the device. For example, the object identifier used to access the serial number for a Xerox device is "1.3.6.1.4.1.253.8.53.3.2.1.3". If getUniqueID of the manufacturer's device class returns a unique identifier, then it will be used as the unique identifier of the device object. If getUniqueID of the manufacturer's device class does not return a unique identifier, then the getUniqueID function of CCommonPrinterDevice (1410) is used to obtain the unique identifier (i.e. MAC address first and then random number).

As described from the previous paragraphs, the method for obtaining the unique identifier for a device uses these following steps: (1) use manufacturer specific information and communication to obtain the unique identifier (i.e. serial number), (2) use information and communication common to all manufacturers to obtain the unique identifier (i.e. MAC address), and (3) generate unique identifier using a random number generator. Step 1 is always done first and if it fails, step 2 is performed. If step 2 fails, step 3 is performed.

Figure 15:
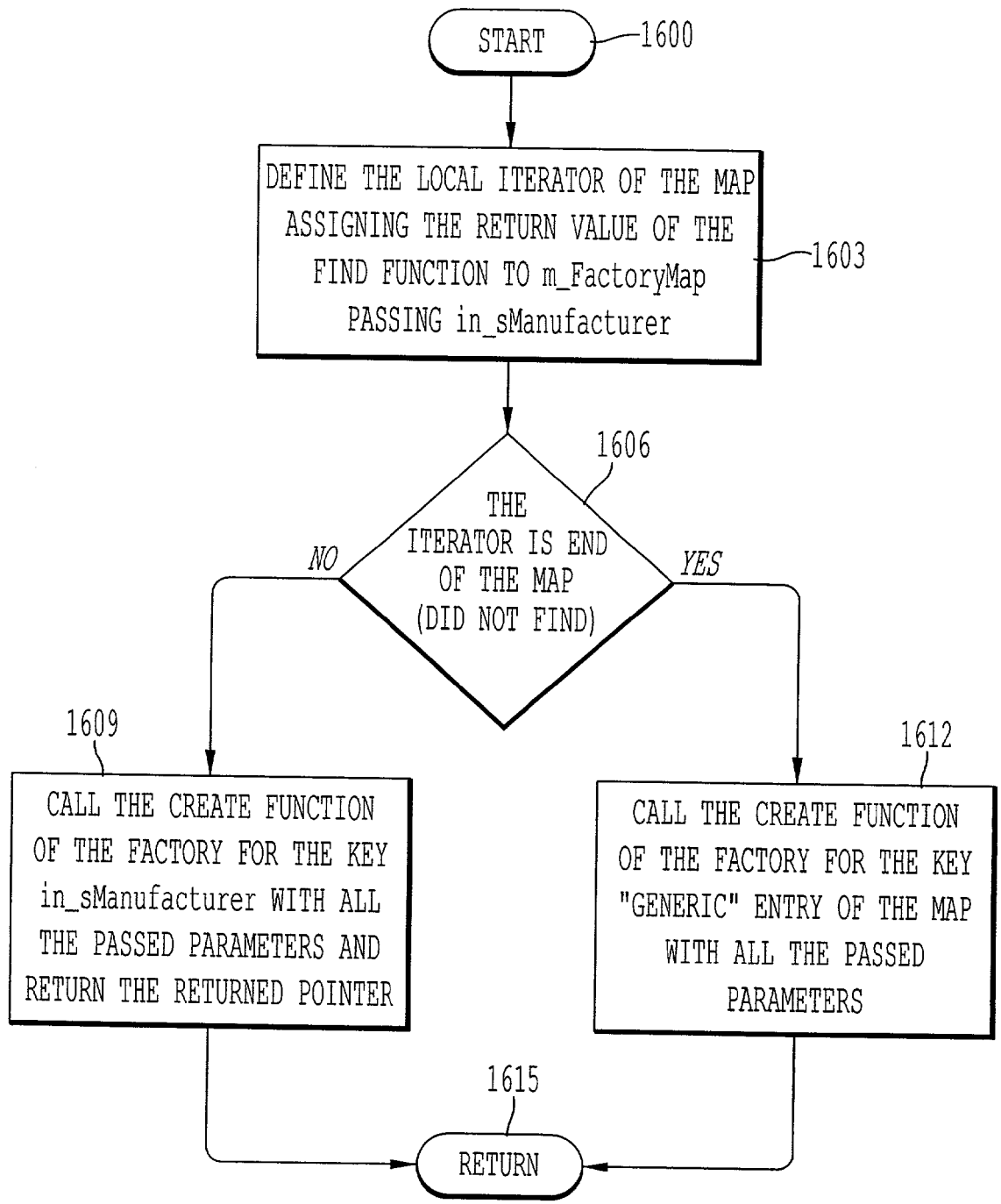
FIG. 15 shows a flowchart of how a device object is created by the createDevice function of CFactoryInterface.

FIG. 15 shows a flowchart of how a device object is created by the createDevice function of CFactoryInterface. Table 7 shows the attributes of the class.

TABLE 7

| Type | Attribute Name | Description |
| --- | --- | --- |
| std::map<std::string, std::auto_ptr<CAbsFactory> > | M_FactoryMap | This attribute keeps all the Manufacturer Factory. |
| std::map<std::string, std::auto_ptr<CAbsFactory> >::iterator | m_FactoryMapIterator | This attribute is the iterator of the map |
| bool | m_bFirstGet | This attribute is used to set the iterator to the first position | m_FactoryMap is a map structure with the key corresponding to the manufacturer's name and the value corresponding to the auto pointer to the corresponding manufacturer's device factory object. For example, m_FactoryMap may have the key "Xerox" and the corresponding value is an auto pointer to CXeroxFactory. m_FactoryMap is initialized in the constructor of CFactoryInterface.

In step 1603, the input parameter for the manufacturer in function createDevice of CFactoryInterface is used to see if it supported by the system. This is done by using the find function of m_FactoryMap to see if the inputted manufacturer matches any of the keys in the map. The C++ map template contains a find function that returns an iterator of the map pointing to the entry in the map corresponding to the key that is being searched. In step 1606 the system determines if the manufacturer is supported by checking if the returned iterator from the find function is at the end of the map. If the manufacturer is not supported (iterator is the end of the map), the auto pointer to the CGenericFactory object corresponding to the key "GENERIC" is used to create the device object in step 1612. The createDevice function of CGenericFactory returns a device object and completes the function createDevice of CFactoryInterface in step 1615. If the manufacturer is supported (iterator is not the end of the map), the auto pointer to the manufacturer factory object corresponding to the manufacturer is used to create the device object in step 1609. For example, if the manufacturer is "RICOH", then the createDevice function of CRicohFactory will be called to create the device object. Step 1615 completes the function createDevice of CFactoryInterface.

Figure 16:
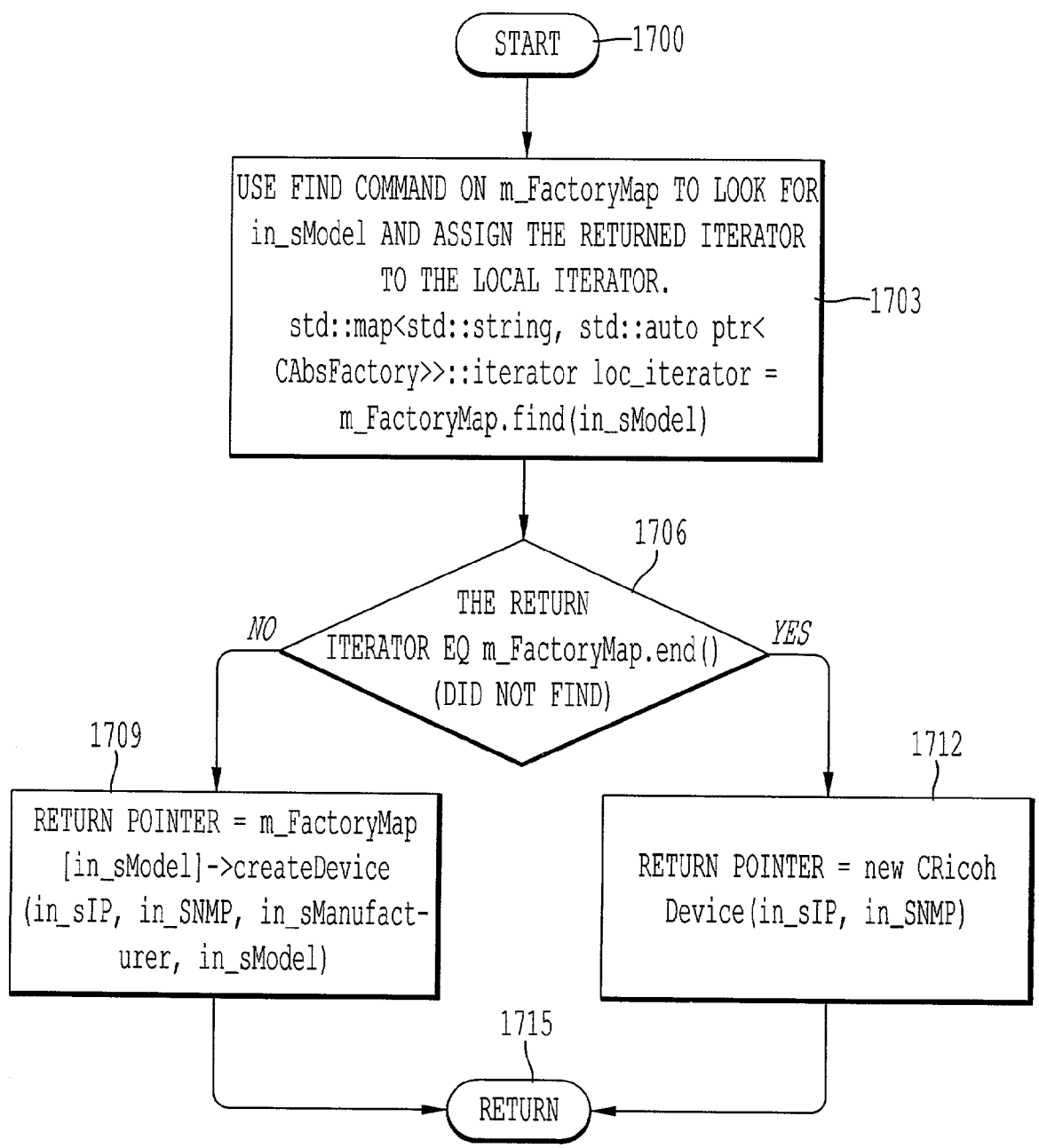
FIG. 16 shows the flowchart of how a device object, CRicohDevice, RicohAP2600NDevice, or CRicohAficio120Device, is created by the createDevice function of CRicohFactory.

FIG. 16 shows the flowchart of how a device object, CRicohDevice, CRicohAP2600NDevice, or CRicohAficio120Device, is created by the createDevice function of CRicohFactory. The same attributes and process apply to CLexmarkFactory and CXeroxFactory. CRicohFactory has one attribute as shown in Table 8.

TABLE 8

| Type | Attribute Name | Description |
| --- | --- | --- |
| Std::map<std::string, std::auto_ptr<CAbsFactory> > | m_FactoryMap | This attribute is used to map the names of the models and the corresponding factories. | m_FactoryMap is a map structure with the key corresponding to the model's name and the value corresponding to the auto pointer to the corresponding model's device factory object. For example, m_FactoryMap may have the key "AP2600N" and the corresponding value is an auto pointer to CRicohAP2600NDevice. m_FactoryMap is initialized in the constructor of CRicohFactory.

In step 1703, the input parameter for the model in function createDevice of CRicohFactory is used to see if it supported by the system. This is done by using the find function of m_FactoryMap to see if the inputted model matches any of the keys in the map. In step 1706 the system determines if the model is supported by checking if the returned iterator from the find function is at the end of the map. If the model is not supported (iterator is the end of the map), a CRicohDevice object is created in step 1712 and the createDevice of CFactoryInterface is completed in step 1715. If the model is supported (iterator is not the end of the map), the auto pointer to the model factory object corresponding to the model is used to create the device object in step 1709. For example, if the model is "AFICIO 120", then the createDevice function of CRicohAficio120Factory will be called to create the device object. Step 1715 completes the function createDevice of CRicohFactory.

From the descriptions of FIG. 15 and 16, the method for creating the device object for representing the device uses these following steps: (1) if the manufacturer and model is supported, create a device object corresponding to the manufacturer and model using the manufacturer and model factory object, (2) if the manufacturer is supported but the model is not supported, create a device object corresponding to the manufacturer using the manufacturer factory object, and (3) if the manufacturer and model are not supported, create a device object that can represent a device of any manufacturer and model.

Figure 17B:
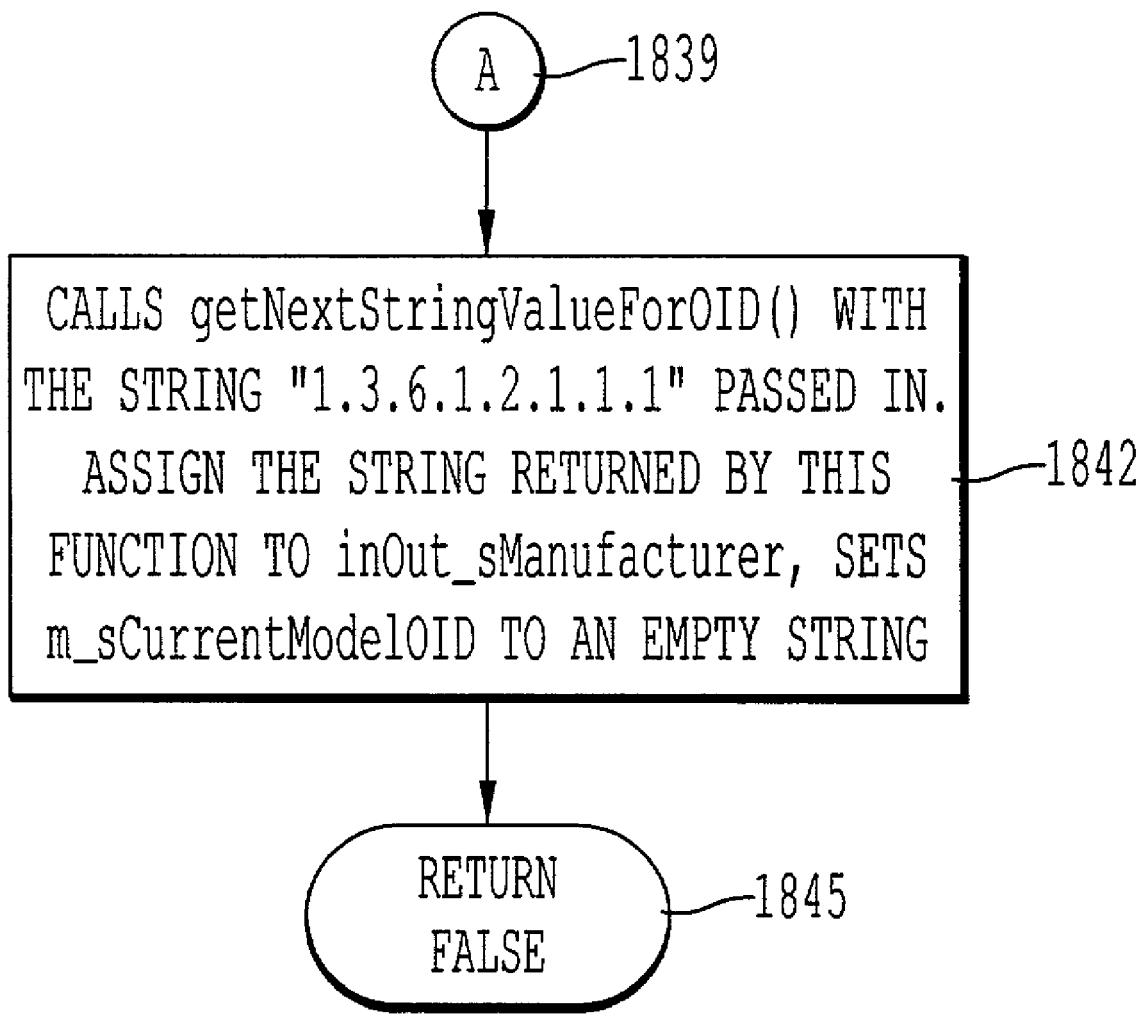
FIG. 17B shows the flowchart of the function checkManufacturer of the CSNMP class.

FIGS. 17A and 17B show the flowchart of the function, checkManufacturer of the CSNMP class that is used in step 1524 of FIG. 14A. The CSNMP class has 8 public functions and 8 private functions along with one private structure. The following is the private structure used in the CSNMP class.

struct ManufacturerAndModelInfo {
        std::string m_sManufacturer;
        std::string m_sEnterpriseOID;
        std::string m_sModelOID;
    };

Table 9 shows the public and private functions of CSNMP.

TABLE 9

| | Functions | Descriptions |
| --- | --- | --- |
| Public | CSNMP( ) | Constructor |
| | ~CSNMP( ) | Destructor |
| | bool setAgent (std::string& in_sAgent) | This function creates an SNMP session for the input agent. This function returns true if an SNMP session can be created for the agent. Otherwise false is returned. |
| | bool checkManufacturer (std::string& inOut_sManufacturer) | This function checks if the input string for the manufacturer is correct for the current agent. This function returns true if the manufacturer is correct. Otherwise false is returned with the correct manufacturer in the string. |
| | modelError checkModel (std::string& inOut_sModel) | This function checks if the input string for the model is correct for the current agent. This function returns ModelNoError if the model is correct. Otherwise, WrongModel is returned with the correct model in the string or ModelInformationUnavailable is returned with an empty string. |

TABLE 9-continued

|  | Functions | Descriptions |
| --- | --- | --- |
|  | std:string getNextStringValueForOID (std::string in__sOID) | This function obtains the string value associated with the input object identifier. This function returns the string value associated with the OID if it can be obtained. Otherwise an empty string is returned. |
|  | std:string getNextStringValueForOID( ) | This function obtains the next string value associated with the object identifier. This function returns the string value associated with the next OID if it can be obtained. Otherwise an empty string is returned. |
|  | bool closeAgent( ) | This function closes the SNMP session for the current agent. This function returns true if the SNMP session can be closed. Otherwise false is returned. |
| Private | void setManufacturerAndModelOIDVector ( ) | This function initializes m__ManufacturerAndModelInfoVector with the ManufacturerAndModelInfo structure set with values. |
|  | std::string getValueFromGetNextRequest (std::string in__sOID) | This function obtains the value associated with the input object identifier using the GETNEXT request of the SNMP protocol. This function returns a string value associated with the object identifier. If no value is associated with the OID, then an empty string is returned. |
|  | void getVarBindOID (std::string& out__sOID, AsnObjectIdentifier& in__AsnOID) | This function obtains the object identifier returned from the GETNEXT request of the SNMP protocol found in the variable binding. This function returns string value for the object identifier. |
|  | std::string intToString (int in__nNum) | This function converts an int value to a string. |
|  | std::string unsignedLongToString (unsigned long in__nNum) | This function converts an unsigned long int value to a string. |
|  | std::string byteStreamToString (AsnOctetString& in__AsnOctetString) | This function converts the BYTE stream to a string. |
|  | void convertToAllUpper (std::string& inOut__sString) | This function converts all the string characters to upper case. |

Table 10 shows the attributes of CSNMP.

TABLE 10

| Type | Attribute Name | Description |
| --- | --- | --- |
| CSnmpSession | m__SnmpSession | This attribute member represents an SNMP session. |
| std::string | m__sCurrentOID | This attribute member represents the current object identifier. |
| std::string | m__sNextOID | This attribute member represents the object identifier obtained from the GET NEXT request of SNMP that will be used to get the next value associated with the OID. |
| std::vector<ManufacturerAndModelInfo> | m__ManufacturerAndModelInfoVector | This attribute member contains information about the object identifiers used to identify the manufacturer and model of the network printer. |
| std::string | m__sCurrentModelOID | This attribute member represents the object identifier used to find information about the model of the network printer. |

The attribute m_ManufacturerAndModelInfoVector holds the data structure where the name of the manufacturer (m_s-Manufacturer), object identifier of the manufacturer (m_sEnterpriseOID), and object identifier for model (m_sModelOID) are stored. The object identifier of a manufacturer (also called enterprise object identifier) is a unique object identifier assigned to a manufacturer that can be used to identify a manufacturer. The object identifier for model is an object identifier used by a manufacturer to access and store the information about the model of the device. As an example, the data structure may look as follow: {("RICOH", "1.3.6.1.4.1.367", "1.3.6.1.4.1.367.3.2.1.1.1.1"), ("XEROX", "1.3.6.1.4.1.253", "1.3.6.1.4.1.253.8.53.3.2.1.2"), ("LEXMARK", "1.3.6.1.4.1.641", "1.3.6.1.4.1.641.1.4.3")}. m_ManufacturerAndModelInfoVector is initialized in the constructor of CSNMP.

In step 1803, the input parameter (inOut_sManufacturer) of the function checkManufacturer of CSNMP is stored into a local string variable, loc_sManufacturer. In step 1806, all the input characters are converted to upper case. In step 1809, the SNMP GET command is issued to obtain the manufacturer's object identifier (enterprise object identifier) from the device. In step 1812, the contents of the value returned, loc_sReturn, is checked to see if the manufacturer's object identifier was obtained from the device. If the value returned is empty in step 1812, then the manufacturer's object identifier was not obtained. If the manufacturer's object identifier was not obtained, then proceed to step 1842 in FIG. 17B. Step 1842 will be discussed later. If the manufacturer's object identifier was obtained, then the manufacturer's object identifier member of the struct ManufacturerAndModelInfo in m_ManufacturerAndModelInfoVector is checked to see if it is found in the returned value in step 1818. This step checks if the manufacturer of the device is supported by the system by matching the manufacturer's object identifier obtained with the object identifiers of the manufacturers supported by the system. If the manufacturer's object identifier cannot be found in m_ManufacturerAndModelInfoVector, then proceed to step 1842 in FIG. 17B. If the manufacturer's object identifier can be found in m_ManufacturerAndModelInfoVector, then the ManufacturerAndModelInfo structure corresponding to the manufacturer's object identifier is used to perform the next two steps: (1) assign the object identifier for model (m_sModelOID) member to the attribute m_sCurrentModelOID in step 1827 and (2) assign the name of the manufacturer (m_sManufacturer) member to the parameter inOut_sManufacturer in step 1830. m_sCurrentModelOID is used in FIGS. 18A and 18B to determine the model name of device. In step 1833, the original manufacturer name from the input parameter, loc_sManufacturer, and the actual manufacturer name obtained from the device, inOut_sManufacturer, are compared to see if they are the same. If they are the same, then true is returned in step 1836. If they are not the same, then false is returned in step 1836. In step 1842, the SNMP GET command is issued to obtain the system description of the device and the system description is assigned to inOut_sManufacturer. Also, m_sCurrentModelOID is set to an empty string. The system returns false in step 1845.

FIGS. 18A and 18B show the flowchart of the function checkModel of the CSNMP class that is used in step 1539 of FIG. 14B. In step 1903, the input parameter (inOut_sModel) of checkModel is stored into a local string variable, loc_sModel. In step 1906, all the input characters are converted to upper case. In step 1912, m_sCurrentModelOID is checked to see if it is an empty string. m_sCurrentModelOID is the object identifier that is used to obtain the model name from the device via SNMP. If m_sCurrentModelOID is not an empty string, then proceed to step 1956. Step 1956 will be discussed later. If m_sCurrentModelOID is an empty string, then call the function checkManufacturer in step 1918. checkManufacturer is described in FIGS. 17A and 17B. This function may assign a value to m_sCurrentModelOID. In step 1921, m_sCurrentModelOID is checked again to see if it is an empty string. If m_sCurrentModelOID is not an empty string, then proceed to step 1956. If m_sCurrentModelOID is still an empty string, then the SNMP GET command is issued to obtain the system description of the device in step 1927 and the system description is assigned to inOut_sModel in step 1930. The system description obtained from the SNMP GET command is checked to see if it is an empty string in step 1933. If it is an empty string, then checkModel returns the status ModelInformationUnavailable in step 1936. If it is not an empty string, the characters of the system description are converted to upper case in step 1939. In step 1942, check if the original model name from the input parameter, loc_sModel, is found in the system description. If the original model name cannot be found in the system description, then checkModel returns the status WrongModel in step 1951. If the original model name can be found in the system description, then assign the original model name from the input parameter, loc_sModel, to inOut_sModel in step 1945 and checkModel returns the status ModelNoError in step 1948.

In step 1956 of FIG. 18B, the SNMP GET command is issued using the object identifier of m_sCurrentModelOID to obtain the model name from the device. In step 1958, set m_sCurrentModelOID to an empty string so that other models can be tested. In step 1960, the model name obtained is checked to see if it is an empty string. If the model name is an empty string, then proceed to step 1974. Step 1974 will be discussed later. If the model name is not an empty string, then the model name is assigned to inOut_sModel in step 1962. In step 1964, all the characters of the model name is converted to upper cases. In step 1966, check if the original model name from the input parameter, loc_sModel, is found in the model name obtained from the device. If the original model name cannot be found in the model name obtained from the device, then checkModel returns the status WrongModel in step 1972. If the original model name can be found in the model name obtained from the device, then assign the original model name from the input parameter, loc_sModel, to inOut_sModel in step 1968 and checkModel returns the status ModelNoError in step 1970.

Steps 1974 to 1990 follow the same steps as steps 1927 to 1951.

From the descriptions of FIGS. 17A, 17B, 18A, and 18B, the method for verifying the manufacturer and model of the device uses these following steps: (1) obtain the enterprise object identifier from the device via SNMP and determine the manufacturer name based on the enterprise object identifier and compare it with the assumed manufacturer name, (2) if the enterprise object identifier cannot be obtained, obtain the system description and check if the assumed manufacturer name is in the system description, (3) obtain the model name of the device via SNMP using the object identifier that will identify the model for a manufacturer of the device and compare it with the assumed model name, and (4) if the model name cannot be obtained, obtain the system description and check if the assumed model name is in the system description. The assumed manufacturer name and assumed model name that the system has for the devices are verified with the names obtained from the device.

The Data Transfer Package is responsible for sending the information about the monitored device from the remote monitoring workstation to the central monitoring workstation. This package creates the email message that contains the information about the monitored device. The class CMailMessage contains the contents of the email message that is sent that includes the monitored information in the attachment of the email message. The public and private functions of CMailMessage are shown in Table 11.

TABLE 11

| | Function Name | Description |
|---|---|---|
| Public | CMailMessage( ) | Constructor |
| | ~CMailMessage( ) | Destructor |
| | void resetMailMessage( ) | Resets the attributes of CMailMessage |
| | void initializeMailMessage( ) | Initializes the header of the email message |
| | bool addToMessage(std::string in_sMessage) | Adds input string (information of the monitored devices) to MIME attachment |
| | void completeMailMessage( ) | Adds the end of mail to the email message |
| | bool getNextLineOfMailMessage(std::string& out_sLineOfMailMessage) | Gets a line of the email message |
| | time_t getDateAndTime( ) | Gets the date of the email message |
| Private | void setHeaderInfo( ) | Gets the information used for the header of the email message |
| | void setVerification( ) | Implements the verification scheme in the email message |
| | CAbsEncrypter* createEncrypter(EncrypterType in_EncrypterType) | Creates the encrypter used for the verification scheme and for the encryption of the MIME attachment |

Table 12 below shows the attributes of the CMailMessage 25 class that are used in the above functions.

TABLE 12

| Type | Attribute Name | Description |
|---|---|---|
| std::string | m_sFromAddr | This attribute member represents a string for the source address used in the From field of the mail header. |
| std::string | m_sRcptAddrs | This attribute member represents a string for the recipient addresses used in the To field of the mail header. |
| std::string | m_sDate | This attribute member represents a string for the date field of the mail header. |
| std::string | m_sSubject | This attribute member represents a string for the subject field of the mail header. |
| std::string | m_sComment | This attribute member represents a string for the comment field of the mail header. This field is used for verification purposes. |
| std::string | m_sBoundary | This attribute member represents a string for the boundary of the MIME attachment. |
| std::string | m_sFilename | This attribute member represents the filename for the MIME attachment. |
| time_t | m_DateAndTime | This attribute member represents the time in which the mail message was initialized. |
| std::string | m_sEncodedString | This attribute member represents the encoded string to be placed in the mail message. |
| std::vector<std::string> | m_MailMessage | This attribute member represents the lines of the mail message. |
| std::vector<std::string>::iterator | m_MailMessageIterator | This attribute member represents the iterator for vector m_MailMessage. |

TABLE 12-continued

| Type | Attribute Name | Description |
|---|---|---|
| Bool | m__bGotFirstLine | This attribute member determines if the first line of the mail message has been obtained. |
| std::auto__ptr <CabsEncrypter> | m__pEncrypter | This attribute member encrypts the data. This encrypter is used for the verification scheme and to encrypt the information of the monitored devices. |
| CBase64Encoder | m__Base64Encoder | This attribute member Base64 encodes the data to be added to the MIME attachment |
| CSendSystemRegistry | m__SendSystemRegistry | This attribute member represents the system registry where information needed to create the mail message is stored. |

The strings m_sFromAddr, m_sRcptAddrs, m_sDate, m_sSubject, m_sComment, m_sBoundary, and m_sFilename are used for the header of the email message. The vector m_MailMessage is used for the email message.

The CSimpleEncrypter class is responsible for encrypting the information before it is placed into the email message. Table 13 illustrates the public functions of CSimpleEncrypter and Table 14 below shows the attributes of the CSimpleEncrypter class that are used by the functions.

TABLE 13

| Function Name | Description |
|---|---|
| CSimpleEncrypter( ) | Constructor |
| ~CSimpleEncrypter( ) | Destructor |
| bool encryptData (std::string& inOut__sData) | This function encrypts the input string. The input string will be modified to contain the encrypted string. |
| void resetEncrypter( ) | Resets the attributes of CSimpleEncrypter |

TABLE 14

| Type | Attribute Name | Description |
|---|---|---|
| int | m__nCurrent | This attribute member represents the current modifier in the simple encryption scheme. Its value is added to each character of the string. |
| int | m__nIncrement | This attribute member represents the increment size in the simple encryption scheme. Its value is added to m__nCurrent after m__nCurrent is added to a character. |
| int | m__nPeriod | This attribute member represents the period in the simple encryption scheme. Its value is assigned to m__nCurrent if m__nCurrent higher than 255 or lower than −255. |

The CBase64Encoder class is responsible for base64 encoding the encrypted information before it is placed into the email message. Table 15 below shows the public functions of CBase64Encoder and Table 16 below shows the attributes of the CBase64Encoder class that are used by the functions.

TABLE 15

| Function Name | Description |
|---|---|
| CBase64Encoder(int in__nMaxLength = DefaultMaxLength) | Constructor. The input parameter determines the maximum length of the encoded string. |
| ~CBase64Encoder( ) | Destructor |
| bool encodeData(bool& out__bIsLineOfDataReady, unsigned char in__cDataToEncode) | This function base64 encodes a character and adds it to the encoded string m__sEncodedString. out__bIsLineOfDataReady is set to true when m__sEncodedString reaches it's length of m__nMaxLength. |
| std::string getEncodedString( ) | This function returns the encoded string. |

TABLE 16

| Type | Attribute Name | Description |
|---|---|---|
| std::string | m_sEncodedString | This attribute member represents the base64 encoded string. |
| int | m_nStringSize | This attribute member maintains the size of the string m_sEncodedString. |
| int | m_nMaxLength | This attribute member represents the maximum size of the string m_sEncodedString. |
| Unsigned int | m_nUnencodedBits | This attribute member contains the bits of the data that remains unencoded. |
| EncodeState | m_EncodeState | This attribute member represents the state for encoding the data. |

The base64 encoding is described in RFC 2045 "Multipurpose Internet Mail Extensions (MIME) Part One: Format of Internet Message Bodies".

Figure 19:
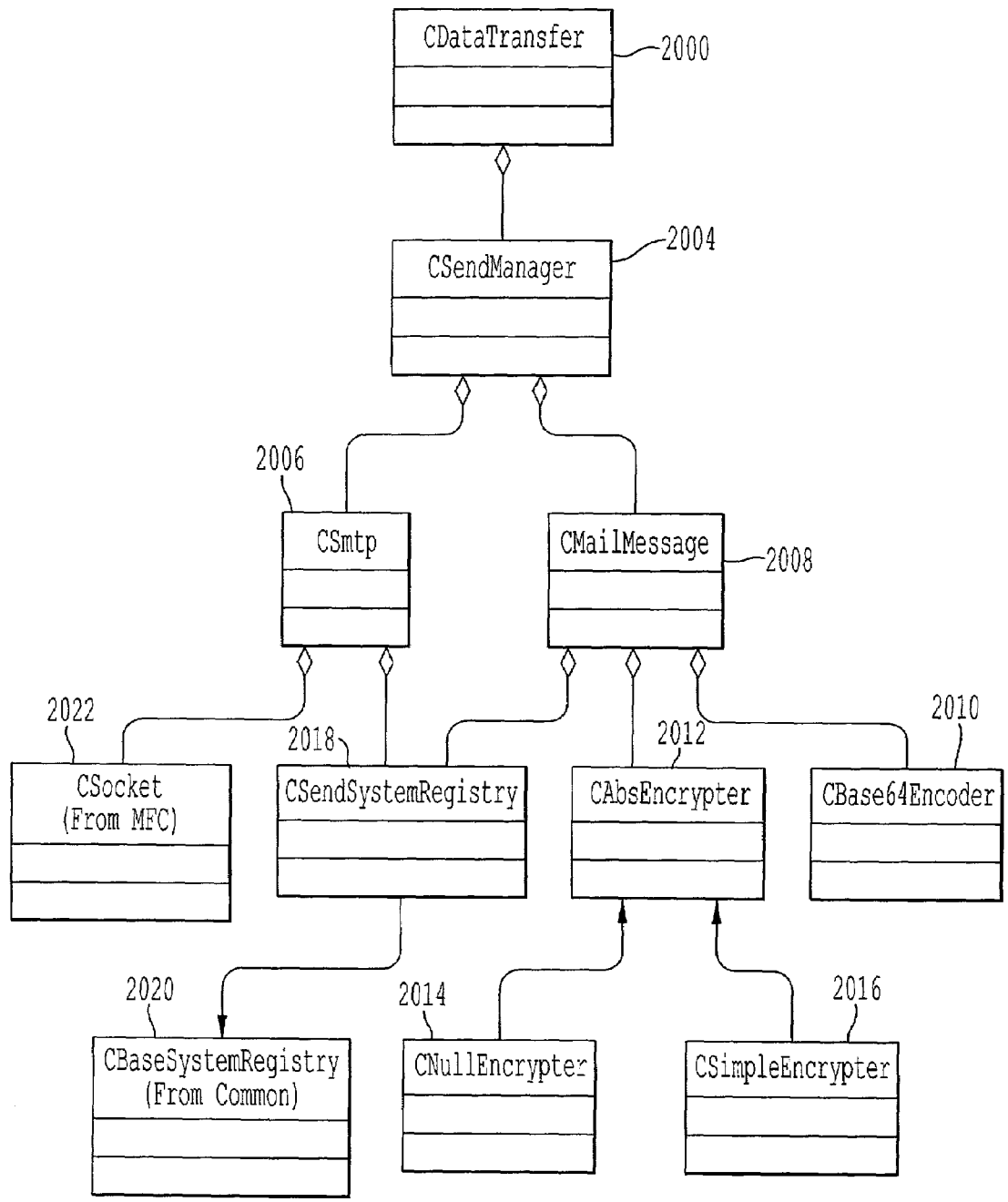
FIG. 19 shows the class diagram of the Data Transfer Package.

FIG. 19 shows the class diagram of the Data Transfer Package. The CDataTransfer 2000 class is the interface for this package to send the data using SMTP. CDataTransfer 2000 formats the information about the monitored devices before it is sent. The CSendManager 2004 class creates the email message and sends the message using SMTP. The CSmtp 2006 class implements the SMTP protocol. CSmtp uses the CSocket 2022 class of the Microsoft Foundation Class library (MFC) to implement the SMTP protocol. The CMailMessage 2008 class creates the various components of the email message. CMailMessage 2008 implements the verification scheme for email message. CMailMessage 2008 adds the encrypted and base 64 encoded data to the MIME attachment of the email message. The CAbsEncrypter 2012 class is an abstract class that provides the virtual interface function to encrypt the data that will be placed into the email message. The CNullEncrypter 2014 class is derived from CAbsEncrypter 2012 and provides a method for encrypting the data. CNullEncrypter 2014 does not perform any encryption on the data. The CSimpleEncrypter 2016 class is derived from CAbsEncrypter 2012 and performs a simple method for encrypting the data. The CBase64Encoder 2010 class performs the Base64 encoding of the data. The CSendSystemRegistry 2018 class is derived from the base class CBaseSystemRegistry 2020 located in the Common package. CSendSystemRegistry 2018 provides this package with information from the system's registry necessary for creating and sending the email message.

Figure 20:
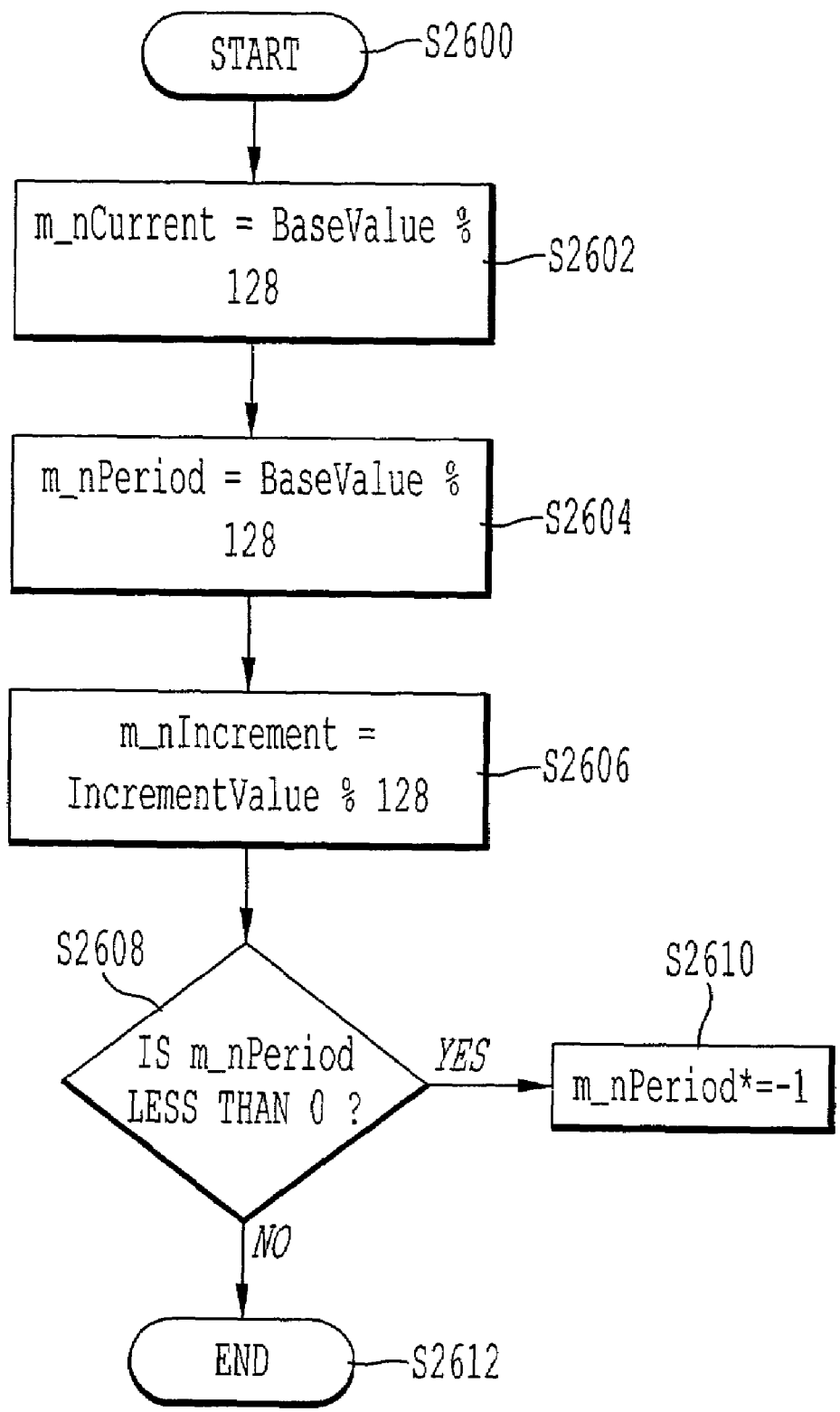
FIG. 20 is a flowchart describing the resetEncrypter( ) function of CSimpleEncrypter.

FIG. 20 is a flowchart describing the resetEncrypter( ) function of CSimpleEncrypter. This function resets the attribute members, m_nCurrent, m_nIncrement, and m_nPeriod, to their initial values. In step S2602, m_nCurrent is assigned the value of the remainder of BaseValue divided by 128. In step S2604, m_nPeriod is assigned the value of the remainder of BaseValue divided by 128. In step S2606 m_nIncrement is assigned the value of the remainder of IncrementValue divided by 128. If the result for m_nPeriod is negative, then multiply m_nPeriod by −1 in step S2610. The value of BaseValue and IncrementValue can vary so that the simple encryption can vary. For example, if BaseValue is 20 and IncrementValue is 5, then m_nCurrent is 20, m_nPeriod is 20, and m_nIncrement is 5. If BaseValue is −34 and IncrementValue is 13, then m_nCurrent is −34, m_nPeriod is 34, and m_nIncrement is 13. These two sets of value for BaseValue and IncrementValue will result in two different encrypted strings for the same string that is to be encrypted.

Figure 21A:
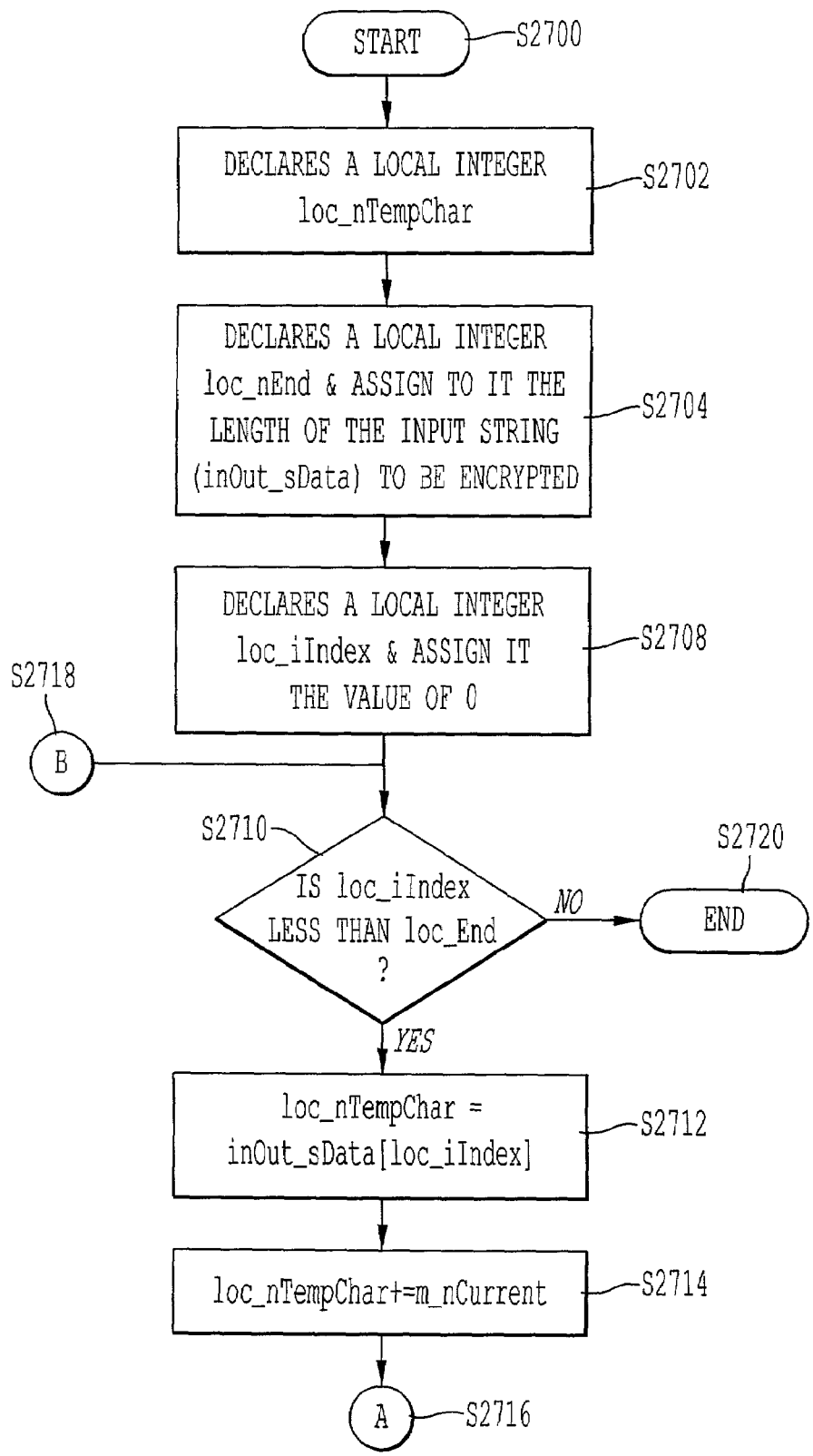
FIG. 21A is a flowchart describing the encryptData( ) function of CSimpleEncrypter.
Figure 21B:
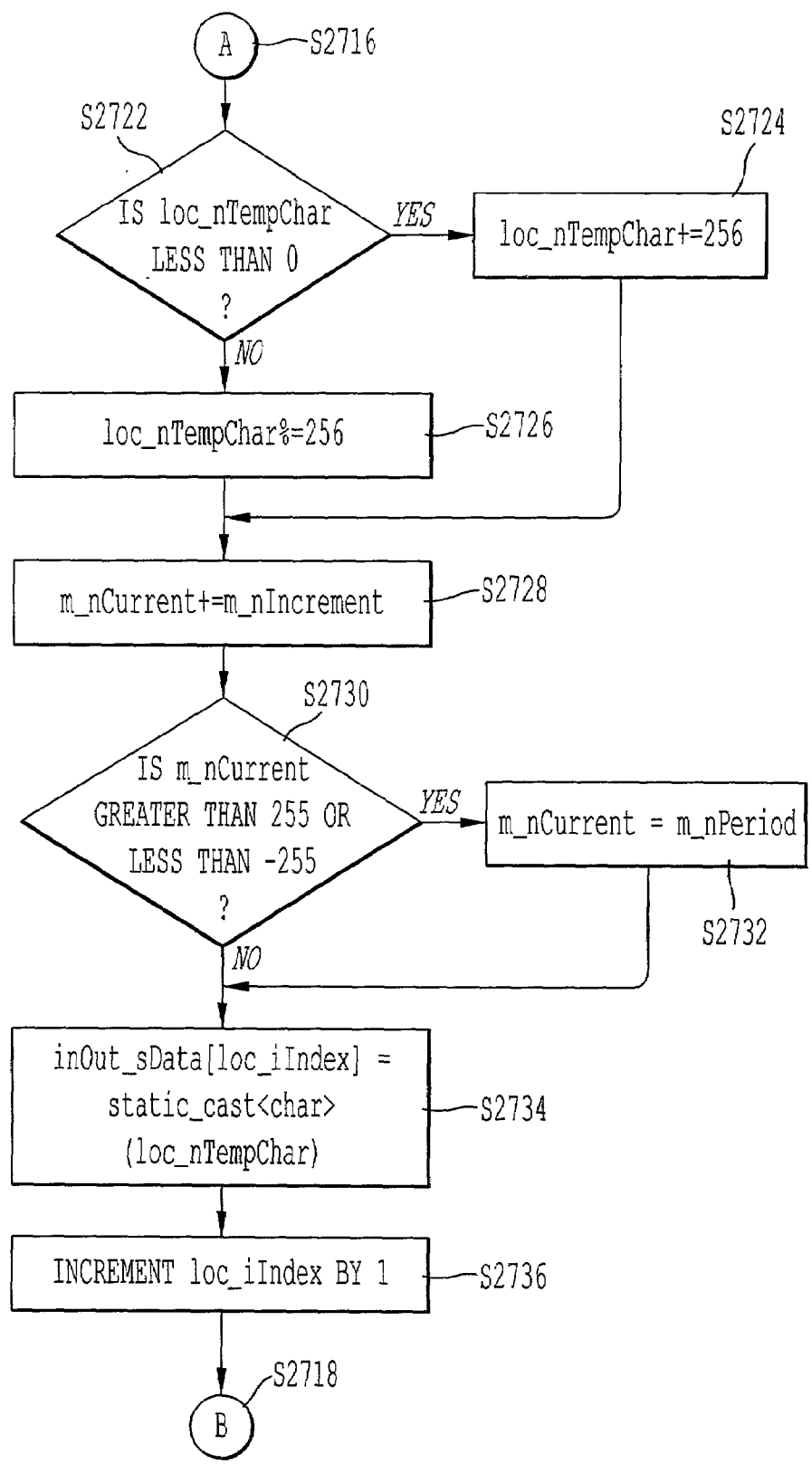
FIG. 21B is a flowchart describing the encryptData( ) function of CSimpleEncrypter.

FIG. 21A and FIG. 21B is a flowchart describing the encryptData( ) function of CSimpleEncrypter. This function encrypts the input string one character at a time. This function modifies the input string to contain the encrypted string. The flowchart in FIG. 21B is a continuation of the flowchart in FIG. 21A.

In step S2702 a local integer variable, loc_nTempChar, is declared. loc_nTempChar will be used to store a character from the input string. In step S2704 a local integer variable, loc_nEnd, is declared and is assigned the length of the input string. In step S2708 a local integer variable, loc_iIndex, is declared and set to 0. loc_iIndex is used as an index to access each character in the string.

Steps S2710, S2712, and S2714 in FIG. 21A and S2722 through S2736 in FIG. 21B are repeated until each character in the string has been encrypted. When the last character has been encrypted, step S2710 will result in NO and the encryption will be completed in step S2720.

For each character the following steps are performed:

1. In step S2712 of FIG. 21A, the character in the string at index loc_iIndex is assigned to the variable loc_nTempChar. The character is converted into its integer ASCII code as it is assigned to loc_nTempChar.
2. In step S2714 of FIG. 21A, the value of m_nCurrent is added to loc_nTempChar. This is the encryption to the character of the string.
3. In step S2722 of FIG. 21B, loc_nTempChar is checked to see if it is less than 0.
   a. If loc_nTempChar is less than 0, in step S2724 of FIG. 21B, 256 is added to loc_nTempChar.
   b. If loc_nTempChar is not less than 0, in step S2726 of FIG. 21B, loc_nTempChar is assigned the remainder of loc_nTempChar divided by 256.
4. In step S2728 of FIG. 21B, the value of m_nIncrement is added to loc_nTempChar.
5. In step S2730 of FIG. 21B, m_nCurrent is checked to see if it is greater than 255 or less than −255.
   a. If m_nCurrent is greater than 255 or less than −255, in step S2732 of FIG. 21B, m_nCurrent is set to m_nPeriod.
6. In step S2734 of FIG. 21B, the integer value of loc_nTempChar is converted to a character and the character is assigned to the string at index loc_iIndex. The original character of the string at index loc_iIndex is overwritten.
7. In step S2736 of FIG. 21B, increment the index loc_iIndex by 1. It may be possible that the new encrypted string will contain non-printable characters.

Table 17 and Table 18 below shows a sample of the simple encryption method of FIGS. 20, 21A, and 21B on the string "Help" using 30 for the BaseValue and 8 for the IncrementValue. Table 18 shows the values of the attribute members of CSimpleEncrypter for the execution of the steps S2602, S2604, and S2606 of FIG. 20 of the resetEncrypter( ) function. Table 18 shows the values of the local variables, the attribute members, and the input output string for the execution of the steps of FIGS. 21A and 21B of the encryptData( ) function. The resulting encrypted string contains non-print able characters. Since the string contains characters, the range of values that can be assigned to each character in the string is −128 to 127. Therefore in step S2734, the integer value of loc_nTempChar is converted into a value within this range.

TABLE 17 resetEncrypter( ) function of CSimpleEncrypter for BaseValue = 30 and IncrementValue = 8

| Steps | Attributes |
|---|---|
| S2602 | m_nCurrent = 30 |
| S2604 | m_nPeriod = 30 |
| S2606 | m_nIncrement = 8 |

TABLE 19 resetEncrypter( ) function of CSimpleEncrypter for BaseValue = −75 and IncrementValue = −20

| Steps | Attributes |
|---|---|
| S2602 | m_nCurrent = −75 |
| S2604 | m_nPeriod = −75 |
| S2606 | m_nIncrement = −20 |
| S2610 | m_nPeriod = 75 |

TABLE 18 encryptData( ) function of CSimpleEncrypter for the Input String "Help"

| Steps | H | e | L | P |
|---|---|---|---|---|
| S2710 | loc_iIndex = 0 | loc_iIndex = 1 | loc_iIndex = 2 | loc_iIndex = 3 |
| S2712 | loc_nTempChar = 72 | loc_nTempChar = 101 | loc_nTempChar = 108 | loc_nTempChar = 112 |
| S2714 | loc_nTempChar = 102 | loc_nTempChar = 139 | loc_nTempChar = 154 | loc_nTempChar = 166 |
| S2724 | | | | |
| S2726 | loc_nTempChar = 102 | loc_nTempChar = 139 | loc_nTempChar = 154 | loc_nTempChar = 166 |
| S2728 | m_nCurrent = 38 | m_nCurrent = 46 | m_nCurrent = 54 | m_nCurrent = 62 |
| S2732 | | | | |
| S2734 | inOut_sData[0] = 102 ('f') | inOut_sData[0] = −117 (non-printable character) | inOut_sData[0] = −102 (non-printable character) | inOut_sData[0] = −91 (non-printable character) |
| S2736 | loc_iIndex = 1 | loc_iIndex = 2 | loc_iIndex = 3 | loc_iIndex = 4 |

Table 19 and Table 20 below shows a sample of the simple encryption method of FIGS. 20, 21A, and 21B on the same string "Help" using −75 for the BaseValue and −20 for the IncrementValue. Table 19 shows the values of the attribute

TABLE 20 encryptData( ) function of CsimpleEncrypter for the Input String "Help"

| Steps | H | e | l | p |
|---|---|---|---|---|
| S2710 | loc_iIndex = 0 | loc_iIndex = 1 | loc_iIndex = 2 | loc_iIndex = 3 |
| S2712 | loc_nTempChar = 72 | loc_nTempChar = 101 | loc_nTempChar = 108 | loc_nTempChar = 112 |
| S2714 | loc_nTempChar = −3 | loc_nTempChar = 6 | loc_nTempChar = −7 | loc_nTempChar = −23 |
| S2724 | loc_nTempChar = 253 | | loc_nTempChar = 249 | loc_nTempChar = 233 |
| S2726 | | loc_nTempChar = 6 | | |
| S2728 | m_nCurrent = −95 | m_nCurrent = −115 | m_nCurrent = −135 | m_nCurrent = −155 |
| S2732 | | | | |
| S2734 | inOut_sData[0] = −3 (non-printable character) | inOut_sData[0] = 6 (non-printable character) | inOut_sData[0] = −7 (non-printable character) | inOut_sData[0] = −23 (non-printable character) |
| S2736 | loc_iIndex = 1 | loc_iIndex = 2 | loc_iIndex = 3 | loc_iIndex = 4 | members of CSimpleEncrypter for the execution of the steps of FIG. 20 of the resetEncrypter( ) function. Table 20 shows the values of the local variables, the attribute members, and the input output string for the execution of the steps of FIGS. 21A and 21B of the encryptData( ) function. By comparing Table 18 and Table 20, it can be seen that for different BaseValue and IncrementValue, the simple encryption method results in different encrypted strings for the same input string. By using different values for the BaseValue and IncrementValue, the resulting encrypted string will differ. Therefore, the BaseValue and IncrementValue can serve as keys to the encryption scheme.

Table 21 below shows the Base64 Alphabet used for the Base64 encoding as described by RFC 2045. The Base64 encoding ensures that the text within the email message contains these legal characters.

TABLE 21

| Value | Encoding |
|---|---|
| 0 | A |
| 1 | B |
| 2 | C |

TABLE 21-continued

| Value | Encoding |
|---|---|
| 3 | D |
| 4 | E |
| 5 | F |
| 6 | G |
| 7 | H |
| 8 | I |
| 9 | J |
| 10 | K |
| 11 | L |
| 12 | M |
| 13 | N |
| 14 | O |
| 15 | P |
| 16 | Q |
| 17 | R |
| 18 | S |
| 19 | T |
| 20 | U |
| 21 | V |
| 22 | W |
| 23 | X |
| 24 | Y |
| 25 | Z |
| 26 | a |
| 27 | b |
| 28 | c |
| 29 | d |
| 30 | e |
| 31 | f |
| 32 | g |
| 33 | h |
| 34 | i |
| 35 | j |
| 36 | k |
| 37 | l |
| 38 | m |
| 39 | n |
| 40 | o |
| 41 | p |
| 42 | q |
| 43 | r |
| 44 | s |
| 45 | t |
| 46 | u |
| 47 | v |
| 48 | w |
| 49 | x |
| 50 | y |
| 51 | z |
| 52 | 1 |
| 53 | 2 |
| 54 | 3 |
| 55 | 4 |
| 56 | 5 |
| 57 | 6 |
| 58 | 7 |
| 59 | 8 |
| 60 | 9 |
| 61 | 0 |
| 62 | + |
| 63 | / |
| (pad) | = |

By changing the mapping of the value to encoding, the Base64 Alphabet will result in a different encoding. For example, the upper case encoding can be switched with the lower case encoding such that the values 0 through 25 corresponds to a through z and values 26 through 51 corresponds to A through Z. This new Base64 Alphabet will result in encoded string that will differ from the original Base64 Alphabet. For the string "Help", the base64 encoding for the original Base64 Alphabet will produce the string "SGVscA==" where as the new Base64 Alphabet will produce the string "sgvSCa==". Thus, variations of the base64 encoding can be achieved by modifying the Base64 Alphabet. The purpose of the base64 encoding is to produce strings that contain characters within the range of printable characters that can be placed into the email messages. The encryption method as described in FIGS. 21A and 21B produces strings that contain non-printable characters. Thus the encrypted strings cannot be placed immediately into the email message but must be first base64 encoded and then placed into the email message.

Figure 22:
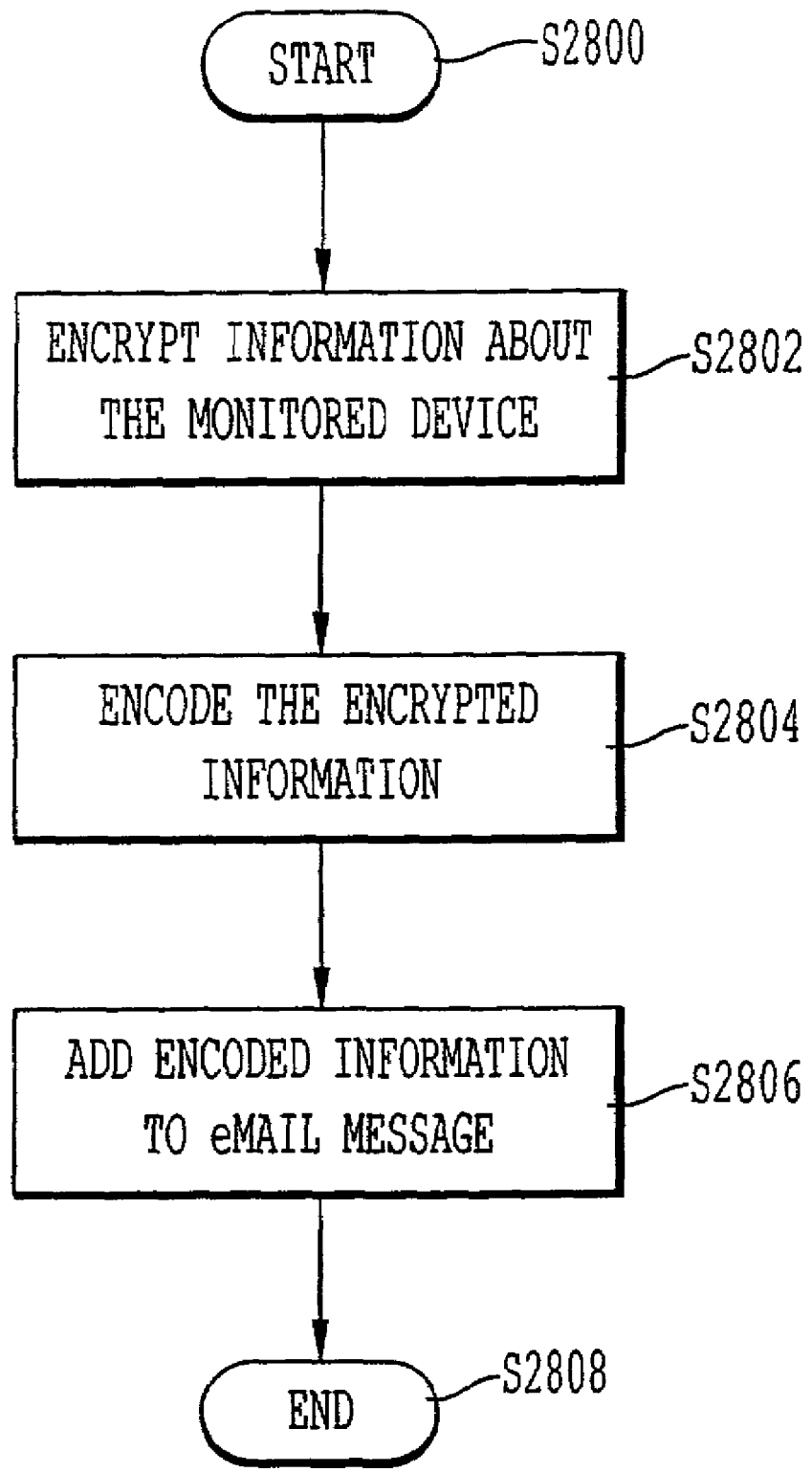
FIG. 22 is a flowchart describing the scrambling method used to scramble the information about the monitored devices before placing it into the email message.

FIG. 22 is a flowchart describing the scrambling method used to scramble the information about the monitored devices before placing it into the email message. In step S2802, the information about the monitored device is encrypted using any variations of the simple encryption method. Once the information is encrypted, then in step S2804, the encrypted information is encoded using any variation of the base64 encoding method. Once encoded, the encrypted and encoded information is placed into the email message in step S2806. The reason that scrambling requires the combination of encryption and encoding is that encryption may result in character values in the string that are illegal to be placed in the email. Encoding ensures that the character values in the string are legal to be placed in the email.

It is important to note that the recipient of the email message is not for human reading. A system to which the email message is sent to will unscramble and parse the email message without any human intervention. The encryption and encoding will make the email message unreadable to a person viewing the message. As long as the mail agent accepts the email message, the receiving system can decrypt, decode, and parse the email message to obtain the information about the monitored devices.

FIG. 23 shows the format of the email message sent by the Data Transfer Package. The email message 2100 consists of four components—the email header 2102, the MIME attachment header 2104, the MIME attachment 2106, and the end of the email 2108. The email header 2102 contains information about the source, the destination, the date, and the subject of the email message. Also, it contains information about the verification of the email message in the comment of the email message. The MIME attachment header 2104 contains information about the filename of the MIME attachment and the encoding used. The MIME attachment 2106 contains the encrypted and encoded information about the monitored devices. The end of the email 2108 contains the termination of the email message. Refer to RFC 822, "STANDARD FOR THE FORMAT OF ARPA INTERNET TEXT MESSAGES" for the contents of the email message. Refer to RFC 1521, RFC 1522, and RFC 2045 for the description of the MIME attachment.

FIG. 24 shows an example of the email message created in CMailMessage corresponding to the format shown in FIG. 23. The comment field contains the combined string of the subject and date field that has been encrypted and encoded. The MIME attachment contains the status information or configuration information of the monitored devices that has been encrypted and encoded.

Figure 25:
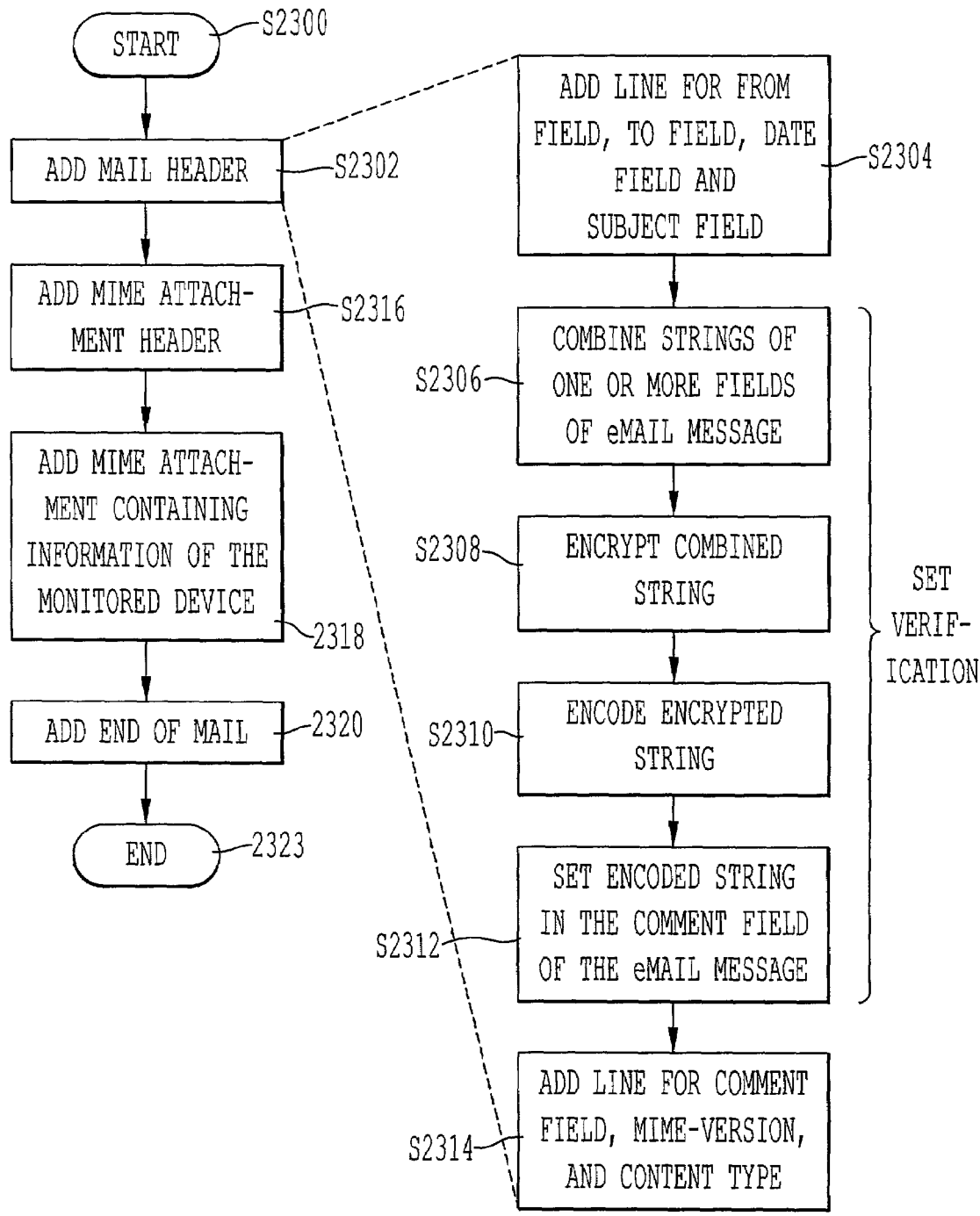
FIG. 25 is a flowchart for creating the email message.

FIG. 25 is a flowchart for creating the email message. Step S2302 is broken down into more detailed steps showing the creation of the mail header. Included in the detailed steps is the verification scheme used to validate the email message in steps S2306 to S2312. The verification scheme involves encrypting and encoding the combined string of one or more fields of the email message and setting this string in the comment field. The string in the comment field consists of readable characters but it appears as a meaningless string of characters. The recipient of this email message must decode and decrypt the comment string to verify the email message. The steps of this flowchart will result in an email message of the format shown in FIG. 23.

The verification scheme involves combining the strings of one or more field of the email message. It is possible to use the combination of any field such as the subject field, date field, source address (from field), destination address (to field), boundary name, and filename. The verification scheme can use any number of these strings to create the comment field.

The verification scheme involves the encryption of the combined string in step S2308. The design of the Data Transfer package allows for any encryption method by the use of abstract class CAbsEncrypter 2012. The CNullEncrypter 2014 class and CSimpleEncrypter 2016 class provide two encryption methods to encrypt the combined string. New encryption methods can be used by adding new derived classes of the CAbsEncrypter 2012 class. The encryption methods can result in a string that contains non-readable characters.

The verification scheme involves the encoding of the encrypted string in step S2310. The design of the Data Transfer package shows the use of the base64 encoding of the encrypted string where the encoding will result in a string with one of the following readable characters—ABCDEFGHIJKLMNOPQRSTUVWXYZabcdefghijklmnopqrstuvwxyz0123456789+/. The encoding must result in a string containing readable characters so that it may be placed in the comment field. However, the base64 encoding can be modified so that new encoding method will result in a string with the readable characters.

The verification scheme shows that the encryption step S2308 and encoding step S2310 occurs once. However, it is possible that the verification scheme may be modified to perform the encryption and encoding methods multiple times.

With the aforementioned variations in fields used, encryption methods, and encoding methods, there are many possible variations in the verification schemes of the email message.

Figure 26:
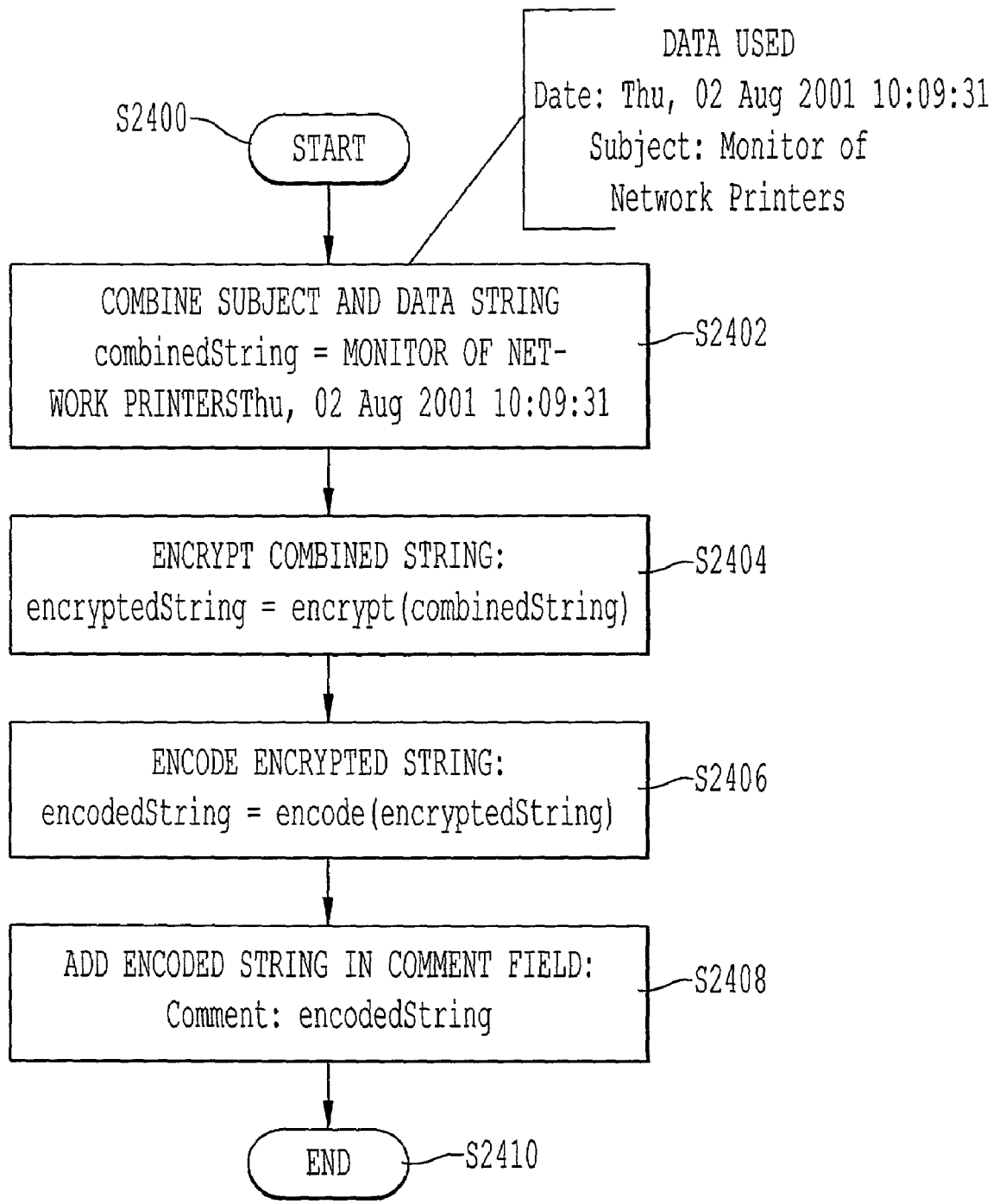
FIG. 26 is a flowchart for a sample verification in which the subject and date field are used.

FIG. 26 is a flowchart for a sample verification in which the subject and date field are used. Even though the subject and date fields are used in the verification, any field in the email message can be used in the verification.

Figure 27:
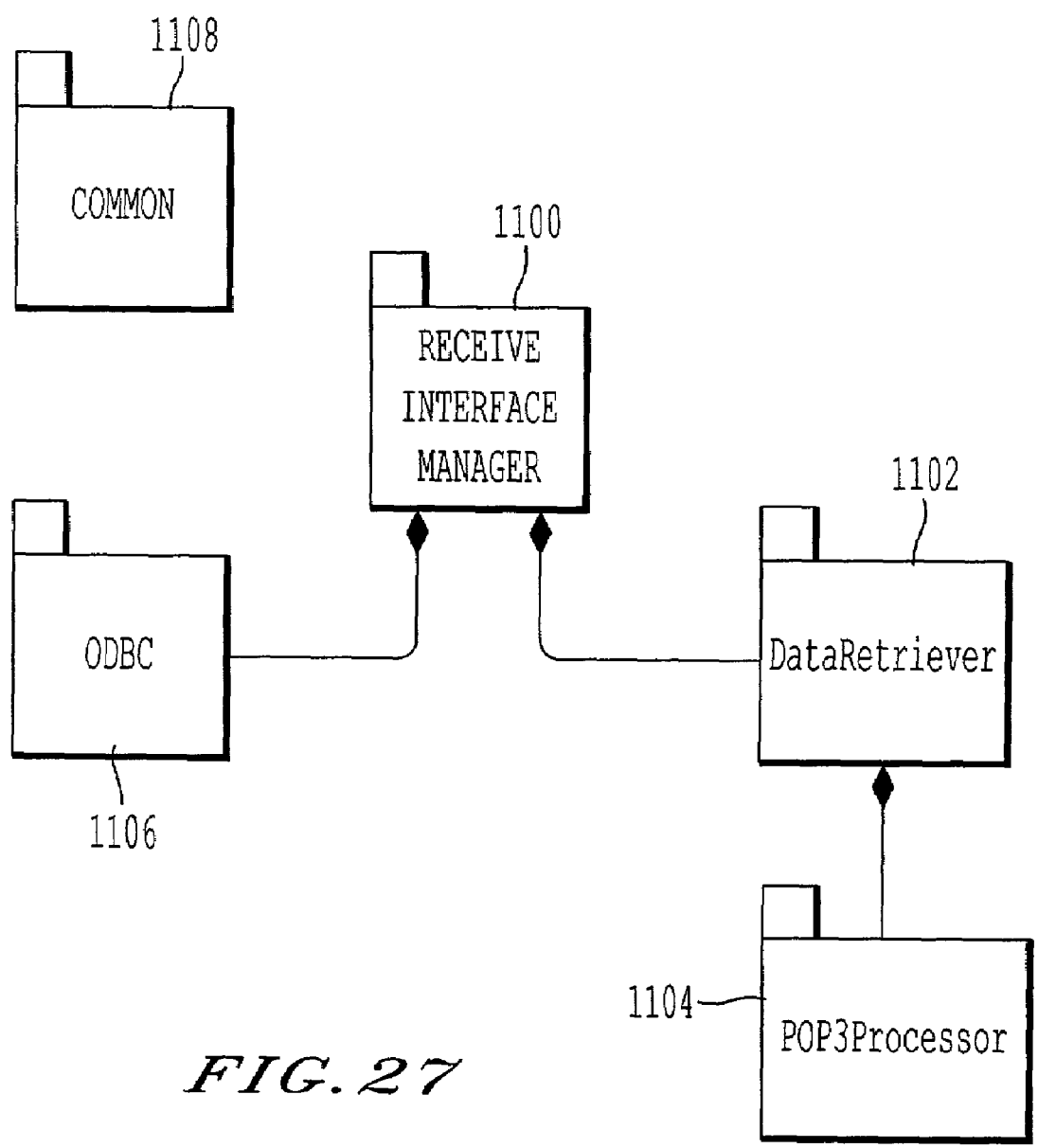
FIG. 27 shows the package diagram of a ReceiveStore package.

FIG. 27 shows the package diagram of a ReceiveStore package. ReceiveInterfaceManager 1100 package is responsible for providing the interface to the ReceiveStore package. ReceiveInterfaceManager 1100 package is also responsible for managing the operations of the other packages to obtain the configuration and status information from the mail server and to store the information in the database. The DataRetriever 1102 package is responsible for parsing the lines of the email message to obtain the configuration and status information. The POP3Processor 1104 package is responsible for retrieving the email messages from the POP3 mail server. The ODBC 1106 package is responsible for storing the configuration and status information in the database. The Common 1108 package is a utility package allowing the sharing of the useful classes and base classes.

Figure 28:
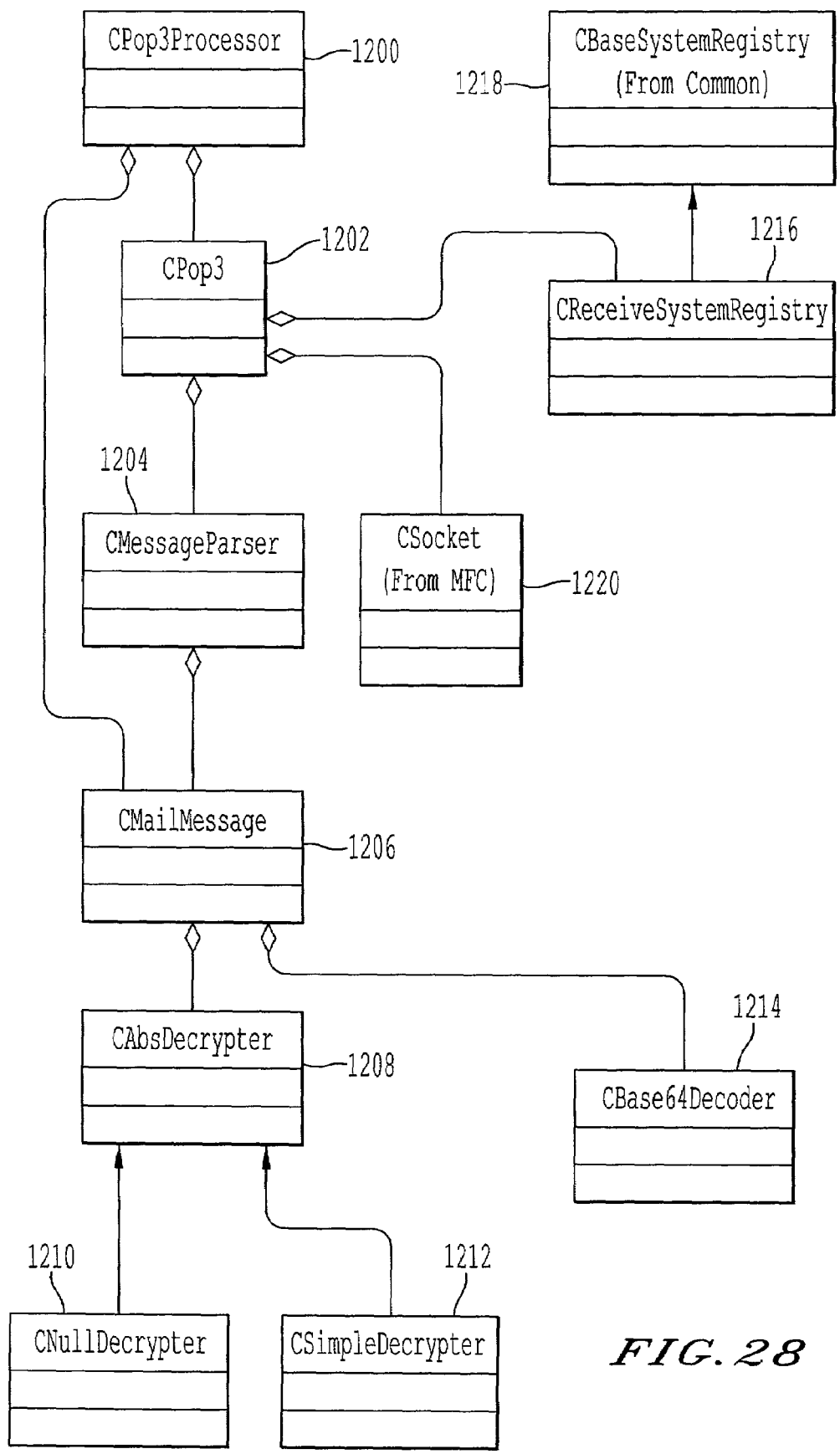
FIG. 28 shows the class diagram of the POP3Processor.

FIG. 28 shows the class diagram of the POP3Processor 1104 package of FIG. 27. The CPop3Processor 1200 class is the interface for this package to obtain the email message using POP3. The CPop3 1202 class implements the POP3 protocol. The CPop3 1202 class uses the CSocket 1220 class of the Microsoft Foundation Class library (MFC) to implement the POP3 protocol. The CMessageParser 1204 class parses the email messages obtained from the POP3 server into its various components. The CMailMessage 1206 class contains the various components of the email message. The CMailMessage 1206 class implements the verification scheme for the email message. The CMailMessage 1206 class obtains the base 64 decoded and decrypted data from the MIME attachment. The CAbsDecrypter 1208 class is an abstract class that provides the virtual interface function to decrypt the data. The CNullDecrypter 1210 class is derived from the CAbsDecrypter 1208 class and provides a method for decrypting the data. The CNullDecrypter 1210 class does not perform any decryption on the data. The CSimpleDecrypter 1212 class is derived from the CAbsDecrypter 1208 class and performs a simple method for decrypting the data. The CBase64Decoder 1214 class performs the Base64 decoding of the data. The CReceiveSystemRegistry 1216 class is derived from the CBaseSystemRegistry 1218 base class located in the Common package. The CReceiveSysteniRegistry 1216 class provides this package with information from the system's registry necessary for accessing the mail server.

Table 22 below shows the public and private functions of the CMailMessage 1206 class and Table 23 below shows the attributes of the CMailMessage 1206 class that are used by the functions.

TABLE 22

| | Function Name | Description |
|---|---|---|
| Public | CMailMessage( ) | Constructor |
| | ~CMailMessage( ) | Destructor |
| | void resetMailMessage( ) | Resets the attributes of CMailMessage |
| | void setSubject(std::string& in_sSubject) | Sets the subject in CMailMessage |
| | void setDate(std::string& in_sDate) | Sets the date in CMailMessage |
| | void setComment(std::string& in_sComment) | Sets the comment in CMailMessage |
| | void setBoundary(std::string& in_sBoundary) | Sets the boundary in CMailMessage |
| | void setFilename(std::string& in_sFilename) | Sets the filename in CMailMessage |
| | bool addToMIMEAttachment(std::string& in_sMIMEAttachment) | Adds to the MIME attachment in CMailMessage |
| | void completeMailMessage( ) | Completes the mail message in CMailMessage |
| | void verifyMailMessage( ) | Verifies the mail message |
| | bool isMailMessageValid( ) | Returns if the mail message is valid or not |
| | bool getNextLineOfMessage(std::string& out_sLineOfMessage) | Gets a line of the mail message |

TABLE 22-continued

| | Function Name | Description |
|---|---|---|
| Private | CAbsDecrypter* createDecrypter(DecrypterType in_DecrypterType) | Creates the decrypter used for the verification scheme and for the decryption of the MIME attachment |

TABLE 23

| Type | Attribute Name | Description |
|---|---|---|
| CBase64Decoder | m_Base64Decoder | This attribute member Base64 decodes the MIME attachment. |
| std::auto_ptr <CabsDecrypter> | m_pDecrypter | This attribute member decrypts the MIME attachment. This attribute member is created in createDecrypter( ). |
| bool | m_bIsMessageValid | This attribute member indicates if the mail message is valid. |
| std::string | m_sSubject | This attribute member represents the string for the subject field of the mail message. |
| std::string | m_sDate | This attribute member represents the string for the date field of the mail message. |
| std::string | m_sComment | This attribute member represents the string for the comment field of the mail message. |
| std::string | m_sBoundary | This attribute member represents the string for the boundary separator for the MIME attachment. |
| std::string | m_sFilename | This attribute member represents the string for the filename of the MIME attachment. |
| std::string | m_sMessage | This attribute member represents the string for the Base64 decoded and decrypted message. |
| bool | m_bIsFirstLineRead | This attribute member determines if the first line of the MIME attachment has been read. |
| std::vector<std::string> | m_Attachment | This attribute member represents the lines of the MIME attachment. |
| std::vector<std::string>:: iterator | m_Attachment Iterator | This attribute member points to the line of the MIME attachment currently being accessed. |

The format of the email message received and retrieved by the POP3Processor 1104 package is shown in FIG. 23. The CMailMessage 1206 class will contain the various components of email message as shown in FIG. 23. FIG. 24 shows an example of the email message corresponding to the format shown in FIG. 23.

Figure 29:
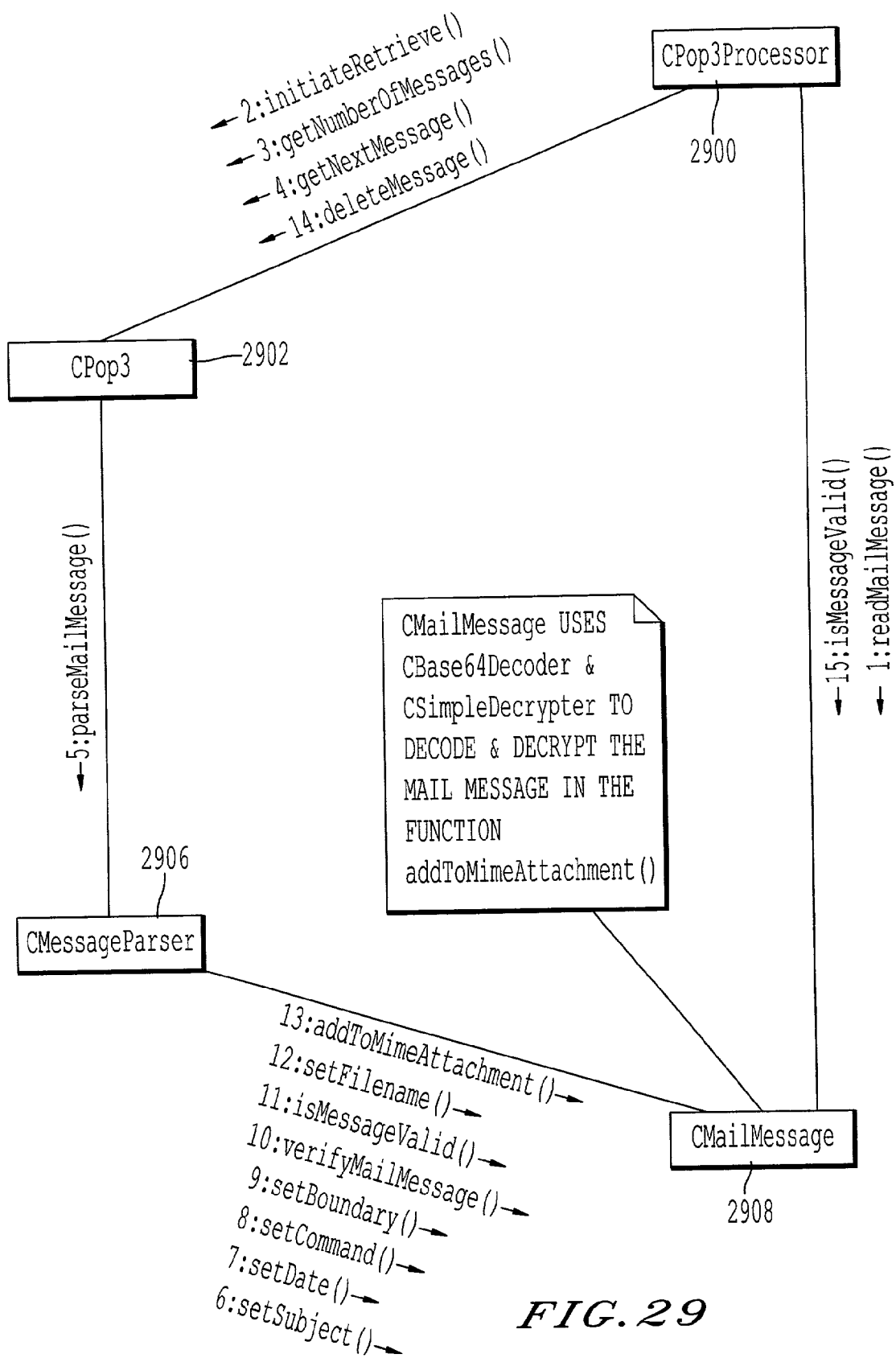
FIG. 29 is an interaction diagram describing the interaction between the classes in retrieving the email message.

FIG. 29 is an interaction diagram corresponding to the class diagram of FIG. 28 describing the interaction between the classes in retrieving the email message. To retrieve the email message, CPop3Processor 2900 calls resetMailMessage( ) of CMailMessage 2908 to reset the attributes of CMailMessage 2908. CPop3Processor 2900 calls initiateRetrieve( ) of CPop3 2902 to initiate connection with the POP3 server that contains the email message. CPop3Processor 2900 calls getNumberOfMessage( ) of CPop3 2902 to obtain the number of messages in the POP3 server. CPop3Processor 2900 calls getNextMessage of CPop3 2902 to obtain a message from the POP3 server. In turn, CPop3 2902 calls parseMailMessage( ) of CMessageParser 2906 to parse the email message obtained from the POP3 server. As CMessageParser 2906 obtains the various components of the email message, it puts those components into CMailMessage 2908 by calling the different set functions and the add function of CMailMessage 2908. After CMessageParser 2906 obtains the components of the email header and sets it value in CMailMessage 2908, it calls verifyMailMessage( ) of CMailMessage 2908 to execute the verification scheme of the email message. CMessageParser 2906 calls isMessageValid( ) of CMailMessage 2908 to determine if the email message contains the information about the monitored devices. After the email message has been obtained, CPop3Processor 2900 calls deleteMessage( ) of CPop3 2902 to remove the message from the POP3 server.

Figure 30:
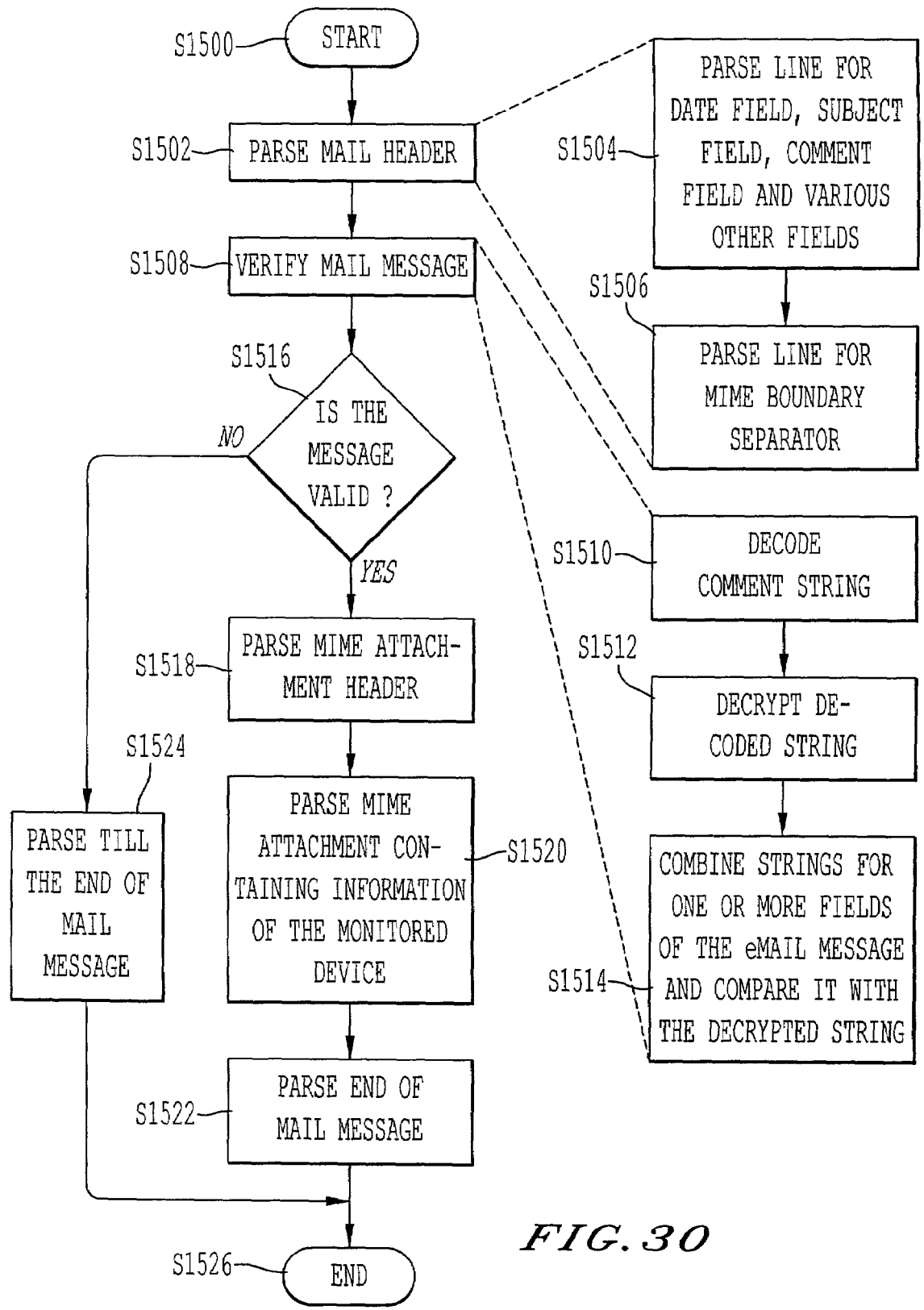
FIG. 30 is a flowchart for parsing the email message.

FIG. 30 is a flowchart for parsing the email message. Step S1502 is broken down into more detailed steps showing the parsing of the email header. Included in the detailed steps is parsing the Date field, Subject field, Comment field, MIME boundary, and other fields from the email header in steps S1504 to S1506. After the email header is parsed, the email message is verified to determine if it contains information about the monitored devices in step S1508. Step S1508 is broken down into more detailed steps showing the verification scheme in steps S1510 to S1514. The verification scheme involves decoding the comment string in step S1510, decrypting the decoded string in step S1512, and comparing the decrypted string with the combined string of one or more of the fields of the email message instep S1514. If they are the same, the email message is a valid message containing information about the monitored devices. Otherwise, the email message is an invalid message.

The mail message is checked to see if it is valid in step S1516. If it is valid, parse the rest of the email message in steps S1518 to S1522. Otherwise, parse the email message until the end of the email message in step S1524.

The verification scheme to validate the email message depends upon the verification scheme used by the MonitorSend package of FIG. 6 to create the comment field. Whichever fields of the email message, encryption method, and encoding method are used to set the verification in the comment field of the email message, the corresponding decoding method, decryption method, and fields of the email message must be used on the comment field to validate the email message.

Figure 31:
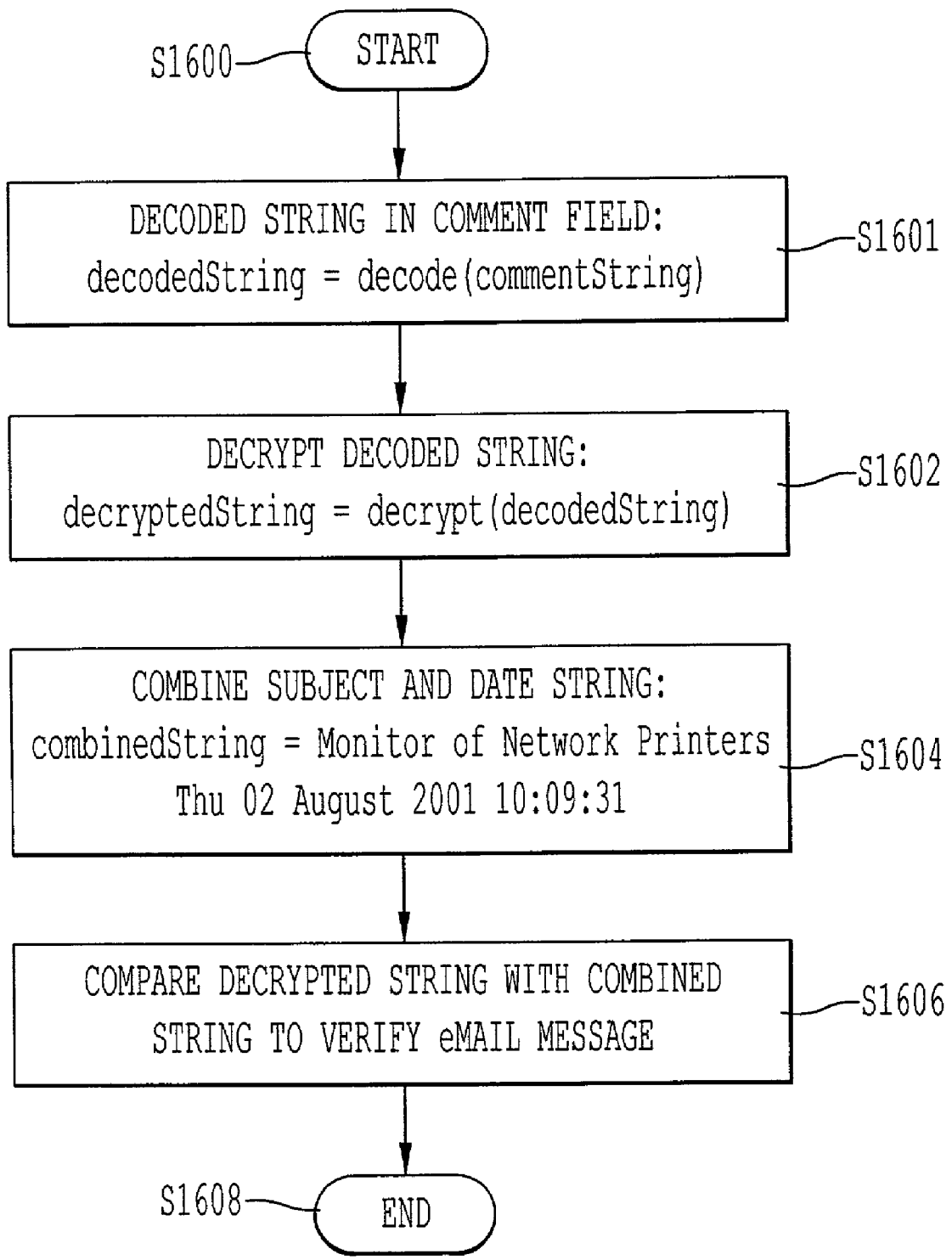
FIG. 31 is a flowchart for a sample verification in which the subject and date field are used.

FIG. 31 is a flowchart for a sample verification in which the subject and date field are used. Even though the subject and date fields are used in the verification, any field in the email message can be used in the verification.

The foregoing description of the preferred embodiment of the present invention has been presented for purposes of illustration and description. It is not intended to be exhaustive or to limit the invention to the precise form disclosed, and many modifications or variations are possible in light of the above teaching. For example, any one or more of the concepts described or shown herein may be applied to the system and/or method disclosed in related application Ser. No. 09/756,120. Moreover, any concept or feature described in related application Ser. No. 09/756,120 may be applied to the systems or methods disclosed herein. The embodiments were chosen and described to best explain the principles of the invention and its practical applications thereby enable others skilled in the art to utilize the invention and various embodiments and with various modifications as are suited to the particular use contemplated. It is intended that the scope of the present invention be defined only by the claims appended hereto.

What is claimed:

1. A method of monitoring over a network a monitored device by a monitoring device using Internet electronic mail, the method comprising:
   receiving an electronic mail message by the monitoring device;
   extracting, from a field of a header of the received electronic mail message, validation information;
   determining, by the monitoring device based on a content of the validation information, whether or not a body of the electronic mail message includes at least one of status and configuration information of the monitored device;
   extracting, from the body of the electronic mail message, the at least one of status and configuration information, when the determining step determines that the body of the electronic mail message includes the at least one of status and configuration information, and when the determining step determines that the body of the electronic mail message does not include the at least one of status and configuration information, parsing the body of the electronic mail message without extracting the at least one of status and configuration information; and
   storing the extracted at least one of status and configuration information in a memory.

2. The method of claim 1, wherein the validation information comprises at least one of an identification of the monitoring device and a network address of the monitoring device.

3. The method of claim 1, wherein at least one of the validation information and the at least one of status and configuration information are encrypted, the method further comprising:
   decrypting at least one of the validation information and the at least one of status and configuration information.

4. The method of claim 3, wherein at least one of the validation information and the at least one of status and configuration information is encoded.

5. The method of claim 4, wherein a map describing the encoding is encrypted.

6. The method of claim 1, wherein the validation information is included in the header of the email message.

7. The method of claim 6, wherein the validation information is included in at least one of the date field, subject field, and comment field of the header.

8. The method of claim 1, wherein the at least one of status and configuration information comprises information related to the configuration of the monitored device.

9. The method of claim 1, wherein the at least one of status and configuration information comprises information related to a status of the monitored device.

10. The method of claim 1, wherein the at least one of status and configuration information comprises instructions for the monitoring device.

11. A monitoring device for monitoring over a network a monitored device using Internet electronic mail, the monitoring device configured to:
   receive an electronic mail message by the monitoring device;
   extract, from a field of a header of the received electronic mail message validation information;
   determine, based on a content of the validation information, whether a body of the electronic mail message includes at least one of status and configuration information of the monitored device;
   extract from the body of the electronic message the at least one of status and configuration information, when the monitoring device determines that the body of the electronic mail message includes the at least one of status and configuration information, and when the monitoring device determines that the body of the electronic mail message does not include the at least one of status and configuration information, to parse the body of the electronic mail message without extracting the at least one of status and configuration information; and
   store the extracted at least one of status and configuration information in a memory.

12. The device of claim 11, wherein the validation information comprises at least one of an identification of the monitoring device and a network address of the monitoring device.

13. The device of claim 11, wherein at least one of the at least one of status and configuration information and the validation information are encrypted, wherein the monitoring device is configured to:
   decrypt at least one of the validation information and the at least one of status and configuration information.

14. The device of claim 13, wherein at least one of the at least one of status and configuration information and the validation information is encoded.

15. The device of claim 14, wherein a map describing the encoding is encrypted.

16. The device of claim 11, wherein the validation information is included in the header of the email message.

17. The device of claim 16, wherein the validation information is included in at least one of the date field, subject field and comment field of the header.

18. The device of claim 11, wherein the at least one of status and configuration information comprises information related to the configuration of either the monitoring device or the monitored device.

19. The device of claim 11, wherein the at least one of status and configuration information comprises information related to a status of either the monitoring device or the monitored device.

20. The device of claim 11, wherein the at least one of status and configuration information comprises instructions for the monitoring device.

21. A monitoring device for monitoring over a network a monitored device using Internet electronic mail, the monitoring device comprising:
   means for receiving an electronic mail message by the monitoring device;
   means for extracting, from a field of a header of the received electronic mail message, validation information;

means for determining, based on a content of the validation information, whether a body of the electronic mail message includes at least one of status and configuration information of the monitored device;

means for extracting, from the body of the electronic message, the at least one of status and configuration information, when the means for determining determines that the body of the electronic mail message includes the at least one of status and configuration information, and when the means for determining determines that the body of the electronic mail message does not include the at least one of status and configuration information, for parsing the body of the electronic mail message without extracting the at least one of status and configuration information; and means for storing the extracted device information in a memory.

22. A computer program product embodied on one or more storage media, the computer program product causing a monitoring device to perform the steps of:

receiving an electronic mail message by the monitoring device;

extracting, from a field of a header of the received electronic mail message, validation information;

determining, based on a content of the validation information, whether a body of the electronic mail message includes at least one of status and configuration information of the monitored device;

extracting, from the body of the electronic message, the at least one of status and configuration information, when the determining step determines that the body of the electronic mail message includes the at least one of status and configuration information, and when the determining step determines that the body of the electronic mail message does not include the at least one of status and configuration information, parsing the body of the electronic mail message without extracting the at least one of status and configuration information; and storing the extracted at least one of status and configuration information in a memory.

23. The method of claim 1, wherein the validation information is encrypted and included in a comment field of the header of the electronic mail message.

24. The monitoring device of claim 11, further configured to extract the validation information from a comment field of the header of the electronic mail message, wherein the validation information is encrypted.

* * * * *